(12) United States Patent
Tran

(10) Patent No.: US 11,854,033 B2
(45) Date of Patent: *Dec. 26, 2023

(54) FARM ECOSYSTEM

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,904

(22) Filed: Mar. 1, 2023

(65) Prior Publication Data

US 2023/0222530 A1 Jul. 13, 2023

Related U.S. Application Data

(63) Continuation of application No. 17/504,513, filed on Oct. 19, 2021, now Pat. No. 11,631,243, which is a
(Continued)

(51) Int. Cl.
*G06Q 30/02* (2023.01)
*G06Q 50/02* (2012.01)
(Continued)

(52) U.S. Cl.
CPC ....... *G06Q 30/0206* (2013.01); *A01B 79/005* (2013.01); *A01B 79/02* (2013.01); *A01C 23/047* (2013.01); *A01G 22/00* (2018.02); *A01G 25/09* (2013.01); *A01G 25/165* (2013.01); *A01G 25/167* (2013.01); *B64C 39/024* (2013.01);
(Continued)

(58) Field of Classification Search
None
See application file for complete search history.

(56) References Cited

U.S. PATENT DOCUMENTS 4,277,027 A   7/1981   Sherwin
7,062,513 B2 * 6/2006   Beck .................. G06Q 10/087
                                                              705/37
(Continued)

OTHER PUBLICATIONS

Veloo et al., "Interactive Cultivation System for the Future IoT-based Agriculture", 2019, 2019 Seventh International Symposium on Computing and Networking Workshops (CANDARW). (Year: 2019).*

(Continued)

*Primary Examiner* — Mohammad Ali
*Assistant Examiner* — Kelvin Booker
(74) *Attorney, Agent, or Firm* — PatentPC PowerPatent

(57) ABSTRACT

An agricultural method includes providing a positive air pressure chamber to prevent outside contaminants from entering the chamber; growing crops in a plurality of cells in the chamber, each cell having multi-grow benches or levels, each cell further having connectors to vertical hoists for vertical movements in the chamber; maintaining pre-set temperature, humidity, carbon dioxide, watering and lighting levels to achieve predetermined plant growth; using motorized transport rails to deliver benches for operations including seeding, harvesting, grow media recovery, and bench wash; dispensing seeds in the cell with a mechanical seeder coupled to the transport rails; growing the crops with computer controlled nutrients, light and air level; and harvesting the crops and delivering the harvested crop at a selected outlet of the chamber.

20 Claims, 18 Drawing Sheets

Related U.S. Application Data continuation of application No. 17/319,269, filed on May 13, 2021, now Pat. No. 11,195,015, which is a continuation of application No. 17/088,455, filed on Nov. 3, 2020, now Pat. No. 11,521,381, which is a continuation of application No. 16/528,508, filed on Jul. 31, 2019, now Pat. No. 10,936,871.

(60) Provisional application No. 62/846,786, filed on May 13, 2019.

(51) Int. Cl.

| | | |
|---|---|---|
| G05D 1/00 | (2006.01) | |
| G05D 1/10 | (2006.01) | |
| A01B 79/00 | (2006.01) | |
| A01B 79/02 | (2006.01) | |
| A01G 25/09 | (2006.01) | |
| A01G 25/16 | (2006.01) | |
| G05B 17/02 | (2006.01) | |
| G05B 17/00 | (2006.01) | |
| G06F 3/01 | (2006.01) | |
| G16Y 20/20 | (2020.01) | |
| G16Y 10/05 | (2020.01) | |
| H04L 9/06 | (2006.01) | |
| G06Q 30/0201 | (2023.01) | |
| A01C 23/04 | (2006.01) | |
| B64C 39/02 | (2023.01) | |
| G06T 7/00 | (2017.01) | |
| A01G 22/00 | (2018.01) | |
| G06V 20/10 | (2022.01) | |
| G06V 10/764 | (2022.01) | |
| G06V 10/82 | (2022.01) | |
| G06V 20/17 | (2022.01) | |
| H04L 9/00 | (2022.01) | |
| B64U 30/20 | (2023.01) | |
| B64U 101/30 | (2023.01) | |
| G06V 10/58 | (2022.01) | |

(52) U.S. Cl.
CPC .......... *G05B 17/02* (2013.01); *G05D 1/0088* (2013.01); *G05D 1/102* (2013.01); *G06F 3/017* (2013.01); *G06Q 50/02* (2013.01); *G06T 7/0002* (2013.01); *G06V 10/764* (2022.01); *G06V 10/82* (2022.01); *G06V 20/10* (2022.01); *G06V 20/17* (2022.01); *G06V 20/188* (2022.01); *G16Y 10/05* (2020.01); *G16Y 20/20* (2020.01); *H04L 9/0643* (2013.01); *B64U 30/20* (2023.01); *B64U 2101/30* (2023.01); *G06Q 2220/00* (2013.01); *G06V 10/58* (2022.01); *H04L 9/50* (2022.05)

(56) References Cited

U.S. PATENT DOCUMENTS

| | | | |
|---|---|---|---|
| 9,298,861 | B1 | 3/2016 | Lammers |
| 10,677,723 | B2* | 6/2020 | Ditterich ............... G06Q 50/02 |
| 11,078,020 | B2* | 8/2021 | Bohling ............... B65G 1/1373 |
| 11,215,840 | B2* | 1/2022 | Carrascal De Las Heras ............ G02B 27/48 |
| 11,378,564 | B2* | 7/2022 | Bryant, Jr. ............. G16H 70/40 |
| 2006/0196116 | A1* | 9/2006 | Zettl ...................... G06Q 10/00 705/301 |
| 2010/0042234 | A1* | 2/2010 | May ........................ A01G 7/00 47/17 |
| 2011/0131876 | A1* | 6/2011 | Pettibone ............. A01G 31/042 110/255 |
| 2016/0098723 | A1* | 4/2016 | Feeney ................ G06Q 20/065 705/75 |
| 2017/0027112 | A1 | 2/2017 | Vail |
| 2017/0035008 | A1* | 2/2017 | Ellins ..................... A01G 9/249 |
| 2017/0064912 | A1* | 3/2017 | Tabakman ............. A01G 31/06 |
| 2018/0007845 | A1* | 1/2018 | Martin ................... A01G 9/249 |
| 2018/0078843 | A1* | 3/2018 | Tran ................... G09B 19/0038 |
| 2018/0120225 | A1* | 5/2018 | Ditterich ................ G01N 21/85 |
| 2018/0132441 | A1* | 5/2018 | Harker ................... A01G 7/045 |
| 2018/0264347 | A1* | 9/2018 | Tran ....................... A63B 69/38 |
| 2018/0276777 | A1* | 9/2018 | Brillinger .......... G06Q 50/2057 |
| 2018/0285810 | A1* | 10/2018 | Ramachandran .... G06Q 10/087 |
| 2018/0308046 | A1* | 10/2018 | Schutt .................... G06Q 50/02 |
| 2019/0050948 | A1 | 2/2019 | Perry |
| 2019/0138676 | A1* | 5/2019 | Akella ............. G06Q 10/06393 |
| 2019/0195852 | A1* | 6/2019 | Bryant, Jr. ......... G01N 33/0098 |
| 2019/0259108 | A1* | 8/2019 | Bongartz .......... G06Q 10/0639 |
| 2019/0303846 | A1* | 10/2019 | Kaweske ............... G16H 20/10 |
| 2020/0184153 | A1* | 6/2020 | Bongartz ................. A01G 9/24 |
| 2020/0265446 | A1* | 8/2020 | Vargas ................ G06K 7/1413 |
| 2020/0359550 | A1* | 11/2020 | Tran ....................... G06V 20/10 |
| 2021/0080441 | A1* | 3/2021 | Bryant, Jr. ............. G16H 70/40 |
| 2022/0036366 | A1* | 2/2022 | Wu ........................ G16H 10/60 |
| 2022/0261722 | A1* | 8/2022 | Rakshit ............. G06Q 30/0633 |
| 2023/0132654 | A1* | 5/2023 | Vadlamudi ............. G06Q 50/02 705/7.12 |

OTHER PUBLICATIONS

Spencer, G., "Indoor vertical farming in Asia and beyond: Digging deep in data", Feb. 2018, Feb. 27, 2018 Microsoft Writer. (Year: 2018).*

Rayhana et al., "Internet of Things Empowered Smart Greenhouse Farming", Feb. 2020, IEEE Journal of Radio Frequency Identification, vol. 4, No. 3, Sep. 2020. (Year: 2020).*

Yadav et al., "Use of blockchain to solve select issues of Indian farmers", Sep. 2019, 1st International Conference on Advances in Mechanical Engineering and Nanotechnology (ICAMEN 2019). (Year: 2019).*

Xlong et al., "Blockchain Technology for Agriculture: Application and Rationale" Frontiers in Blockchain, Feb. 2020 | vol. 3 | Article 7. (Year: 2020).*

Salah et al., "Blockchain-Based Soybean Traceability in Agricultural Supply Chain", Apr. 2019, IEEE Access. (Year: 2019).*

Monteiro et al., "Towards Sustainable Digital Twins for Vertical Farming", 2018, 13th Int. Conf on Digital Information Mgmt. (Year: 2018).*

Dedeepya et al., "Smart Greenhouse Farming based on IOT", 2018, Proceedings of the 2nd International conference on Electronics , Communication and Aerospace Technology (ICECA 2018), IEEE Conference Record # 42487; IEEE Xplore ISBN:978-1-5386-0965-1. (Year: 2018).*

Caro et al., "Blockchain-based Traceability in Agri-Food Supply Chain Management: A Practical Implementation", 2018 IoT Vertical and Topical Summit on Agriculture—Tuscany (IOT Tuscany. (Year: 2018).*

Andres et al., "An IoT-Based Traceability System for Greenhouse Seedling Crops", Sep. 2018, IEEE Access. (Year: 2018).*

Awan et al., "Role of Internet of Things (IoT) with Blockchain Technology for the Development of Smart Farming", Sep.-Oct. 2019, Journal of Mechanics of Continua and Mathematical Sciences, vol. 14, No. 5, Sep.-Oct. 2019 pp. 170-188 ISSN (Print) 0973-8975. (Year: 2019).*

* cited by examiner

FIG. 3I
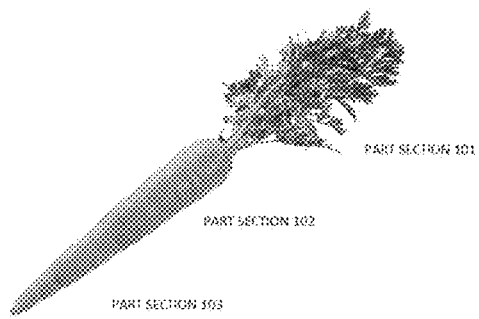
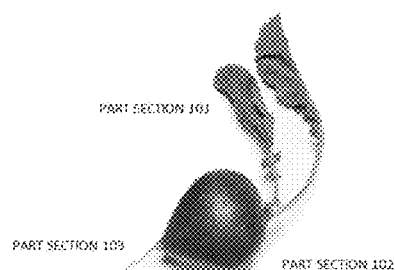
FIG. 4A
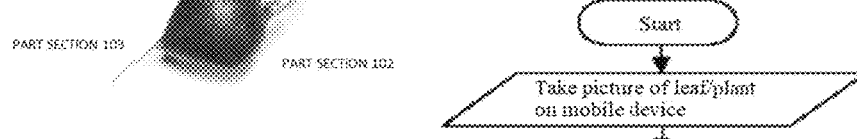
FIG. 4B

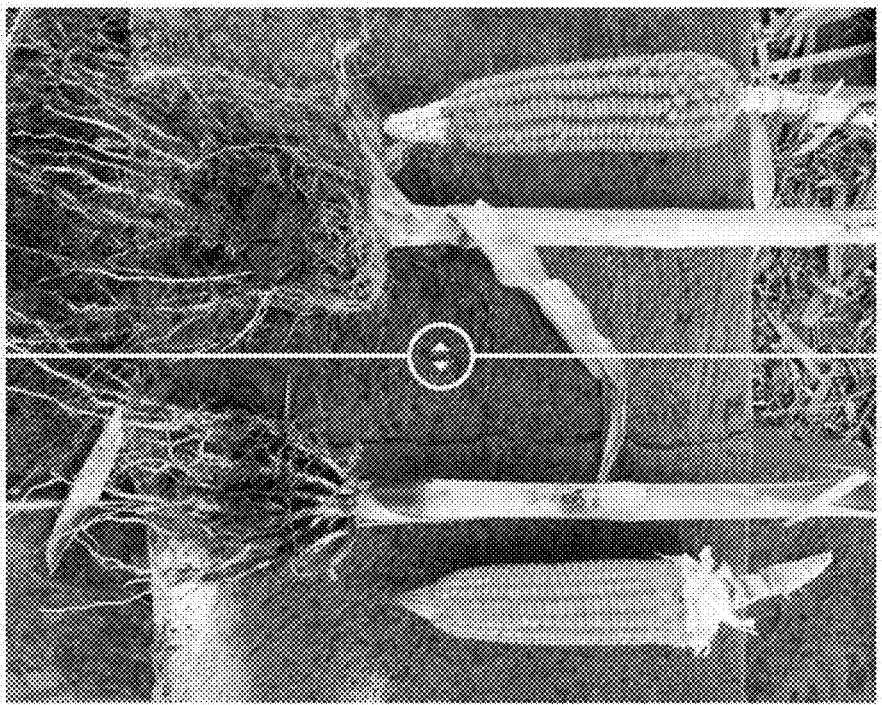

| (120) Buyer requests to obtain the service or item from the service or item provider |
|---|
| (124) Item provider utilizes the blockchain system described above and generates a cryptographic key pair. In one implementation, item provider sells item with a biomarker that follows the item through its growth cycle such as a genetic marker which can be specific combination of microbes in a predetermined concentration arrived at by selectively breeding the microbes |
| (126) the service or item provider embeds the key data in the service or item. This can include biomarker or genetic marker |
| (128) the service or service or item provider stores the private key in association with an entity credential in the database |
| (130) a third party validates the terms of the smart contract with the private key |
| (132) the blockchain or shared ledger is analyzed to determine if key data was used and if contractual terms are satisfied according to contract law expert system and if so marks the satisfaction of the contract terms. In one embodiment, the biomarker or genetic marker is read to confirm source or authenticity of the item and such test results are also placed on blockchain |
| (134) the seller/provider is paid based on smart contract from the escrowed funds, and service or item is then made available to the buyer |

FARM ECOSYSTEM

This application claims priority to Provisional Application 62/846,786 filed May 13, 2019, and is related to application Ser. No. 16/252,543 filed Jan. 18, 2019 and Ser. No. 17/088,455 filed Nov. 3, 2020, the contents of which are incorporated by reference.

BACKGROUND

The present invention relates to agriculture technology.

SUMMARY

In one aspect, an agricultural method includes providing a positive air pressure chamber to prevent outside contaminants from entering the chamber; growing crops in a plurality of cells in the chamber, each cell having multi-grow benches or levels, each cell further having connectors to vertical hoists for vertical movements in the chamber; maintaining pre-set temperature, humidity, carbon dioxide, watering and lighting levels to achieve predetermined plant growth; using motorized transport rails to deliver benches for operations including seeding, harvesting, grow media recovery, and bench wash; dispensing seeds in the cell with a mechanical seeder coupled to the transport rails; growing the crops with computer controlled nutrients, light and air level; and harvesting the crops and delivering the harvested crop at a selected outlet of the chamber.

In another aspect, an agricultural method includes selecting a seed with predetermined end product properties; selecting microbes to assist seed growth and providing the microbes to help the seed during early stage growth; planting the seed on a farm and periodically capturing growth data with one or more sensors; storing the growth data on a blockchain; viewing the growth data by an interested party; and controlling an irrigation system in response to the growth data.

Implementations may include one or more of the following. The seed comprises hemp and the blockchain comprises Hyperledger or Ethereum blockchain. The end product properties include product size, drought resistance, or predetermined taste. The system can add entries to the blockchain as the seed moves from the farm to a consumer. The system can dispense fertilizer in response to the growth data. The microbes can be embedded in a fertilizer. The seed can be coated with the microbes. Data can be received from IoT (internet of things) sensors and communicating with a cloud to control a farm system. A lending source (bank/government agency) can finance the seed based on blockchain data. The system can use cryptocurrency by generating tokens used by farmers, farm suppliers, shippers, distributors, and retailers in an ecosystem. Each generation of the microbes are iteratively grown in a feedback loop. Each generation of the microbes are iteratively grown to increase microbes providing the predetermined end product property, comprising checking genetic data of each generation of microbes in a feedback loop to increase or decrease predetermined members of the microbes to achieve the determined end product property. Sensors can detect humidity, temperature, leaf property, soil property, or presence of an organism on the plant. A camera can capture a leaf image and determining soil properties based from the leaf image. The camera can capture a leaf image and determining soil properties based from the leaf image. The camera can capture soil image and determining soil properties based therefrom. The camera can capture an image of an organism on the plant, classifying the organism, and recommending a treatment for the organism. The system can communicate over 5G cellular network. A farmer can get the seed and a third party can agree to buy an end product from the seed with the predetermined end product properties in advance of planting. A network of trucks can pick-up the end product by selecting in real-time one or more nearest trucks from a network of trucks, reviewing each truck's shipping cost, and designating one of the trucks to transport the end product.

In one implementation, the system selects seeds engineered that provide food low in starch and sugar for a diabetic consumer. The resulting food products are low in carbs (starches, sugar). When people with diabetes consume too many carbs at a time, their blood sugar levels can rise to dangerously high levels. Over time, high levels can damage your body's nerves and blood vessels, which may set the stage for heart disease, kidney disease and other serious health conditions.

A number of other inventive aspects are disclosed herein, among others:

Autonomous Farm Navigation System

One system includes a frame, water valves attached to the frame to dispense water to crops in the field, cameras and position sensors to capture field data, and a processor to control movement of the frame to move around a field for irrigation.

Implementations of the system includes a plurality of cameras mounted on the frame. A number of sensors such as IoT (internet of things) sensors can share data with other vehicles and that can communicate with the cloud to provide intelligent handling of the irrigation system. The system can navigate on its own to the next point to be irrigated after completing work in the current area.

Another system includes a motorized frame to move in a field, cameras and sensors to capture field data, and machine learning to monitor and manage problems in field. One implementation can identify weeds and chemical-free methods of reliably eradicating weeds. Another implementation can detect underwatered or overwatered plants. Another embodiment data using a plurality of RGB cameras and other optional sensors, including LiDAR.

The system helps in farming productive and sustainable crop varieties by collecting high-value data from crop breeding and trial fields. The system is providing under canopy crop scouting information in production fields, which enables growers to manage their fields for better yields and profitability. The system also solves critical problems like herbicide-resistant weeds with mechanical weeding by the robots in large fields.

System with Weather Reporting

Another system includes a motorized frame to move in a field, cameras, temperature sensors, and other sensors to capture field data, and machine learning to monitor and manage problems in field. One implementation can collect weather data like hail, wind, rainfall, and temperature, which can be placed in fields to assist in data-driven field decisions. One embodiment supplements local weather data with external sources like satellites and radar. This embodiment can correct for what is being provided in the public realm through satellites and radar—making it more precise and accurate—by fusing it with the insight gleaned from irrigation ground-based stations.

Flock of Navigating Irrigation Systems

An irrigation solution includes master irrigation autonomous vehicle and a number of autonomous irrigation vehicles each moving similar to a bird in a flock and following the master irrigation vehicles in watering a large farm. One implementation can identify weeds and chemical-free methods of reliably eradicating weeds. Another implementation can detect underwatered or overwatered plants. Another embodiment data using a plurality of RGB cameras and other optional sensors, including LiDAR.

The system helps in farming productive and sustainable crop varieties by collecting high-value data from crop breeding and trial fields. The system is providing under canopy crop scouting information in production fields, which enables growers to manage their fields for better yields and profitability. The system also solves critical problems like herbicide-resistant weeds with mechanical weeding by the robots in large fields.

Beamforming for Water Spray to Reach Edge Locations

Another system includes a frame that rotates in a circular pattern, water valves attached to the frame to dispense water to crops in the field, cameras and position sensors to capture field data, and a processor to control movement of the frame to move around a field for irrigation. The processor calculates water spray pattern, wind speed and other weather parameters, and applies beamforming techniques to shape the water spray to reach edges of the circular spray pattern to water in a non-circular area.

Irrigation Sensors to Capture Plant/Soil/Fertilizer Data

Sensors are disclosed below including cameras, chemical sensors, and soil sensors to capture data and communicate with remote system.

One system includes a camera that captures leaf and other plant parameters to determine if the plant is under or overwatered. Another system estimates fertilizer components based on leaf imaging. Yet another system captures soil images to determine soil condition.

Another system includes actuated sensors that can poke into the ground to detect soil chemistry and upload such information to the cloud.

Yet another system captures weeds on the ground. The system also detects bugs, parasites, and other harmful species on the crop using camera imaging.

The system can use AI to combine ground information collected by the irrigation system to automate the analysis of aerial imagery of a field. This might include diagnosing areas of crop stress due to moisture, disease, etc. AI can further identify the relationships between observed crop stress and sensor- or model-based soil moisture data. This allows such data to be used to more proactively manage irrigation activities to prevent crop stress, rather than waiting for stress to become apparent. Smartphone-based apps that apply AI to identify insects, weeds, and diseases, by simply pointing the camera at the item of interest, are already available.

Yet other systems provide under canopy crop scouting information in production fields, which enables growers to manage their fields for better yields and profitability. The system also solves critical problems like herbicide-resistant weeds with mechanical weeding by the robots in large fields.

Automatic Dispensing of Microbials for Plant Growth

Another system includes a frame, water valves attached to the frame to dispense water to crops in the field, and a tank with a microbial solution supplementing fertilizer. The system can periodically dispense the soil fertilizer/soil supplements as needed. The microbial solution can be from Plant-Grow, Inc., among others.

Predictive Maintenance of Irrigation Using AI

Another system includes a frame, water valves attached to the frame to dispense water to crops in the field, sensors to capture moving parts on the irrigation system, and a processor to control movement of the frame to move around a field for irrigation, the processor also collecting system operation parameters to predict part failure and request replacement parts ahead of the predicted failure. One embodiment collects operational parameters from a population of irrigation systems and predict failure based on population statistics.

Irrigation Repair/Maintenance Using AR/VR

Another system includes AR google connected to ground sensors and cloud servers providing augmented video to guide farm field repairs. A user wears the AR wearable and inspect the irrigation system. Based on user's head position and item he is looking at, the system overlays a repair assembly or disassembly diagram to aid the user in opening the irrigation, replace or perform maintenance, verify, and reassemble the system for operation. The system enables inexperienced users to maintain equipment.

Water Head Automatic Head Cleaning

Another system includes a frame, water valves attached to the frame to dispense water to crops in the field, sensors to detect water spray from the valves or water flowing through the valves to determine cloggage and if so, a microbial solution that eats up algae nutrients in the water is injected. Once the nutrients are gone, the algae is flushed out of the valves. This approach saves money from manual valve head cleaning by field service personnel.

5G Controlled Irrigation

Another system includes a frame, water valves attached to the frame to dispense water to crops in the field, sensors to capture moving parts on the irrigation system, 5G transceivers, and a processor coupled to the sensors and a 5G network to control movement of the frame to move around a field for irrigation, the processor also collecting system operation parameters to predict part failure and request replacement parts ahead of the predicted failure. One embodiment collects operational parameters from a population of irrigation systems and predict failure based on population statistics.

Blockchain Tracking of Agricultural Production

Another system enters blockchain entries for each water cycle for each irrigation machine. The blockchain entries cumulatively provide proof of origin. The entry can include location, crop type, time of watering, weather condition, or other data. The entry can be verified by buyers/traders/consumers. Such proof of location can be used as part of advanced purchases for products with specified conditions. The entry can also include sensor data on crops. The entry can include sensor data relating to maintenance of the irrigation machine.

AI Based Irrigation

Another system uses AI for improved irrigation scheduling and efficiency. While soil moisture data (from either sensors or models) have long been used as a scheduling aid, AI provides machine learning of how soil moisture responds to irrigation events in scenarios with different crops, soils, environmental conditions, etc. Tied to an irrigation control system, the AI machine can automatically implement control strategies that help minimize water usage, manage nutrient losses, or achieve more desirable or uniform soil moisture throughout the field.

In another system, AI learns the associations between available weather, crop and soil condition data, and the corresponding irrigation recommendations of a trained agronomist, thereby automating the repetitive aspects of the scheduling process.

In another embodiment, AI is used to determine how environmental factors influence the crops being irrigated. The learning machine can detect the nature of the relationship between air temperatures, soil moisture, and the daily growth of the plants. This relationship was determined by applying AI to plant test plot data, along with the weather and soil conditions experienced in those test plots. The AI-based system can quantify how air temperature drives plant growth, but also revealed how plant growth slows under dry conditions during warm temperatures. The model can foster the development of more efficient or productive management practices, including irrigation.

Advantages of the above aspects may include one or more of the following. The system leverages microbes to fight hunger, and is also seeking to upend the entire grains industry with an online marketplace that allows for buy-side quality specifications and identity preservation. The microbe-powered technology can be directly applied to soil or incorporated into fertilizer or embedded as seed coatings, and such delivery modes can increase nutrient delivery, provide pest protection, boost crop quality, and supplement the plant microbiome. For example, the microbes can be coated on the seeds for ease of use and the microbes help the seeds grow with ease and resistance to bugs/weather. The naturally-occurring bacteria positively affects crop performance. In addition to the organic seed coating is a comprehensive platform for agriculture built on a partnership model with growers. Using microbial yield boosting seeds as a wedge, the system provides growers the ability to significantly increase their profits and allow them to grow their crops in a sustainable manner. A de-risked business model creates a strong incentive alignment and pushes the technology to the farm at no risk to the grower. By offering growers a clear route to increased profitability. With alignment comes access to land, and with access to land comes the ability to implement IoT technology at a scale where it can achieve real ROI. Acting as the central platform for agriculture, Indigo partners with best-in-breed ag technology partners to deploy their technologies (both hardware and software) at scale. Furthermore, the data collected during the planting and growing seasons provide for visibility into the ag supply chain and continued improvement of the core microbiome solutions. By partnering with growers at the time of planting and providing agronomic support throughout the growing season, the AI engine can predict local yield data and supply volume well before harvest. The system can partner with grain buyers, ingredients processors, and CPG groups ahead of harvest to provide a differentiated supply of crops with premium characteristics, such as non-GMO or high protein content. The digital crop marketplace opens up a range of supply chain and sourcing possibilities that represent a significant improvement from the one-size-fits-all regime of industrialized agriculture. In doing so, consumers have more choices and the profits of the improved system are shared with the farmers.

BRIEF DESCRIPTION OF THE DRAWINGS

FIG. 3I shows an exemplary food product to be automatically characterized;

FIGS. 4A-4B show an exemplary process to recognize food products;

FIGS. 4C-4D shows another system to characterize root size and infer fertilizer and microbial levels in the soil to render application assistance to farmers based on product imaging;

FIG. 5A shows an exemplary process used by the eco-system of FIG. 1A.

DESCRIPTION

Methods and apparatus that implement the embodiments of the various features of the disclosure will now be described with reference to the drawings. The drawings and the associated descriptions are provided to illustrate embodiments of the invention and not to limit the scope of the invention.

FIGS. 1A-1F shows a typical journey from farm to table for wheat as an example. Farmers spend time planting seeds, checking for disease and monitoring plant health until harvest. Combines harvest the wheat kernels, which are then loaded into a semi-truck. The harvested grain is sold at market price to a local grain elevator. The elevator can store the grain until the right market price, or it can sell it. The harvested grain is sold at market price to a local grain elevator. The elevator can store the grain until the right market price, or it can sell it. Country elevators sell their grain to terminal elevators, which clean, separate and maintain the value of the grain. The grain is then sold to flour millers for domestic consumption, or it is loaded into ships bound for overseas markets. Country elevators sell their grain to terminal elevators, which clean, separate and maintain the value of the grain. The grain is then sold to flour millers for domestic consumption, or it is loaded into ships bound for overseas markets. The flour mills grind the grain into different types of flour—whole wheat, all-purpose, bread flour, etc. The mills can also use the flour to make ready-to-eat products. Both the flour and wheat products are shipped to grocery stores and other food retailers. The flour mills grind the grain into different types of flour—whole wheat, all-purpose, bread flour, etc. The mills can also use the flour to make ready-to-eat products. Both the flour and wheat products are shipped to grocery stores and other food retailers. Bakers and chefs also use flour to make a wide variety of delicacies. Consumers can either buy these products, or buy flour produced by the flour mills to make their own creations at home. Bakers and chefs also use flour to make a wide variety of delicacies. Consumers can either buy these products, or buy flour produced by the flour mills to create nutritious food for consumption by their family members.

Figure 1A:
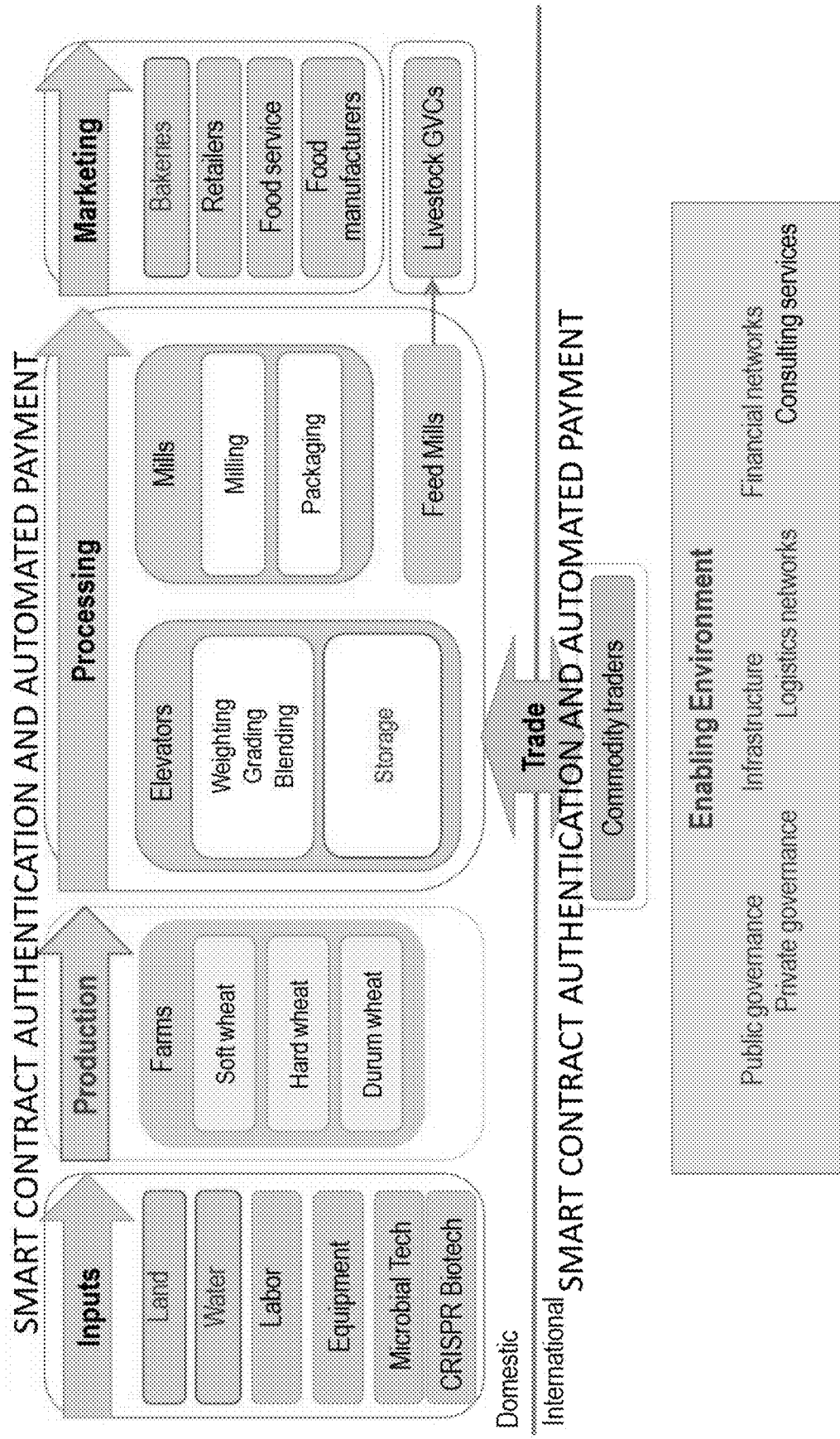
FIG. 1A-1F show an exemplary system for growing food and blockchain to track progress through the supply chain to the consumers.

An exemplary smart contract-based system handles enhanced plant protection/nutrition using microbial and/or CRISPR biotech solutions. In FIG. 1A, the technology enhanced ingredients are used by farms to grow crops and in one embodiment the enhanced plant growing materials are pre-financed so farmers only pay when they deliver the resulting crop to the next stage which is processing stage. The processing and marketing stages are enhanced using blockchain tracking of origin and grow parameters such as fertilizer material/crop and water condition, for example. Consumers benefit as they know exactly what and where food material is coming from and whether the food is sustainably produced. Processors/Marketers benefit in case of a recall, they can quickly pinpoint the source of contamination.

Figure 1B:
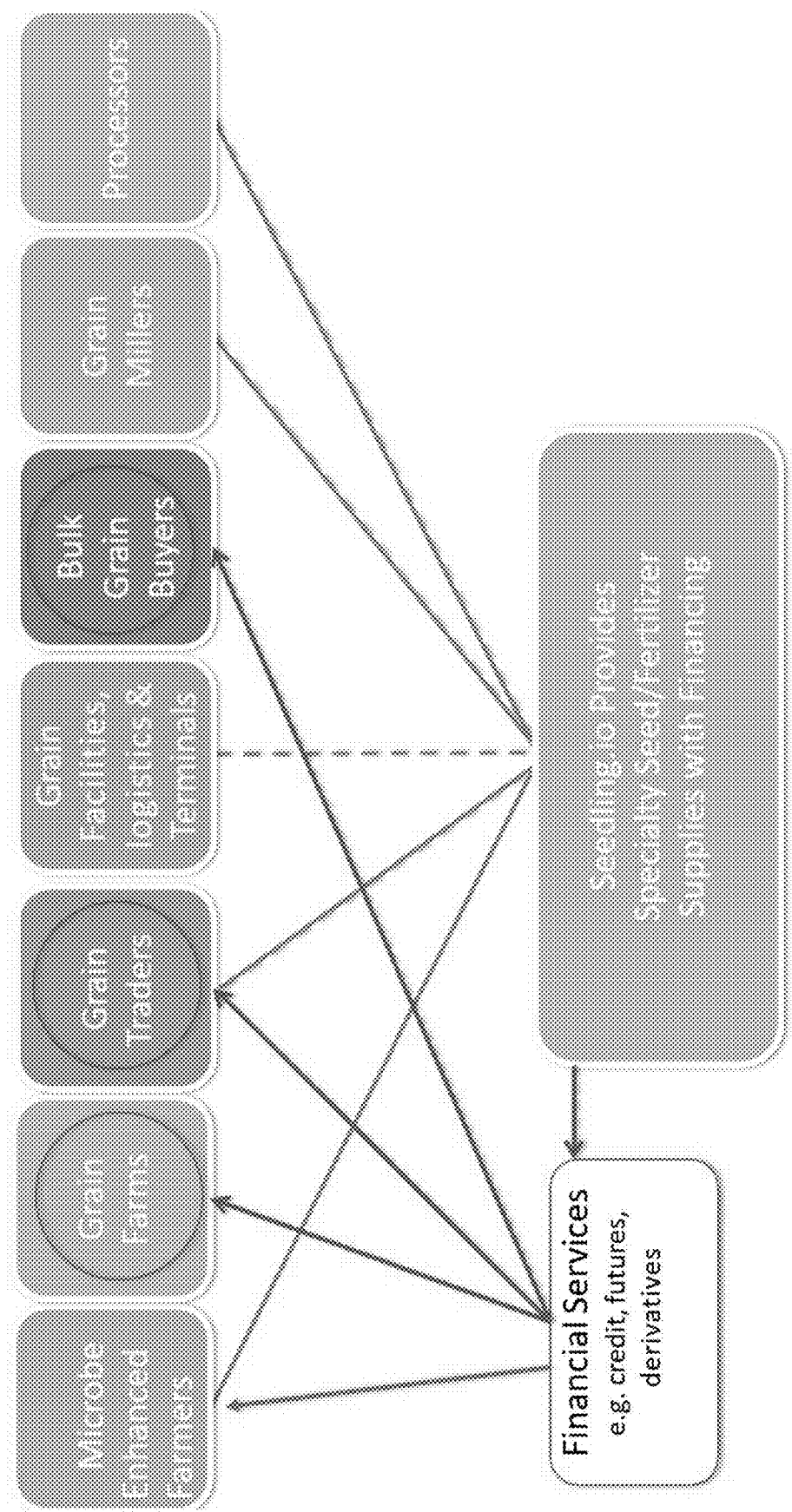

FIG. 1B shows an exemplary network to provide farmers with microbial soil amendment or microbe coated seed product to farmers like most ag input suppliers; instead the system enters into contracts with farmers, providing them with the seed at the start of the season and then purchasing their harvest for a guaranteed, premium price. This "cashless farming" approach helps farmers who are cash poor globally and there is limited information about whether new technologies work or not. The system provides ability for farmers to produce higher quality crops—such as wheat with high protein content or better milling quality—with an improved, more environment and health-friendly process that uses fewer chemicals or nitrogen, and traceability or identity preservation for end customers.

Figure 1C:
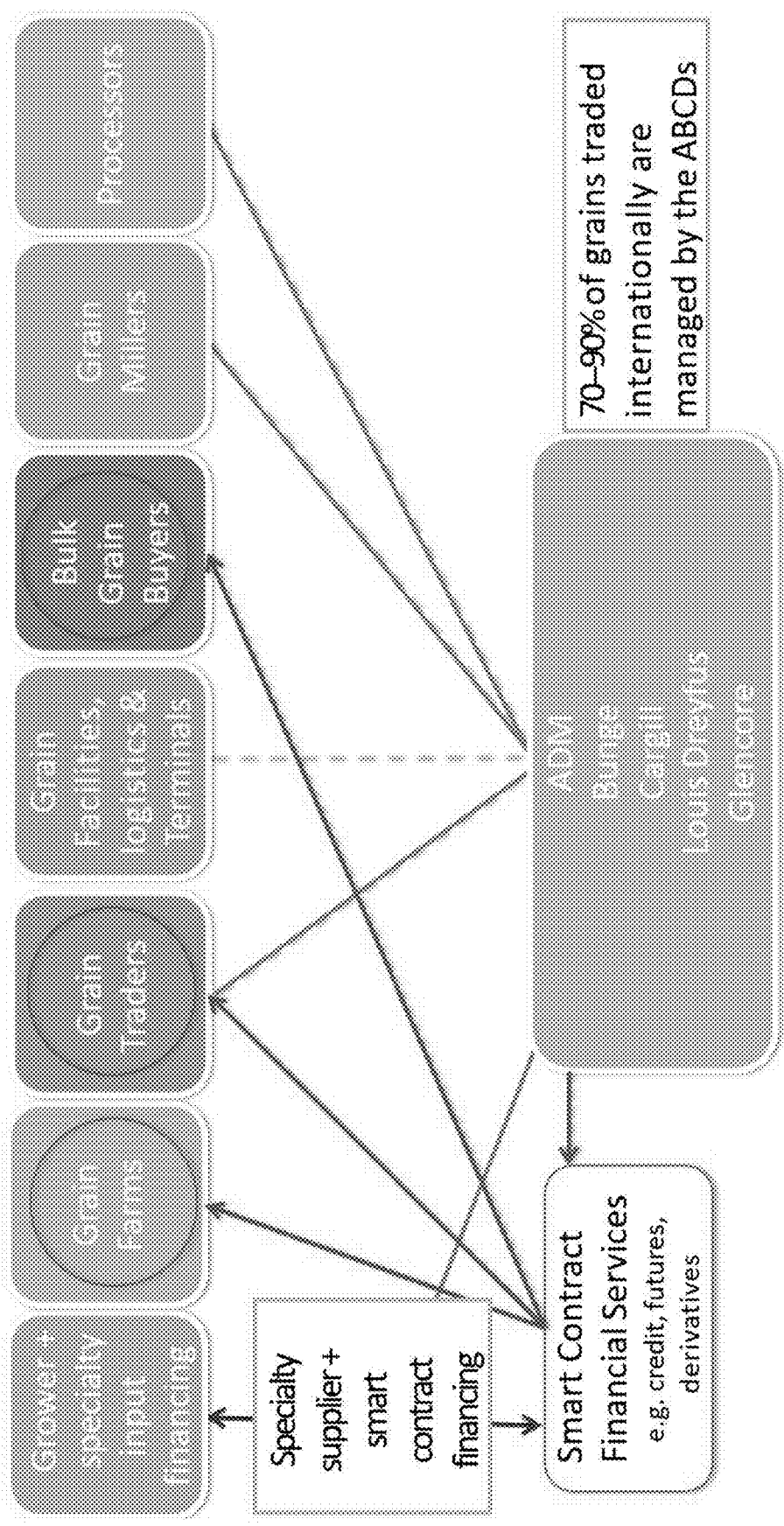
Figure 1D:
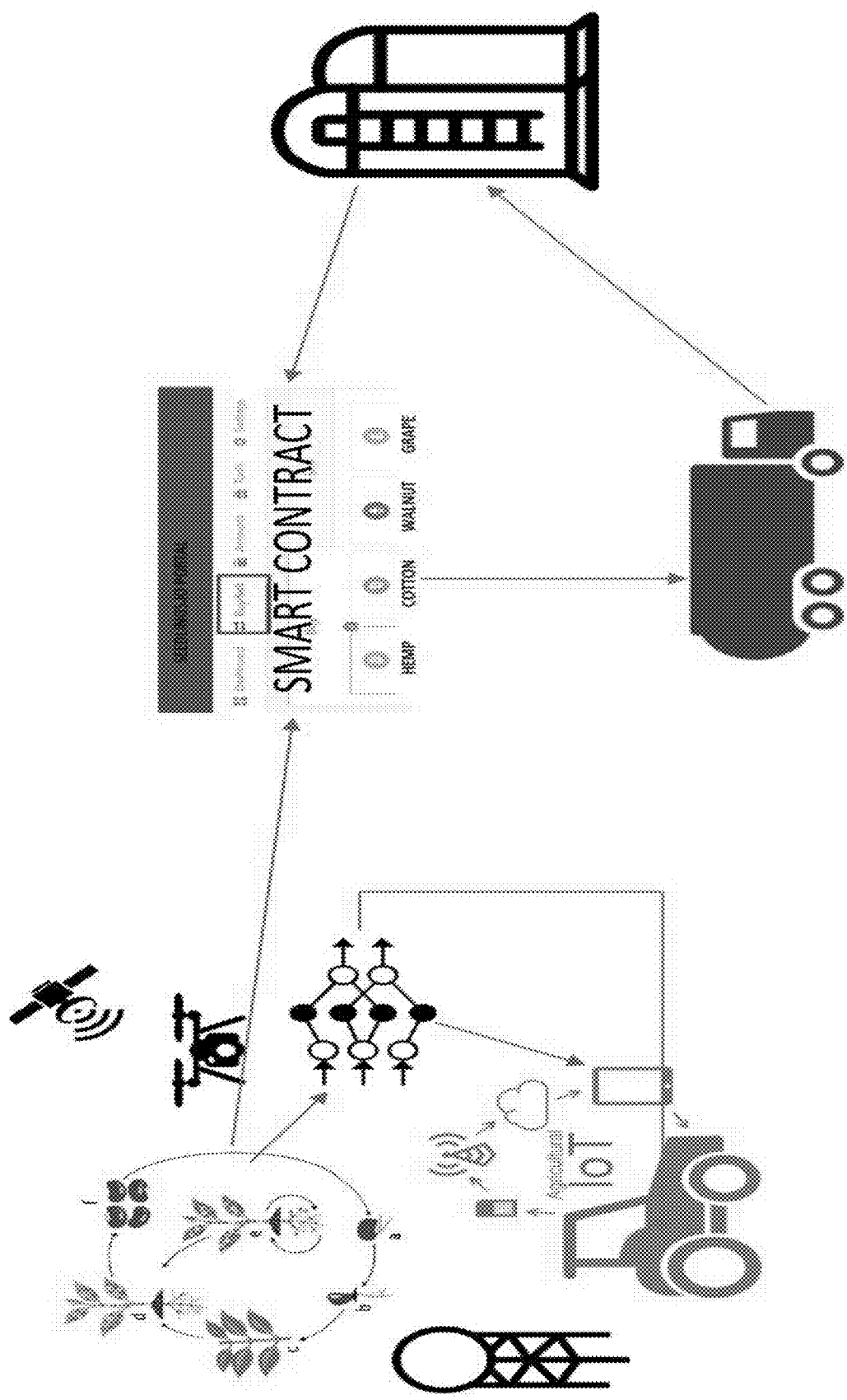

FIG. 1C is similar to FIG. 1B, except that instead of being the sole interface among interested parties, the system interacts with the grain distributors ADM, Bunge, Cargill, Louis Dreyfus, Glencore (ABCDs) to work with existing grain distribution systems. A typical journey from farm to table for wheat as an example. Farmers spend time planting seeds, checking for disease and monitoring plant health until harvest. Combines harvest the wheat kernels, which are then loaded into a semi-truck. The harvested grain is sold at market price to a local grain elevator. The elevator can store the grain until the right market price, or it can sell it. The harvested grain is sold at market price to a local grain elevator. The elevator can store the grain until the right market price, or it can sell it. Country elevators sell their grain to terminal elevators, which clean, separate and maintain the value of the grain. The grain is then sold to flour millers for domestic consumption, or it is loaded into ships bound for overseas markets. Country elevators sell their grain to terminal elevators, which clean, separate and maintain the value of the grain. The grain is then sold to flour millers for domestic consumption, or it is loaded into ships bound for overseas markets. The flour mills grind the grain into different types of flour—whole wheat, all-purpose, bread flour, etc. The mills can also use the flour to make ready-to-eat products. Both the flour and wheat products are shipped to grocery stores and other food retailers. The flour mills grind the grain into different types of flour—whole wheat, all-purpose, bread flour, etc. The mills can also use the flour to make ready-to-eat products. Both the flour and wheat products are shipped to grocery stores and other food retailers. Bakers and chefs also use flour to make a wide variety of delicacies. Consumers can either buy these products, or buy flour produced by the flour mills to make their own creations at home. Bakers and chefs also use flour to make a wide variety of delicacies. Consumers can either buy these products, or buy flour produced by the flour mills to create nutritious food for consumption by their family members.

Figure 1E:
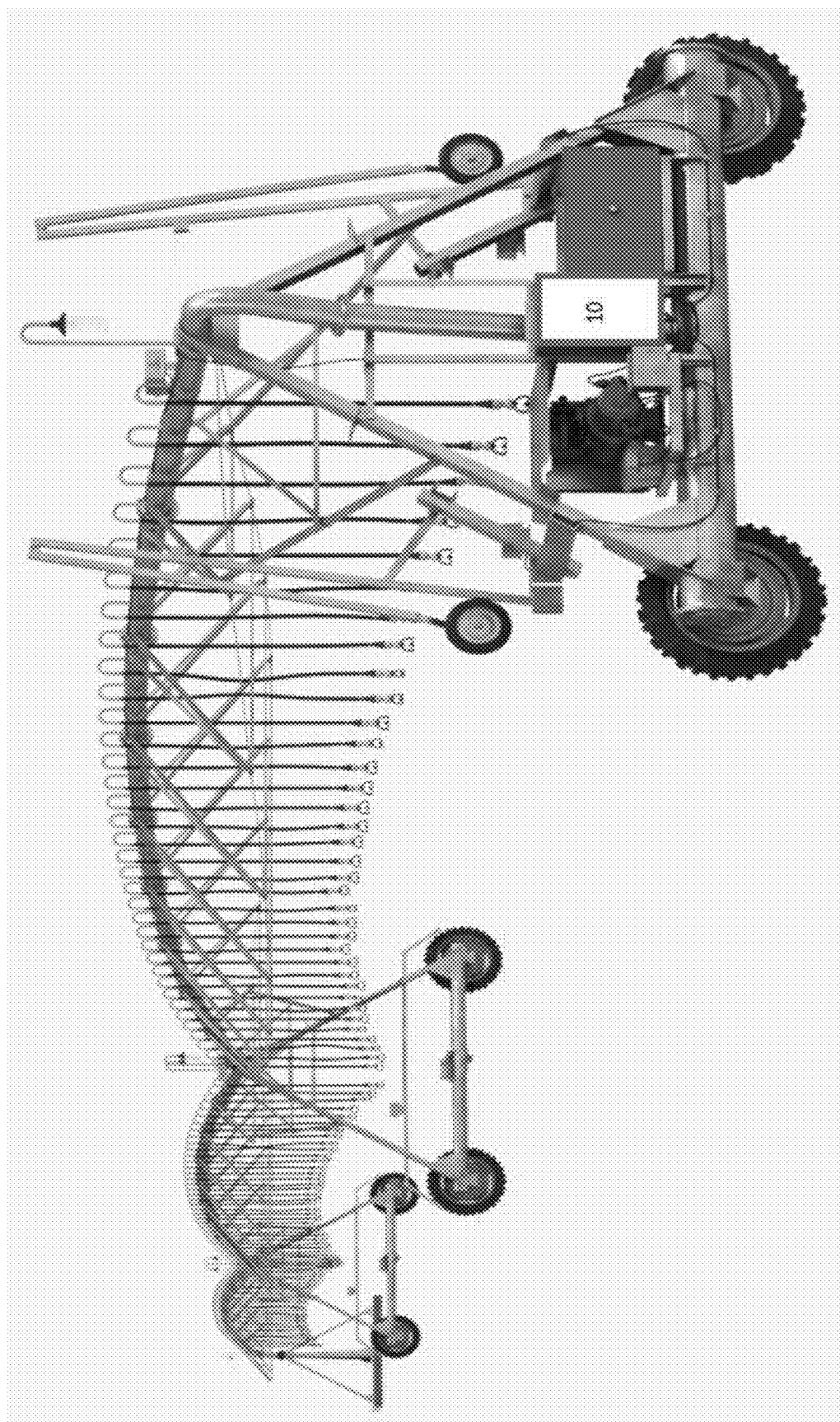
Figure 2:
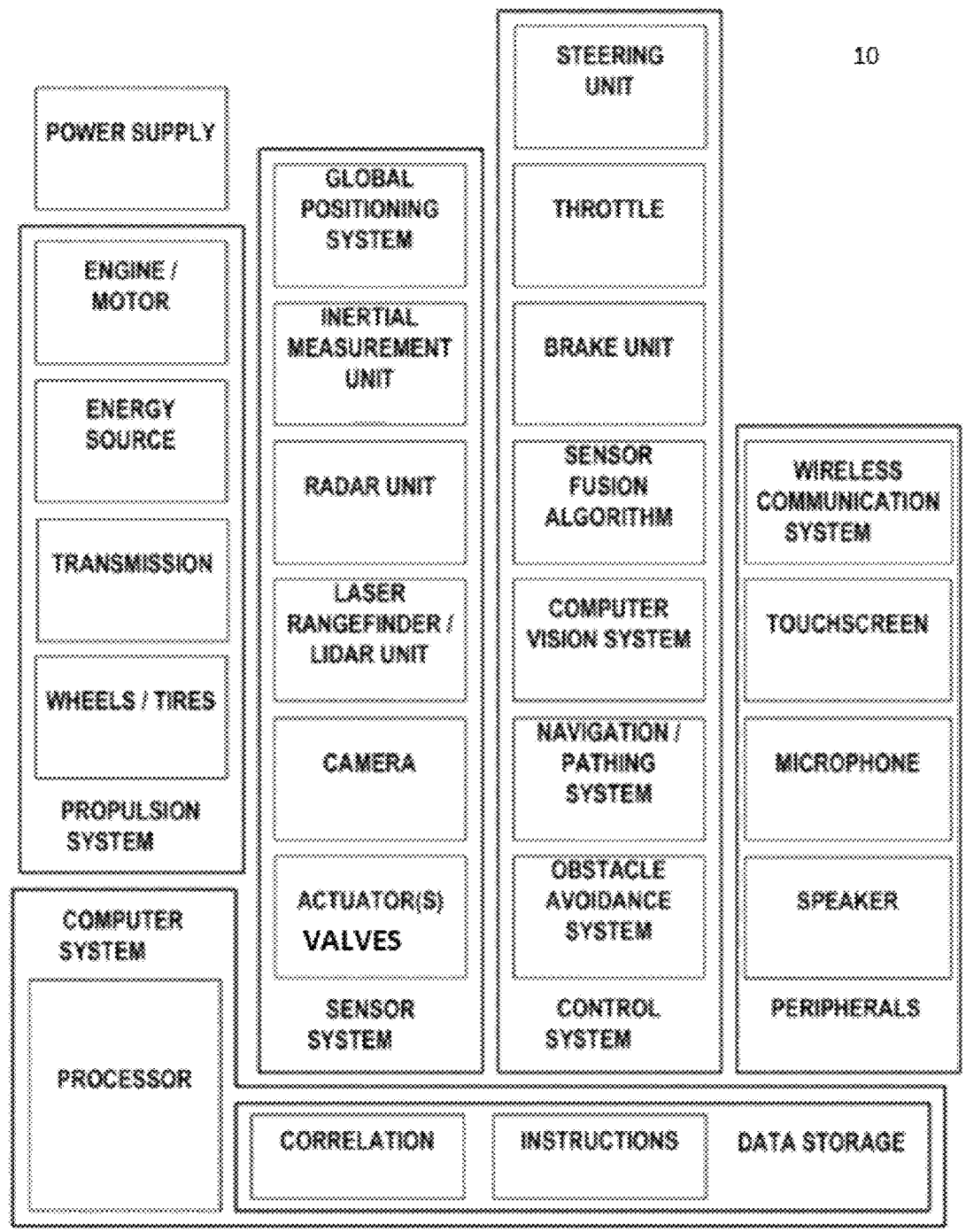
FIG. 2 shows an exemplary control electronic for smart farm equipment such as an autonomous tractor, truck, or harvester.
Figure 6:
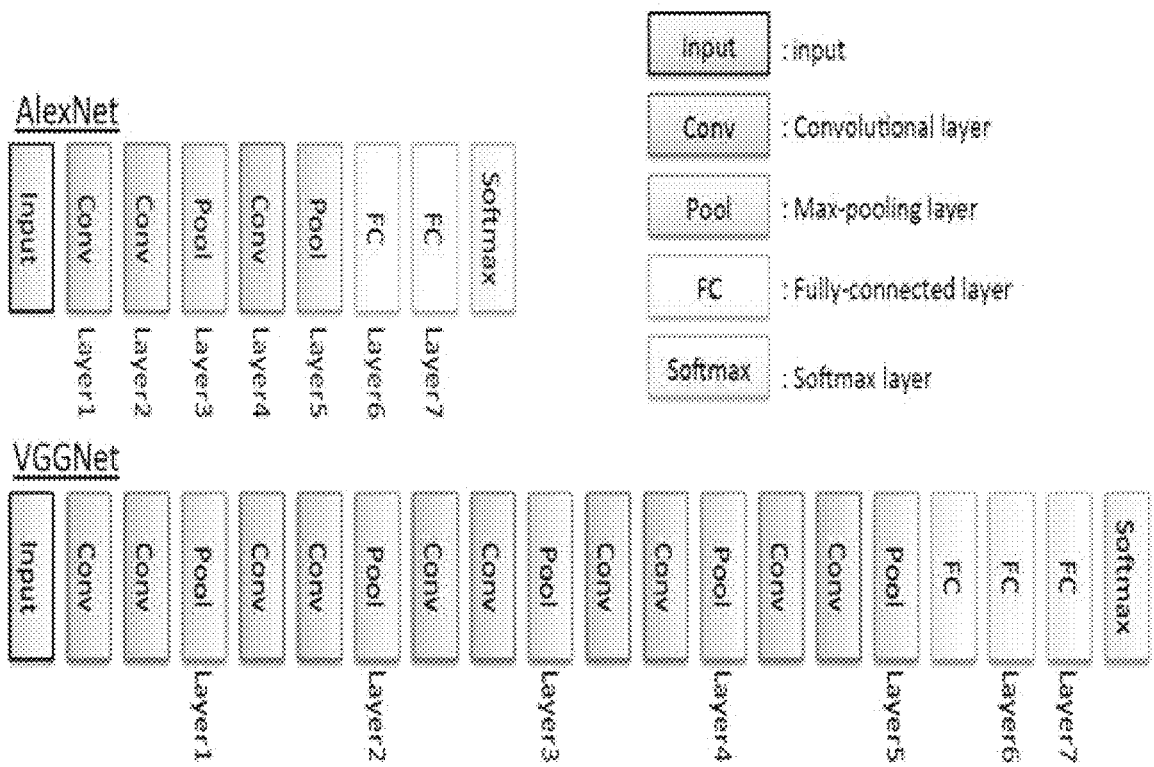
FIG. 6 shows exemplary learning machines.

FIG. 1E shows an exemplary smart farm monitoring system with AI/learning machine, detailed in FIG. 6. FIG. 2 shows an exemplary motorized irrigation system while FIG. 1G shows an exemplary smart farm electronic system. In FIG. 1E, farm equipment has a plurality of sensors to monitor crops with microbial soil amendment or microbe coated seeds supplied to farmers. Data is analyzed by a neural network or learning machine, such as those in FIG. 6, among others. The neural network in turn instructs the farmers/smart farming machinery to optimize production to meet the specification in a smart contract entered using portal such as the seedlings.io portal. The portal is a 2-way bid/ask system where farmers make offers of the products with particular product specifications. Buyers make offer on the goods based on the offer, and if the parties agree a smart contract is formed on the blockchain. The smart contract is then used to track the products from seeds through the growth cycle to finished crops. Then the farmer requests a ride-sharing service to have truckers move the goods from farms to the buyer's storage facility. Upon loading the product on the truck, the smart contract is activated and if the truck driver accepts the load and verify the compliance with contract requirements at delivery point by the buyer, the smart contract automatically releases funds to the farmer. The system can release cash, or cryptocurrency such as Bitcoin or Ether, a stable currency such as Tether, or a proprietary coin to be used only by members of the network of FIG. 1E for value exchange.

Figure 1F:
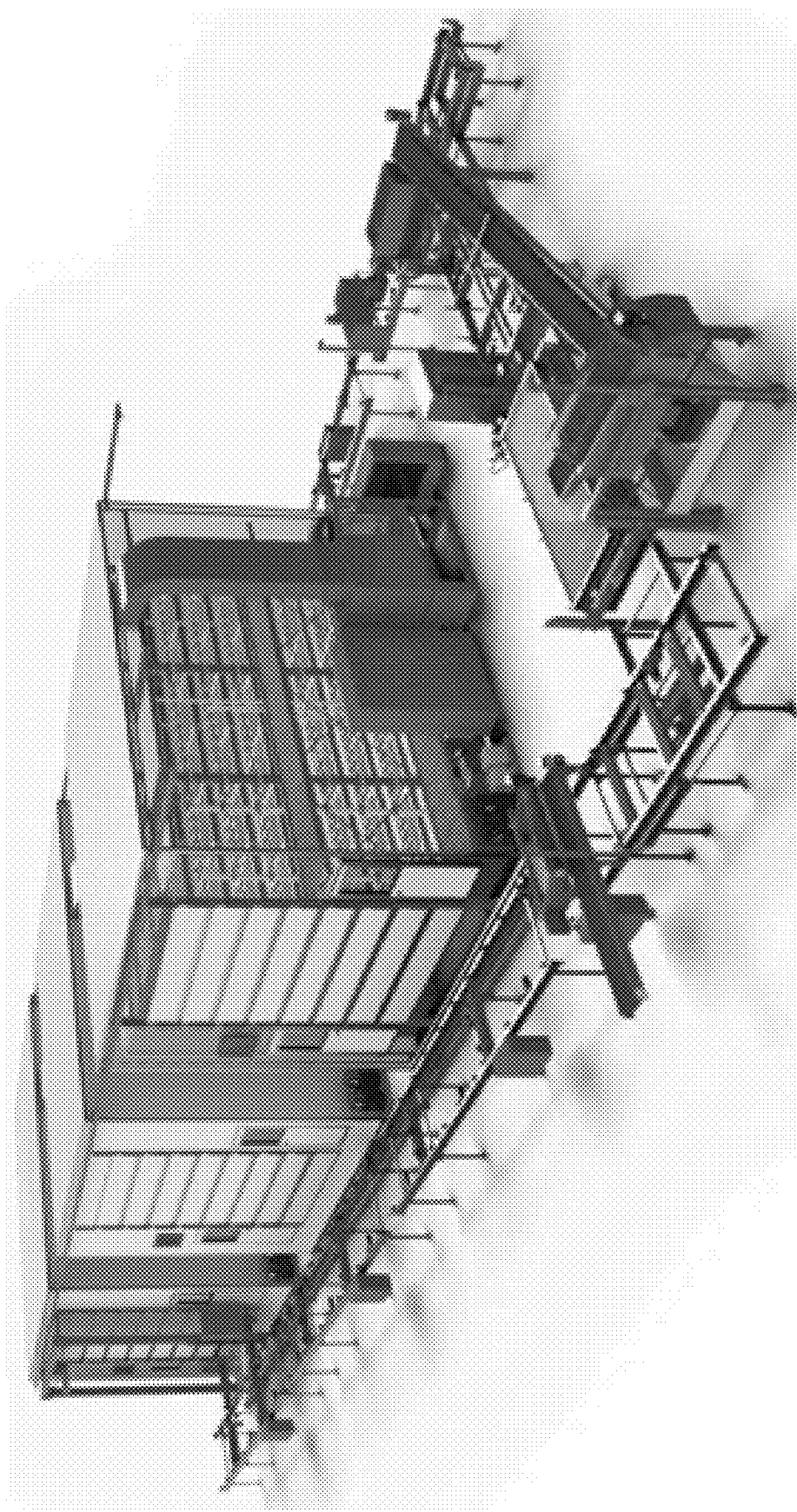

FIG. 1F shows an exemplary multilevel growing system using rolling benches, flood & drain watering and low voltage LED Lighting—all managed and controlled through a network such as WiFi or Modbus distributed network. For air, the insulated Climate Cell growing areas are monitored and managed to automatically ensure precise temperature and humidity levels as well as strong Biosecurity against all pests and diseases. For water, plant transpiration recovery integrated into the climate cell system greatly reduces total water consumption. A wide range of growing nutrients can be used in the Cannabis system with live microbe organic being our recommendation for high crop yields and maximum nitrate-free nutrition to customers. The system uses low-voltage LED Lighting system. The LED light rails are modular for simple maintenance and easy upgrades. Integrated water cooling promotes a typical luminaire lifespan of 3-5 years. The system can work with reusable LECA clay pebbles with the addition of ion chelate nutrient additive. The systems can also be configured for single use grow media including peat moss, biochar, coco peat or Rockwool as well as seedling mix substrates in trays. In a single system, sizes range from 1,700 ft$^2$ (158 m$^2$) total growing area right up to 47,620 ft$^2$ (4,424 m$^2$) total growing area. The climate cells are where the plants are grown. Each climate cell is an insulated, closed environment with a plurality such as 8 levels of growing benches. There are 4 sizes of climate cells available and there can be up to 7 climate cells in a single system. Each climate cell has an integrated vertical hoist at each end for the automatic loading and unloading of rolling benches that hold the grow media and plants. Every climate cell is automatically monitored and managed to maintain pre-set temperature, humidity, CO$^2$, watering and LED lighting levels to achieve optimum plant growth for the crop varieties planted. Any variation from presets or system function error is automatically identified, logged and reported by SMS text message or email. To automatically transfer rolling benches between the various modules there is a series of motorized transport rails controlled by the system network. This automated transport system efficiently and rapidly delivers benches to the various operations such as seeding, harvesting, grow media recovery, bench wash & sterilize or onto the climate cell vertical hoists—on command and when needed. A mechanical gravity seeder is integrated into the transport system. Supplied templates can be easily changed for different seed counts or seeding patterns suited to a wide range of crop varieties. As an option, the standard seeding system can be configured for either growing seedlings in cell trays or for transplanting young seedlings into the system for grow-out. Harvest times and end product quality are consistent and reliable, allowing growers to confidently commit to delivery schedules and off-take agreements. The growing areas are fully enclosed and climate controlled—completely removing external pressures such as disease, pest or predator attacks. Thes farms do not rely on fertile arable land and can be established in any climatic region globally—irrespective of seasonal daylight hours or extremes in temperature, the owner can grow year round. High thermal efficiency climate cells greatly reduce energy use for climate control. There is ~80% less air volume in the climate cells compared to the same size open-rack system in a warehouse. High-efficiency LED lighting does help reduce power usage for maximum plant growth and further the light is run in periods in stages to achieve a flat total power demand over a 24 hour period to save electricity cost as more power companies start to apply surcharges based on measured peak power demand. Through the use of green energy and the elimination of fossil fuel tractors, irrigation pumps and other horticultural equipment the systems can be structured as carbon emission competitive. The system lowers water usage—around 95% of all water a plant takes up is returned to the atmosphere through transpiration. The climate cells make the growing system a totally closed environment and plant transpiration can be recovered and reused inside the system. Including the water used for grow medium recovery and bench washing the Series still uses ~95% less water than typical open-field growing and around 20% less than a normal enclosed hydroponic growing system. The climate cells have strong natural biosecurity features to eliminate all insects, pest and disease pressure. Human contact with growing plants is eliminated until sorting & packing. Flood and Drain watering means dry leaves throughout the grow cycle—eliminating mildew and mold pressures. No sprays, pesticides or herbicides and no animal or human contact during growing means harvests are ready for processing immediately. These systems can be installed in any geographic location that offers suitable power and water supplies. Strategic positioning close to the point of sale or in distribution hubs dramatically decreases the time from harvest to consumer and also reduces costs for secure storage and transport.

Modules, as discussed herein, may contain a plurality of mechanical racking systems coupled to one or more of the floor, the ceiling, the walls, and/or a combination of the former. In some examples, the modules as discussed herein may contain one or more mechanical racking systems that are not coupled at all to a module. In some examples, the modules may be freestanding. Modules may further contain a plurality of horizontal racks, each individually referred to as a level.

Each level of a module may contain an integrated air flow management lighting system. An integrated air flow management lighting system may consist of a lighting apparatus. Additionally, a lighting apparatus may comprise one or more fluorescent lights, incandescent bulbs, halogen bulbs, high pressure sodium lamps, plasma lamps, LEDs, or another photon generating devices. The integrated air flow management lighting system may also include an air flow generator such as a duct fan, in-line fan, centrifugal fan, regenerative blower, or another mechanism for generating air flow. Additionally, the integrated air flow management lighting system may include an air duct that can be composed of transparent and/or reflective components. An air duct may also contain variable area vents that may allow air to flow through to the crop canopy at variable rates and volumes. Additionally, air vents may also be used to create, by being increased or decreased in size, turbulent, mixed, and/or laminar airflow. A particular airflow characteristic, such as turbulent, mixed, and/or laminar airflow, may be chosen by an operator of an integrated air flow management lighting system. In particular, an operator of the integrated air flow management lighting system may affect airflow within the integrated air flow management lighting system by modifying air vents within the system.

Each level may contain a system of plastic pipes known collectively as the irrigation system. The irrigation system may be used for delivering water, nutrients, dissolved oxygen, and any other of a variety of soluble requirements including beneficial bacteria, sterilizing agents, oxidizing agents, signaling molecules and more as well as any other beneficial chemicals or inputs via the open air within to the plants. The irrigation system may be used to provide inputs to the root system of the crops. Modules may include a system of plumbing that may be used for at least one of pumping water to each level of crops, recapturing that water, sterilizing and dosing that water, and recirculating it back to each level of crops, collectively referred to as the recirculating system. One or more levels may be supplied via a 24V ball valve. In examples, one or more levels may be drained using an additional 24V ball valve. In examples, a system, such as the system described, may allow for the precise control of at least one of: inflow rate, inflow time, rest time, outflow rate, outflow time, and/or frequency of watering. Precise control over irrigation in a hydroponic system may be used to obtain optimal crop growth. In examples, this system may allow each level to be irrigated independently. This may enable multiple crops to exist in the system and receive precise targeted irrigation based on their stage of growth, crop type, desired traits, and/or other factors.

In examples, modules may include a system for monitoring and controlling the ambient environment including the temperature, relative humidity, and/or partial pressure of $CO_2$. Environmental control may be one of the most important aspects of an indoor growing system. Precise control of temperature and humidity may be important, or even essential, to optimal growing. An apparatus as describe herein may accomplishes this using a commercial heat pump with refrigerant, condenser, evaporative coil, industrial blower, electric heater, and/or fans. This system may allow for efficient cooling and dehumidifying of the system. A module may also include custom controls that may allow refrigerant to be pumped through the evaporative coil at a variable rate. This may increase the dehumidifying range and reduce or eliminate the need for re-heat dehumidifying, thereby increasing overall efficiency and/or reducing cost. Alternatively, a ventilation heating system for controlling temperature and humidity can be a ventilation heating system for controlling temperature and humidity of a facility house installed in a facility house and controlling the temperature and humidity inside, And an air circulation module installed inside the main body case for sucking air and circulating the air through the inside of the main body case to discharge the air introduced through one side of the main body case And a control module for selectively controlling the heating module according to temperature and humidity in the facility house. The air circulation module includes an air circulation fan attached to one surface and the other surface of the main body case for circulating air through suction and discharge, a motor for driving the air circulation fan. The motor is a rotation speed variable type motor, and the guide is formed of a corrugated tube so that the direction of the air can be adjusted according to the installation place. Also, temperature and humidity sensors are installed on the ground and upper part of the facility house, and temperature and humidity inside the facility house are checked in real time through the temperature and humidity sensor and transmitted to the control module. The environmental control system may be mounted in the ceiling. In additional examples, the environmental control system may be attached to one or more components of the module. In other examples, the environmental control system may be freestanding within the module. In examples, the environmental control system may capture and recycle any condensed water back to the recirculating system, thereby reducing the overall water usage. The module may include a control system for controlling intake and/or exhaust fans. The control of intake and/or exhaust fans may be used to modulate the uptake of external air. Introducing external air may be used as an effective way to cool the module in cold weather climates, thereby reducing cooling costs and/or improving overall efficiency. External air can also include high levels of CO2, which can be introduced to reduce supplemental CO2 usage further reducing costs.

Modules may include a system for monitoring and controlling the water quality including the water temperature, pH, EC, Calcium, Chloride, Potassium, Sodium, Ammonium, Magnesium, Nitrate, Phosphate and/or dissolved oxygen for 4 independent reservoirs. A module may include more or less reservoirs as required by the growing operation. Control over water conditions may be essential for optimal plant growth. A module may use a system of distributed control "pucks" for monitoring and control of the water conditions. This may allow monitoring and/or control to be completed wirelessly. Wireless monitoring and/or control may dramatically reducing upfront costs of manufacturing. Additionally, each puck may monitor and/or control a single reservoir, further increasing the robustness of the system by creating redundancy and ensuring that no single electronic failure results in crop loss. The module may include a drainage system that allows waste water to be consolidated into a single outlet.

Plant growing variables are monitored using a variety of commercial sensors. These values may then be integrated into proprietary control algorithms that control dosing pumps for each ion, ozone, UV, and an in line water chiller. A module can incorporate all of these sensors and actuators, none of them, or a combination based on the required control for a given growing operation. Precise control over each ion is achieved using a salt mixture of each ion in an independent tank with a dosing pump or other dosing mechanism connected to each of the independent reservoirs. This may enable the grower to optimize the growing environment to a specific crop in real time using software changes only. As such, a grower can go from one crop to a different crop without any adjustment to the operating procedures or the fertilizer mixtures. This may be advantageous as a grower transitions crops within a farm and this combined with individual control of irrigation to each level enables a grower to grower many different crops in a single module all under optimal conditions or to custom tailor the irrigation and fertilizer content to a specific stage of crop growth. Furthermore, this control over individual ions allows the grower to adjust fertilizer mixtures precisely without dumping the hydroponic solution to rebalance the mixture. This may save additional costs and may improve crop yields.

The module may include a system for controlling the intensity of white, blue, and red light on each level independently via a pulse width modulating control puck. This example of a control method may allow precise control over white, blue, and red intensities on each level to within a percentage. Precise control over light spectrum may enable the grower to optimize the photosynthetic efficiency of each crop. Control may also be achieved by a number of other methods including I2C or serial communication, 0-10V, 0-20 mA, or any other analog protocol or any other digital communication method. Each different type of crop that performs optimally under different red, blue, green conditions, and a single crop may perform differently across different stages. Furthermore, plants may be exceedingly sensitive to different light spectrums, and spectrum design can dramatically affect the morphology of the crop. As such, precise control over light spectrum may enable the grower to optimize lighting not just to increase yield but also to drive other crop characteristics such as leaf shape, density, nutrient content, and/or antioxidant levels, etc.

The system supports multiple crops at very different stages in a single system. For example, a single system may have a youngest crop; a middle crop; and an oldest crop. The youngest crop maybe between 0 and 15 days old, and may be referred to as "propagation." The middle crop may be between 15 and 30 days old, and may be referred to as "seedling." Additionally, the oldest crop may be between 30 and 45 days old, and may be referred to as "finishing." A challenge of having a single system for crops in multiple stages of growth is that different crop stages may require different, or very different, watering schedules, volumes, intensities, etc. as well as very different fertilizers. Given this, the ability to control the irrigation at each level of a module, and/or to be able to water from different reservoirs, may enable the grower to have multiple crops in a single module while still optimizing the irrigation for each stage. Not having this control may result in dramatically overwatering the younger crops in order to provide the finishing crop with enough water, effectively reducing overall yields and increasing costs. In examples, a system as described herein may be designed with a feed on one side of the tray and a drain on the opposite side, each with an automated valve. The valves can be 24V ball valves, as in the specified system, or another style of valve. In additional examples, additional ways of controlling voltage may be provided.

One embodiment applies the growing cells to grow fodder. The fodder system automatically sterilises, replants and regrows one of the integrated growing areas inside the machine. In many livestock situations sprouted Barley fodder can be an economically beneficial feed source for a wide range of animals. Grown using quality nutrients and live microbiology, fresh Barley fodder provides a valuable source of nutrition, particularly when pasture or costly grain supplements are of low quality or availability. Automatic seeding, soaking, growing, harvesting is done, and automatic equipment sterilization cycle is performed between plantings. The system provides a bio-secure growing environment with automatic temperature and humidity control using a positive pressure air blowing system that keep external contaminants outside. Automated LED lighting control, nutrient dispensing and watering is done with simple intuitive touchscreen controls. The system can send text text message for low-levels of grain, nutrients or adverse growing conditions. Live microbiology nutrients are used to eliminate mold and fungus without chemicals. One embodiment uses a shipping container that is CSC compliant 20' container as a Service Module that houses the electrical system, climate control system, 14-day grain silo, water tank, pumps and nutrients. The Grow Module is a CSC compliant 40' Hi Cube container linked to the Service Module by quick connect flexible ducts and cable. The Grow Module is monitored and managed for temperature and humidity and fitted with 6 levels of automated growing areas incorporating watering and energy-efficient LED lighting.

FIG. 2 shows an exemplary data driven autonomous irrigation system. The embodiment is a central pivot irrigation system and broadly has a fixed central pivot and a main section pivotally connected to the central pivot. The irrigation system may also comprise an extension arm (also commonly referred to as a "swing arm" or "corner arm") pivotally connected to the free end of the main section. The irrigation apparatus 12 may also be embodied by a lateral, or linear, move apparatus. The fixed central pivot may be a tower or any other support structure about which the main section may pivot. The central pivot has access to a well, water tank, or other source of water and may also be coupled with a tank or other source of agricultural products to inject microbes, fertilizers, pesticides and/or other sustainable materials into the water for application during irrigation. The central pivot may supply water to a conduit which carries the water along the length of the main section which may have any number of mobile support towers, the outermost serving as an end tower. The mobile towers have wheels, at least one of which is driven by suitable drive motors, each motor turns at least one of its wheels through a drive shaft to propel its mobile tower and thus the main section in a circle about the central pivot to irrigate a field.

Each of the truss sections carries or otherwise supports the conduit and other fluid distribution mechanisms that are connected in fluid communication to the conduit. Fluid distribution mechanisms may include sprayers, diffusers, or diffusers, each optionally attached to a drop hose, or the like. In addition, the conduit may include one or more valves which control the flow of water through the conduit. The opening and closing of the valves may be automatically controlled with an electronic signal or digital data. The irrigation apparatus may also include wired or wireless communication electronic components that communicate with the communication network and allow the valves and the motors to receive the electronic signals and/or digital data which control the operation of the valves and the motors.

The irrigation apparatus may also include an optional extension arm (not shown) pivotally connected to the end tower and may be supported by a swing tower with steerable wheels driven by a motor. The extension arm may be joined to the end tower by an articulating pivot joint. The extension arm is folded in relative to the end tower when it is not irrigating a corner of a field and may be pivoted outwardly away from the end tower while irrigating the corners of a field.

The irrigation system controls the motors on the wheels using controller 10, which is detailed in FIG. 2. In one embodiment, the irrigation apparatus also includes an alignment control system for maintaining alignment of the mobile towers while minimizing simultaneous power usage of the mobile tower drive motors. The alignment control system will not be discussed in depth but may be implemented with hardware, software, firmware, or combinations thereof. The irrigation apparatus may further include one or more sensors which measure the amount of water delivered from the irrigation apparatus to the crop. The sensors may communicate with the communication network to report the amount of delivered water.

Another system includes a frame, water valves attached to the frame to dispense water to crops in the field, cameras and position sensors to capture field data, and a processor to control movement of the frame to move around a field for irrigation.

Implementations of the system includes a plurality of cameras mounted on the frame. A number of sensors such as IoT (internet of things) sensors can share data with other vehicles and that can communicate with the cloud to provide intelligent handling of the irrigation system. The system can navigate on its own to the next point to be irrigated after completing work in the current area.

Another system includes a motorized frame to move in a field, cameras and sensors to capture field data, and machine learning to monitor and manage problems in field. One implementation can identify weeds and chemical-free methods of reliably eradicating weeds. Another implementation can detect underwatered or overwatered plants. Another embodiment data using a plurality of RGB cameras and other optional sensors, including LiDAR.

The system helps in farming productive and sustainable crop varieties by collecting high-value data from crop breeding and trial fields. The system is providing under canopy crop scouting information in production fields, which enables growers to manage their fields for better yields and profitability. The system also solves critical problems like herbicide-resistant weeds with mechanical weeding by the robots in large fields.

In another system to monitor weather, another system includes a motorized frame to move in a field, cameras, temperature sensors, and other sensors to capture field data, and machine learning to monitor and manage problems in field. One implementation can collect weather data like hail, wind, rainfall, and temperature, which can be placed in fields to assist in data-driven field decisions. One embodiment supplements local weather data with external sources like satellites and radar. This embodiment can correct for what is being provided in the public realm through satellites and radar—making it more precise and accurate—by fusing it with the insight gleaned from irrigation ground-based stations.

Another irrigation solution includes master irrigation autonomous vehicle and a number of autonomous irrigation vehicles each moving similar to a bird in a flock and following the master irrigation vehicles in watering a large farm. One implementation can identify weeds and chemical-free methods of reliably eradicating weeds. Another implementation can detect underwatered or overwatered plants. Another embodiment data using a plurality of RGB cameras and other optional sensors, including LiDAR.

The system helps in farming productive and sustainable crop varieties by collecting high-value data from crop breeding and trial fields. The system is providing under canopy crop scouting information in production fields, which enables growers to manage their fields for better yields and profitability. The system also solves critical problems like herbicide-resistant weeds with mechanical weeding by the robots in large fields.

FIG. 2 shows the control unit 10 in more details. The system employs a processor with various sensors such as cameras, soil sensors, leaf analytics, GPS/Position sensors, wind sensors, among others. The processor analyzes soil condition, water condition and makes decisions on watering requirements. The processor enables the irrigation unit to be autonomous in traveling and dispensing water. A fleet of irrigation can be used, and a flock of bird approach can be used where the irrigation units coordinate with each other in watering the farms. In one embodiment, the cameras can detect if the crops are diseased or under attack from locusts or harmful pests and initiate dispensing of insect repellants. In another embodiment, the cameras can detect fertilizer deficiency and initiate dispensing of fertilizer and/or microbe combinations. Field data is captured by wireless transceiver, which sends status of components in the system to a remote computer. The wireless transceiver can be WiFi for low cost, or 5G for long range communication of maintenance information to a remote computer. If needed, the remote computer orders a repair part based on the maintenance information and schedules a visit to a repair facility to install the repair part.

The processor controls the water dispensing through valves on the irrigation unit. The incoming water quality can be analyzed through various sensors. Water Quality Sensors can capture various water quality measures such as conductivity, dissolved oxygen, groundwater, multiparameter, pH, sonde, stormwater, turbidity, water quality, water temperature. On embodiment captures Ambient Light/PAR. PAR stands for Photosynthetically Active Radiation, and is a specific type of ambient light. An ambient light sensor is also a PAR sensor. Ambient light measurement, in the context of water quality monitoring, is a measurement of sunlight intensity at a certain point in the water column. Sunlight intensity influences biota that relies on photosynthesis for nutrition. This includes photosynthetic phytoplankton (green and blue-green algae, some diatoms), and both submerged and emergent macrophytes (larger plants that grow underwater or partially underwater). Cyanobacteria, AKA blue-green algae, are common forms of photosynthetic bacteria present in most freshwater and marine systems. In case of cyanbacterial blooms, some species can produce toxins called cyanobacteria that can cause health risk to humans and animals. Cyanobacteria blooms also present an unpleasant appearance, taste and odor in water.

Another embodiment measures Chlorophyll-a, the green pigment that is responsible for a plant's ability to convert sunlight into the chemical energy needed to fix CO2 into carbohydrates. Monitoring of Chlorophyll-a helps understand the water. The system can monitor parameters such as Dissolved Oxygen and pH at the same time as their Chlorophyll measurements.

Another embodiment measures Conductivity/TDS. Electrical conductivity sensors are used to measure the ability of water to carry an electrical current. Absolutely pure water is a poor conductor of electricity. Water shows significant conductivity when dissolved salts are present. Over most ranges, the amount of conductivity is directly proportional to the amount of salts dissolved in the water. The amount of mineral and salt impurities in the water is called total dissolved solids (TDS). TDS is measured in parts per million. TDS tell how many units of impurities there are for one million units of water. For example, drinking water should be less than 500 ppm, water for agriculture should be less than 1200 ppm, and high tech manufactures often require impurity-free water. One way to measure impurities in water is to measure the electric conductivity of water. A conductivity sensor measures how much electricity is being conducted through a centimeter of water. Specific conductivity is expressed as mhos per centimeter (M/cm), sometimes called siemens per centimeter (S/cm). Because a mho (or siemen) is a very large unit, the micromho (microsiemen) or millimho (millisiemen) typically is used (mS/cm).

Another sensor takes Dissolved oxygen (DO) measurements which detect how much oxygen is available in the water for fish and other aquatic organisms to breathe. Healthy waters generally have high levels of DO. DO sensors use an oxygen-permeable membrane that sets up a current that indicates the level of oxygen present. These sensors often can read DO in the range of saturation (about 8 ppm) down to the part per billion (ppb) range. Several factors can affect how much DO is in the water. These include temperature, the amount and speed of flowing water, the plants and algae that produce oxygen during the day and take it back in at night, pollution in the water, and the composition of the stream bottom (gravelly or rocky bottoms stir up the water more than muddy ones do, creating bubbles that put more oxygen into the water).

Another sensor is pH which is measured to determine the activity of hydrogen ions [H+] in a solution (the p stands for "potential of" and the H is hydrogen). A pH sensor measures how acidic or basic the water is, which can directly affect the survival of aquatic organisms. pH ranges from 0 (very acidic) to 14 (very basic), with 7 being neutral. Most waters range from 5.5 to 8.5. Changes in pH can affect how chemicals dissolve in the water and whether organisms are affected by them. High acidity (such as pH of less than 4) can be deadly to fish and other aquatic organisms. A pH sensor uses an electrode with hydrogen ion selective glass membrane that measures the difference in electrical potential between the sample and a reference electrode. The electrical potential is proportional to the hydrogen ions and must be corrected for temperature or the instrument may contain an automatic temperature compensation circuit.

Oxidation Reduction Potential (Redox) can be detected. ORP measurements are used to monitor chemical reactions, to quantify ion activity, or to determine the oxidizing or reducing properties of a solution. The ORP is greatly influenced by the presence or absence of molecular oxygen. Low redox potentials may be caused by extensive growth of heterotrophic microorganisms. Such is often the case in developing or polluted ecosystems where microorganisms utilize the available oxygen.

Turbidity is measured to determine the clarity of the water or in other words, how many particulates are floating around in the water, such as plant debris, sand, silt, and clay, which affects the amount of sunlight reaching aquatic plants. Such particulates in the water are often referred to as total suspended solids (TSS). Excess turbidity can reduce reproduction rates of aquatic life when spawning areas and eggs are covered with soil. Turbidity measurements are often used to calculate the inputs from erosion and nutrients. Turbidity or TSS sensors are used to measure the clarity of the water. Turbidity meters ascertain this reading using one of several methods. One technique is to pass a beam of light through the sample, with the amount of light absorbed being proportional to the turbidity. This method does not work well for highly colored or very turbid samples. Most other methods measure light that is reflected either directly from the sample or off its surface. The amount of scattered light, which can be measured at various angles, is proportional to the turbidity. Turbidity is most commonly measured in Nephelometric Turbidity Units (NTU) but is sometimes measured in Jackson Turbidity Units (JTU).

The system can detect total dissolved gas (TDG) is the amount of total gaseous compounds dissolved in a liquid. TDG is measured in units of pressure; this pressure includes the partial pressure of all gas species dissolved in the water. Measuring TDG is important in knowing the extent of saturation of a water body. Turbidity is measured to determine the clarity of the water or in other words, how many particulates are floating around in the water, such as plant debris, sand, silt, and clay, which affects the amount of sunlight reaching aquatic plants. Such particulates in the water are often referred to as total suspended solids (TSS). Excess turbidity can reduce reproduction rates of aquatic life when spawning areas and eggs are covered with soil. Turbidity measurements are often used to calculate the inputs from erosion and nutrients. Turbidity or TSS sensors are used to measure the clarity of the water.

A Chlorine Residual Sensor can be used for measuring chlorine residual in drinking water treatment plants and distribution systems. Chlorine is the most widely used disinfectant because of its efficiency and cost. Chlorine sensors measure free chlorine, monochloramine, and total chlorine.

One embodiment includes navigation systems and may feature an integrated global positioning system (GPS) and inertial navigation system (INS) navigation system or other navigation system. The use of only an INS or only a GPS receiver as the sole source of navigation information is also contemplated. Alternatively, the wireless communication device can triangulate with two other fixed wireless devices to generate navigation information. The INS supplies the processor with navigation information derived from accelerometers and angular position or angular rate sensors. The processor may also provide the INS with initial position data or periodic position updates that allow the INS to correct drift errors, misalignment errors or other errors. The INS may be a standard gimbal or strapdown INS having one or more gyroscopes and substantially orthogonally mounted accelerometers. Alternatively, the INS may have accelerometers and microelectromechanical systems (MEMS) that estimate angular position or angular rates. The INS and the GPS receiver are complementary navigation systems. The INS is very responsive to changes in the trajectory of the system. A steering or braking input is sensed very quickly at the accelerometers and the angular position sensors. INS position and velocity estimates, however, are derived by integrating accelerometer measurements and errors in the estimates accumulate over time. The GPS receiver 206 is not generally as responsive to changes in automobile trajectory but continually estimates position very accurately. The wireless communication device receives the navigated state vector from the processor. The wireless communication device device broadcasts this state vector for use by neighboring farm units. The state vector may have more or less elements describing the state of the irrigation system such as the XYZ position and 3D velocity of the irrigation system and 3D acceleration. Other information may be provided. For example the state vector may contain entries that describe the angular position, the angular rates, and the angular accelerations. The state vector may be described using any coordinate system or any type of units. The state vector may also contain information about the irrigation system such as its weight, stopping distance, its size, its fuel state etc. Information packed in the state vector may be of value in collision avoidance trajectory analysis or may be useful for generating and displaying more accurate display symbology for the driver. For example, the automobile may receive a state vector from a neighboring irrigation system that identifies the irrigation system as an eighteen wheel truck with a ten ton load. Such information may be important for trajectory analysis and for providing accurate and informative display symbology.

The wireless communication device may be part of a local area wireless network such as an IEEE 802.11 network. The local area network may be a mesh network, ad-hoc network, contention access network or any other type of network. The use of a device that is mesh network enabled according to a widely accepted standard such as 802.11(s) may be a good choice for a wireless communication device. The wireless communication device may also feature a transmitter with low broadcast power to allow automobiles in the area to receive the broadcast signal. The broadcast of state vectors over a broad area network or the internet is also contemplated.

The GPS may be any sensor configured to estimate a geographic location of the irrigation system. To this end, the GPS may include a transceiver configured to estimate a position of the irrigation system with respect to the Earth. The GPS may take other forms as well.

The IMU may be any combination of sensors configured to sense position and orientation changes of the irrigation system based on inertial acceleration. In some embodiments, the combination of sensors may include, for example, accelerometers and gyroscopes. Other combinations of sensors are possible as well.

The RADAR unit may be any sensor configured to sense objects in the environment in which the system is located using radio signals. In some embodiments, in addition to sensing the objects, the RADAR unit may additionally be configured to sense the speed and/or heading of the objects. Similarly, the laser rangefinder or LIDAR unit may be any sensor configured to sense objects in the environment in which the irrigation system is located using lasers. In particular, the laser rangefinder or LIDAR unit may include a laser source and/or laser scanner configured to emit a laser and a detector configured to detect reflections of the laser. The laser rangefinder or LIDAR may be configured to operate in a coherent (e.g., using heterodyne detection) or an incoherent detection mode. In one embodiment, a LIDAR-on-a-chip system steers its electronic beam using arrays of many small emitters that each put out a signal at a slightly different phase. The new phased array thus forms a synthetic beam that it can sweep from one extreme to another and back again 100,000 times a second. In one embodiment, each antenna, which consists of a silicon waveguide and five curved grooves etched in silicon, is 3 micrometers long, 2.8 µm wide, and 0.22 µm thick. An infrared laser beam is delivered to the antennas through a waveguide.

The camera may be any camera (e.g., a still camera, a video camera, etc.) configured to record three-dimensional images of an interior portion of the irrigation system. To this end, the camera may be, for example, a depth camera. Alternatively or additionally, the camera may take any of the forms described above in connection with the exterior camera. In some embodiments, the camera may comprise multiple cameras, and the multiple cameras may be positioned in a number of positions on the interior and exterior of the irrigation system.

The control system may be configured to control operation of the irrigation system and its components. To this end, the control system may include a steering unit, a sensor fusion algorithm, a computer vision system, a navigation or pathing system, and an obstacle avoidance system. The steering unit may be any combination of mechanisms configured to adjust the heading of irrigation system. The throttle may be any combination of mechanisms configured to control the operating speed of the engine/motor and, in turn, the speed of the irrigation system.

The brake unit may be any combination of mechanisms configured to decelerate the system. For example, the brake unit may use friction to slow the wheels/tires. As another example, the brake unit may convert the kinetic energy of the wheels/tires to electric current. The brake unit 742 may take other forms as well.

The sensor fusion algorithm may be an algorithm (or a computer program product storing an algorithm) configured to accept data from the sensor system as an input. The data may include, for example, data representing information sensed at the sensors of the sensor system. The sensor fusion algorithm may include, for example, a Kalman filter, a Bayesian network, or another algorithm. The sensor fusion algorithm may further be configured to provide various assessments based on the data from the sensor system, including, for example, evaluations of individual objects and/or features in the environment in which the irrigation system is located, evaluations of particular situations, and/or evaluations of possible impacts based on particular situations. Other assessments are possible as well.

The computer vision system may be any system configured to process and analyze images captured by the camera in order to identify objects and/or features in the environment in which the irrigation system is located, including, for example, traffic signals and obstacles (e.g., in embodiments where the camera includes multiple cameras, including a camera mounted on the exterior of the irrigation system). To this end, the computer vision system may use an object recognition algorithm, a Structure from Motion (SFM) algorithm, video tracking, or other computer vision techniques. In some embodiments, the computer vision system may additionally be configured to map the environment, track objects, estimate the speed of objects, etc.

The navigation/path system may be any system configured to determine a driving path for the irrigation system. The navigation/path system may additionally be configured to update the driving path dynamically while the irrigation system is in operation. In some embodiments, the navigation and path system may be configured to incorporate data from the sensor fusion algorithm, the GPS, and one or more predetermined maps so as to determine the driving path for the irrigation system.

The obstacle avoidance system may be any system configured to identify, evaluate, and avoid or otherwise negotiate obstacles in the environment in which the irrigation system is located. The control system may additionally or alternatively include components other than those shown.

Peripherals may be configured to allow the system to interact with external sensors, other vehicles, and/or a user. To this end, the peripherals may include, for example, a wireless communication system, a touchscreen, a microphone, and/or a speaker.

Solar cell and rechargeable battery can supply power to the system. The battery can be rechargeable lithium ion, although other chemistries can be used. In one embodiment, conformal batteries such as lithium polymer batteries can be formed to fit the available space of the irrigation system body part regardless of the geometry of the part. Alternatively, for batteries that are available only in relatively standard prismatic shapes, the prismatic battery can be efficiently constructed to fill the space available, be it rectilinear or irregular (polyhedral) in shape. This conformal space-filling shape applies in all three dimensions. In one embodiment, this is done by selecting a slab of lithium polymer battery material of a desired height; freezing the slab; vertically cutting the slab to a desired shape thus forming a cut edge; attaching an anode lead to each anode conductor of the cut slab along the cut edge while maintaining the cut slab frozen; and attaching a cathode lead to a each cathode conductor of the cut slab along the cut edge while maintaining the cut slab frozen. The slab may contain one or many cells. The leads may be made of single or multistranded, metallic wire, metallic ribbon, low melting point alloy, self-healing metal, and litz wire. Attachment is accomplished so as to minimize tension on the leads. The cut slab may need to be deburred after cutting and before attaching leads. The cut edge may be inspected for burrs before deburring is performed. Lead attachment may be accomplished by a number of methods including: wire bonding; wedge bonding; adhering the lead to the electrode with conductive epoxy, anistotropic conductive adhesive or conductive thermoplastic; stapling with microstaples; adhering the lead to the electrode by electropolymerization; welding the lead to the electrode with micro welding; and growing a lead in place by electroless plating, electroplating or a combination of electroless plating and electroplating. The leads should be insulated. Preferably the insulation is thermoplastic. If there is more than one cell in the slab, the distal ends of the leads may be connected together so that the cells are connected together in series, in parallel or some in series and the remainder in parallel. After the leads have been attached to the cut slab and connected together, the assembly will preferably be wrapped with standard packaging for lithium polymer batteries or a shrinkable form fitting version thereof. While each of the components and systems are shown to be integrated in the system, in some embodiments, one or more components or systems may be removably mounted on or otherwise connected (mechanically or electrically) to the irrigation system 700 using wired or wireless connections.

Still further, while the above description focused on the irrigation system configured to operate in an autonomous mode, in other embodiments the irrigation system may not be configured to operate in an autonomous mode. In these embodiments, for example, one or more of the following components may be omitted: the global positioning system, the inertial measurement unit, the RADAR unit, the laser rangefinder or LIDAR unit, valves/actuators, the sensor fusion algorithm, the computer vision system, the navigation or path system, the obstacle avoidance system, the wireless communication system, the touchscreen, the microphone, and the speaker.

The sensors can be used for maintenance prediction and in case of component failure, to help the driver to navigate safely. For example, the irrigation system can monitor brake pad wear and adjusting how hard the brake needs to be applied in light of other vehicles and how fast does the irrigation system need to come to a complete stop. In addition to changing the way the irrigation system brake, the irrigation system may change the way it maneuvers in other ways as well, such as accelerating differently or changing directions. For instance, the irrigation system may accelerate more slowly if the measured oil pressure is excessively high. The irrigation system may also turn more or less tightly in order to mitigate wear. The irrigation system may also use other systems and methods to determine the state of an irrigation system component. For example, the irrigation system may monitor how far it takes the irrigation system to stop compared to expected braking distance. If the distance is longer than expected, such as taking longer than it has in the past, the computer system may determine that the brakes are worn and start braking earlier. The system and method may also estimate the state of a component based on its repair service record. In that regard, the processor may query data or an external database (e.g., a server with which the irrigation system is in wireless communication) for repair records and estimate the wear on a component based on the length of time since the last repair.

Modeling of Irrigation Path

The system and method may rely on other information to change the way the irrigation system is maneuvered. For instance, the irrigation system may sense weight distribution and adjust maneuvering in response to the changes in the loading and/or weight distributions on the irrigation system. The irrigation system may further move differently when there is only one user in the irrigation system than four passengers on board, or differently with light loads than with hauling a trailer behind. The irrigation system may also adapt the driving to the observed environmental changes such as weather or farm conditions.

Modeling of the patterns of changes in the vehicle's performance and conditions, as well as modeling of the patterns of changes in the driving environment, may be performed by the autonomous driving computer system. Alternatively, predetermined models may be stored in the autonomous driving system. The computer system may process the observed data, fit them into the 3D models and issue compensation signals accordingly.

In one embodiment, the system identifies or otherwise receives user commands for placing a well placemark that is configured to provide fluid (i.e., water, applicant) to the irrigation system. Once the well placemark is positioned. One or more operational parameters of the irrigation system are received such as commands for placement of the wheels are received, and the size of the irrigation system and the current location can be captured. The system can check and indicate that a crop height may exceed an irrigation span clearance. The check elevation determines the height of the pivot span itself at that sub-span point. This is done by finding the altitude of the pivot at the given bearing, at both the start and end of the span (at each wheel track point), and then calculating the slope of the pivot. Once the slope of the pivot is found, it can be used to find the altitude of the span at any given sub-span distance. If the height of span is less than the height of the sub-span check plus the warning or critical height for that span, the location of that point is saved in an array for that bearing. The system determines wheel tracks, showing arc, corner, and bender pivots wheel tracks as well as overhang and water gun spray coverage. This is accomplished by performing spatial queries against the database, finding center points of pivots within a certain distance of the center point of the pivot currently selected.

The system can determine overhang length and water spray distance. The overhang also has options for minimum, warning, and critical heights along with checks to perform for the overhang. The water distance is the distance the gun at the end of the overhang can spray water. Both overhang and water distance have detail boxes including total span length, running acreage total, and acreage under the overhang or spray. The applicant dispersal device (i.e., end gun or the like) of the overhang can also be turned 'off' and 'on' at specific bearings. In some implementations, this option is at the cardinal directions (e.g., a square field) where the corners would have the water gun on and the edges would not. In addition to the cardinal directions, the system can add additional sections where the water gun may or may not be on.

Beamforming to Focus on Target(s)

One system includes a frame that rotates in a circular pattern, water valves attached to the frame to dispense water to crops in the field, cameras and position sensors to capture field data, and a processor to control movement of the frame to move around a field for irrigation. The processor calculates water spray pattern, wind speed and other weather parameters, and applies beamforming techniques to shape the water spray to reach edges of the circular spray pattern to water in a non-circular area. The irrigation system has an array of water valves that are mounted on a rotating irrigation bar to water within a circular area. However, plants outside of the circumference do not get water. A water beamforming technique is applied to get the water to square or rectangular areas that lack water spray at the outer edges. To change the directionality of the array when transmitting, a beamformer controls the phase and relative amplitude of the water at each valve, in order to create a pattern of constructive and destructive interference in the wavefront. When receiving, information from different sensors is combined in a way where the expected pattern of radiation is preferentially observed. The beamforming technique involves sending the pulse from each valve at slightly different times, so that every pulse hits the target at exactly the same time, producing the effect of a single strong pulse from a single powerful valve. One type of beamformers, such as the Butler matrix, use a fixed set of weightings and time-delays (or phasings) to combine the signals from the sensors in the array, primarily using only information about the location of the sensors in space and the wave directions of interest. In contrast, adaptive beamforming techniques generally combine this information with properties of the water actually received by the array, typically to improve rejection of unwanted water from other directions. This process may be carried out in either the time or the frequency domain. As the name indicates, an adaptive beamformer is able to automatically adapt its response to different situations. Some criterion has to be set up to allow the adaptation to proceed such as minimizing the total noise output. Because of the variation of noise with frequency, in wide band systems it may be desirable to carry out the process in the frequency domain.

Obstacle Detection

In some embodiments, the irrigation system identifies obstacles on the travel path, and the computer system may use one or more sensors to sense the obstacles. For example, the computer system may use an image-capture device to capture images of the road and may detect the obstacles by analyzing the images for predetermined colors, shapes, and/or brightness levels indicative of an obstacle. As another example, the computer system may project LIDAR to detect the obstacle. The computer system may estimate the location of the obstacle and control the irrigation system to avoid the irrigation system and yet maintain a predetermined distance from neighboring vehicles in both directions. Other vehicles behind the lead irrigation system can then simply follow the lead irrigation system as part of a flock. The computer system may then control the irrigation system to maintain a distance between the irrigation system and the at least one neighboring irrigation system to be at least a predetermined minimum distance to avoid colliding with the at least one neighboring irrigation system.

In an example of a situation, an obstacle is present in front of a host irrigation system mounted with a sensor such as camera or sensor in a front portion of the irrigation system body. In vehicles, the irrigation system-mounted sensors such as cameras, radar, and LIDAR is used in the irrigation system control system such as an inter-irrigation system distance alarm system, a preceding irrigation system following system or a collision reducing brake system. Where an obstacle is not present in front of the host irrigation system, since the target data is not output from the sensor, the irrigation system velocity control system performs a control so that the irrigation system operates according to a planned path. However, the path may need adjustment when an obstacle is encountered, or when weather affects the operation, or traffic condition, emergency or holiday patterns require a change in the planned path and speed.

In this example, the front obstacle is another irrigation system. Furthermore, in this example, as the sensor, a radar in one embodiment, has horizontal resolution due to a plurality of arrays installed in the horizontal direction; however, it does not have a vertical resolution. In this case, the sensor outputs target data having position information such as a relative longitudinal distance, lateral position and velocity between the host irrigation system and the obstacle to the irrigation system velocity control system. In another embodiment, the sensor is a camera. Pictures captured by the camera can be used to form a 3D reconstruction of the obstacles and the road. The task of converting multiple 2D images into 3D model consists of a series of processing steps: Camera calibration consists of intrinsic and extrinsic parameters, and the camera calibration is usually required for determining depth. Depth determination calculates—depth. The correspondence problem, finding matches between two images so the position of the matched elements can then be triangulated in 3D space. With the multiple depth maps the system combines them to create a final mesh by calculating depth and projecting out of the camera—registration. Camera calibration will be used to identify where the many meshes created by depth maps can be combined together to develop a larger one, providing more than one view for observation to have a complete 3D mesh.

The irrigation system velocity control system performs controls such as a control for maintaining the distance from the obstacle, and a control for executing an alarm or velocity reduction in a case where collision with the obstacle is predicted, according to the position information about the input target data.

In another example where the obstacle such as a boulder or a large object is not in the database but is now present near the host irrigation system. The obstacle can be on the side or the rear as captured by sensors. When a downward-view structure such as a manhole or a cat's eye is present, or as another example, when a small fallen object such as an empty can is present and the sensor may output target data, as if the front obstacle is present, according to a reflection intensity or camera capture. For example, obstacles such as land slip and falling rocks can appear unexpectedly on the path. Image data in the fall monitoring area is processed by computers and/or transmitted to a cloud processing system, and images are frame-difference-processed to identify the new obstacles. Thereafter, in the case where there are no variations in the extracted component data representing the body and in particular in the case where there are no moving variations, when several frames with an interval of a predetermined time are processed in a similar way, the processor detects the obstacle and transmits a warning signal to adjacent vehicles and/or to a traffic display board. The warning information can be incorporated by the driving software of other drivers that there are road obstacles by land slip.

Figure 3A:
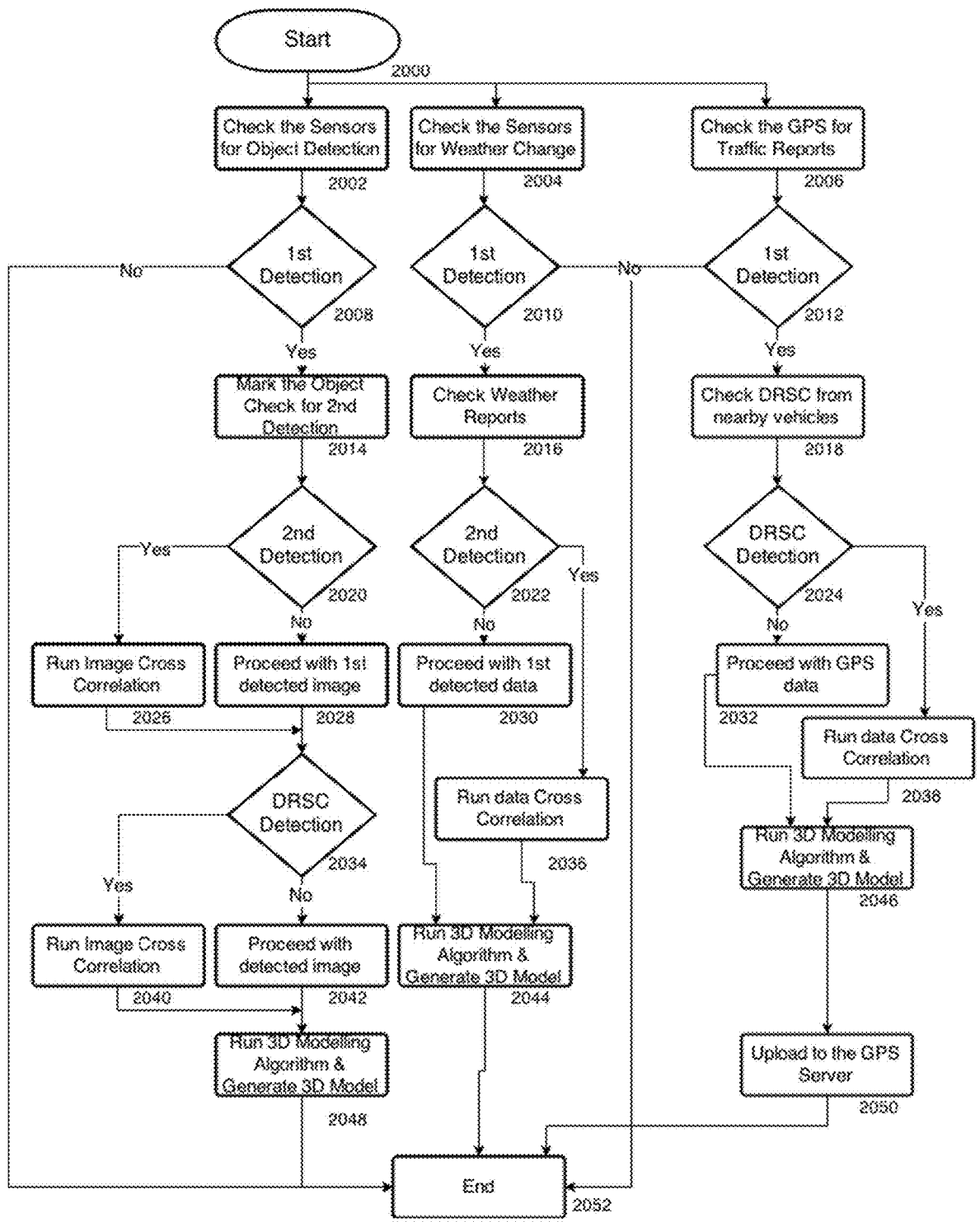
FIGS. 3A-3H illustrate an exemplary process to fuse data for 3D models used for smart farm system navigation.
Figure 3B:
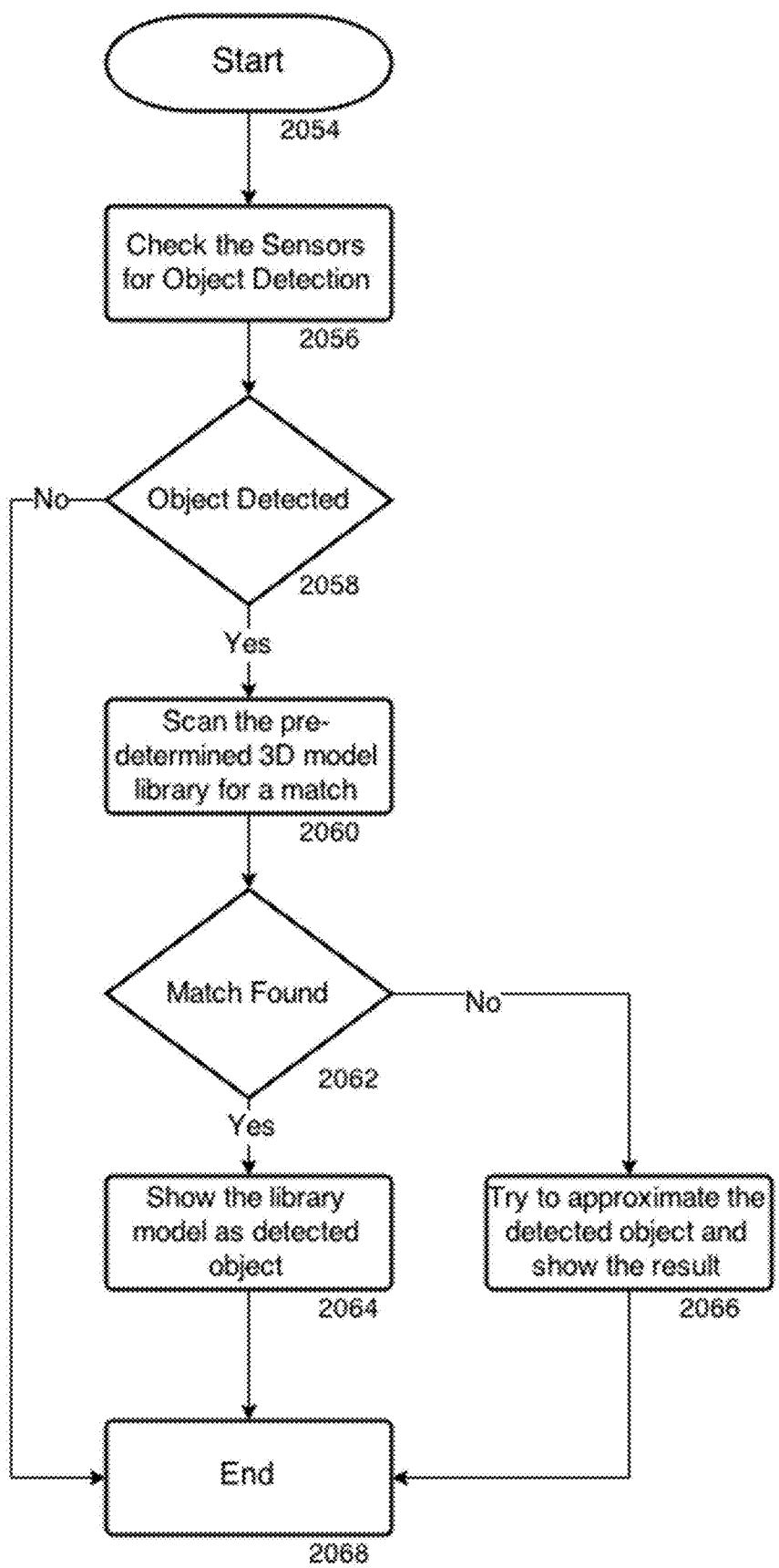
Figure 3C:
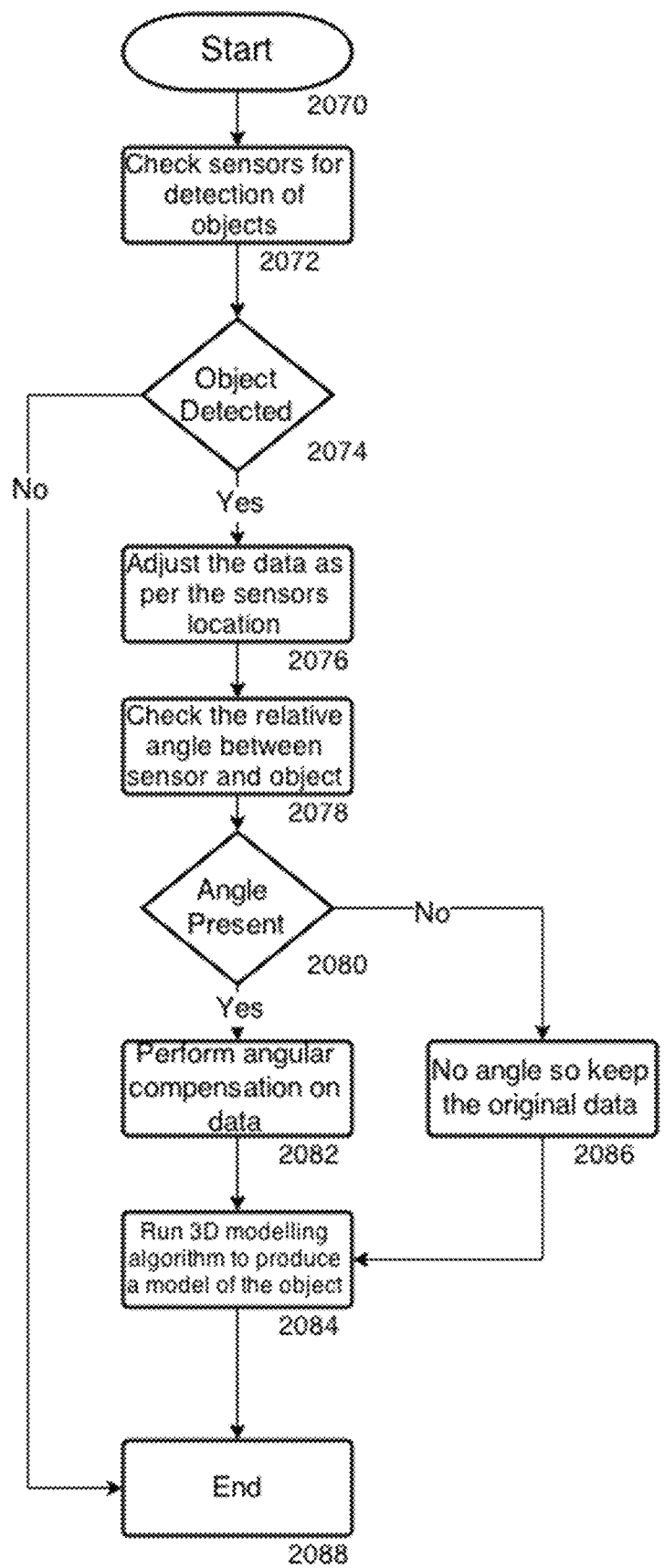
Figure 3D:
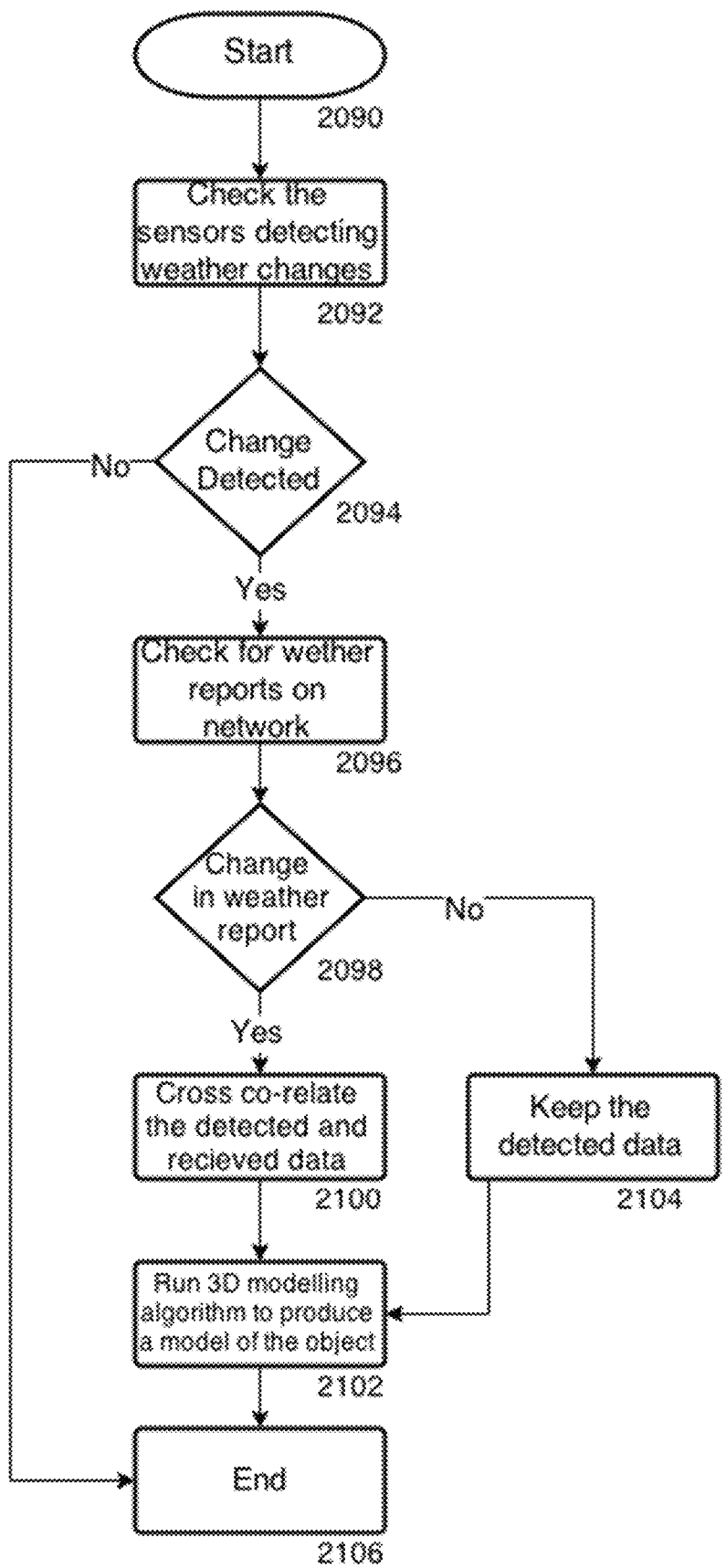
Figure 3E:
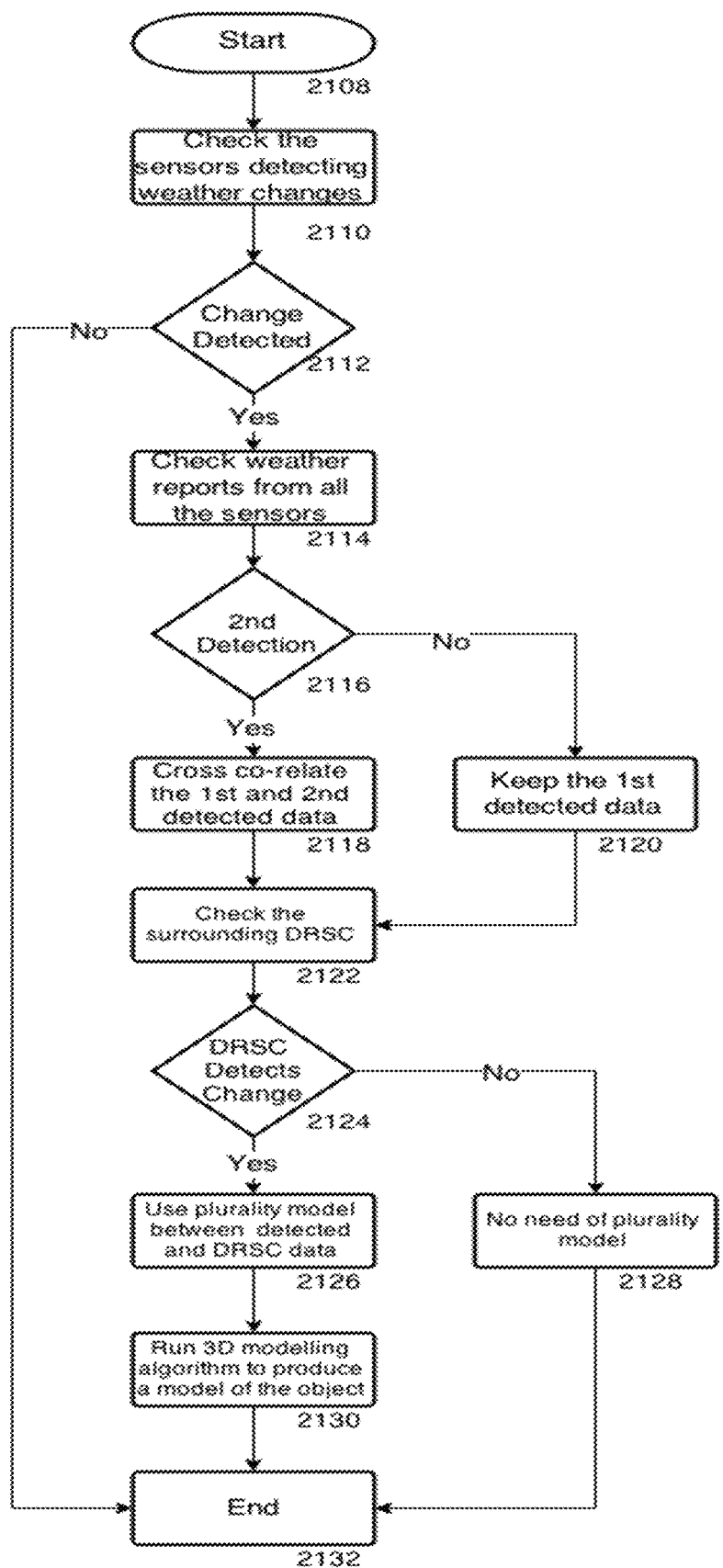
Figure 3F:
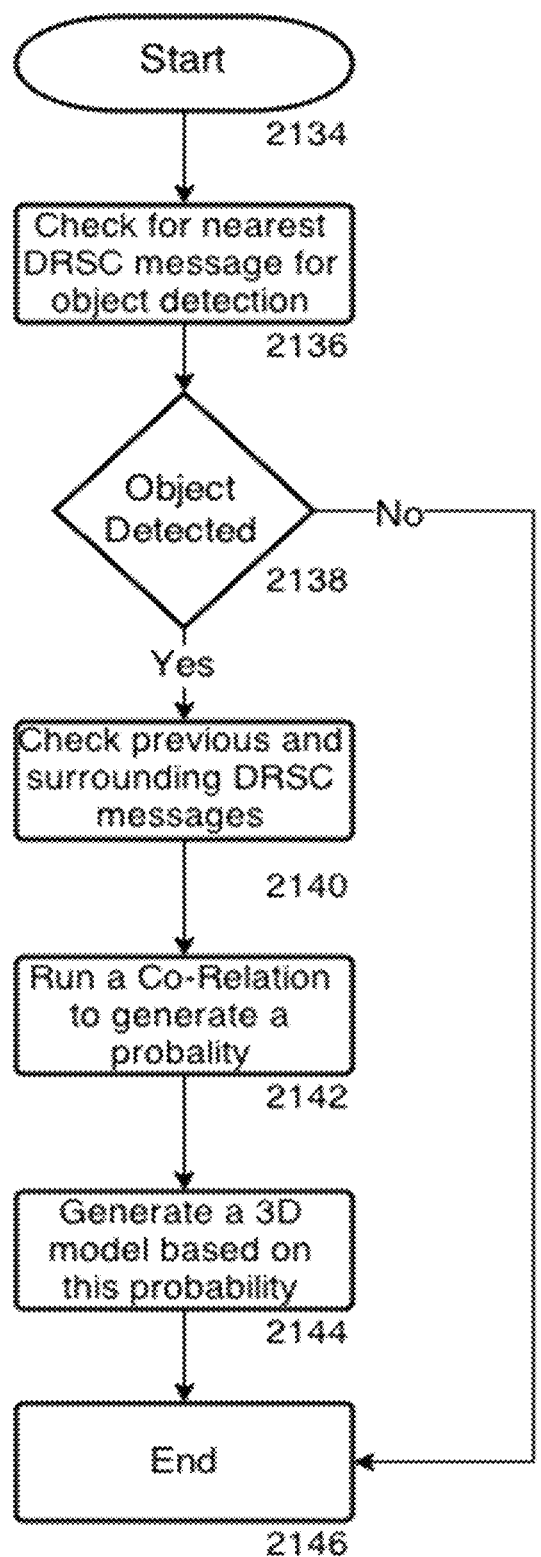
Figure 3G:
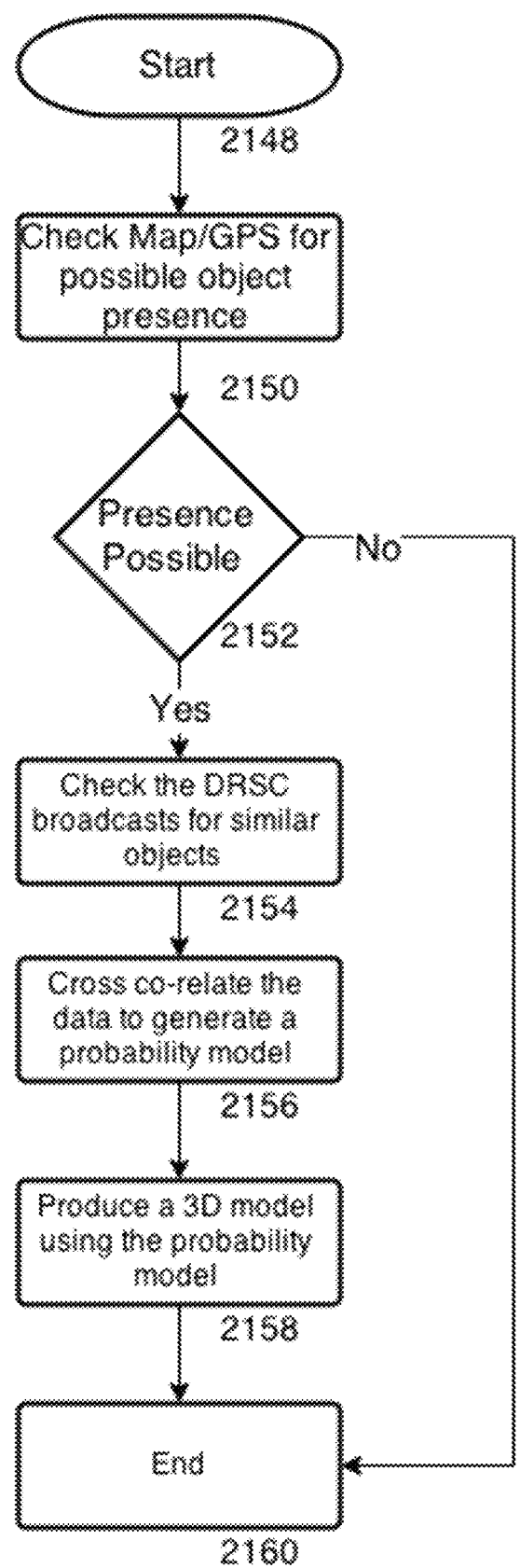
Figure 3H:
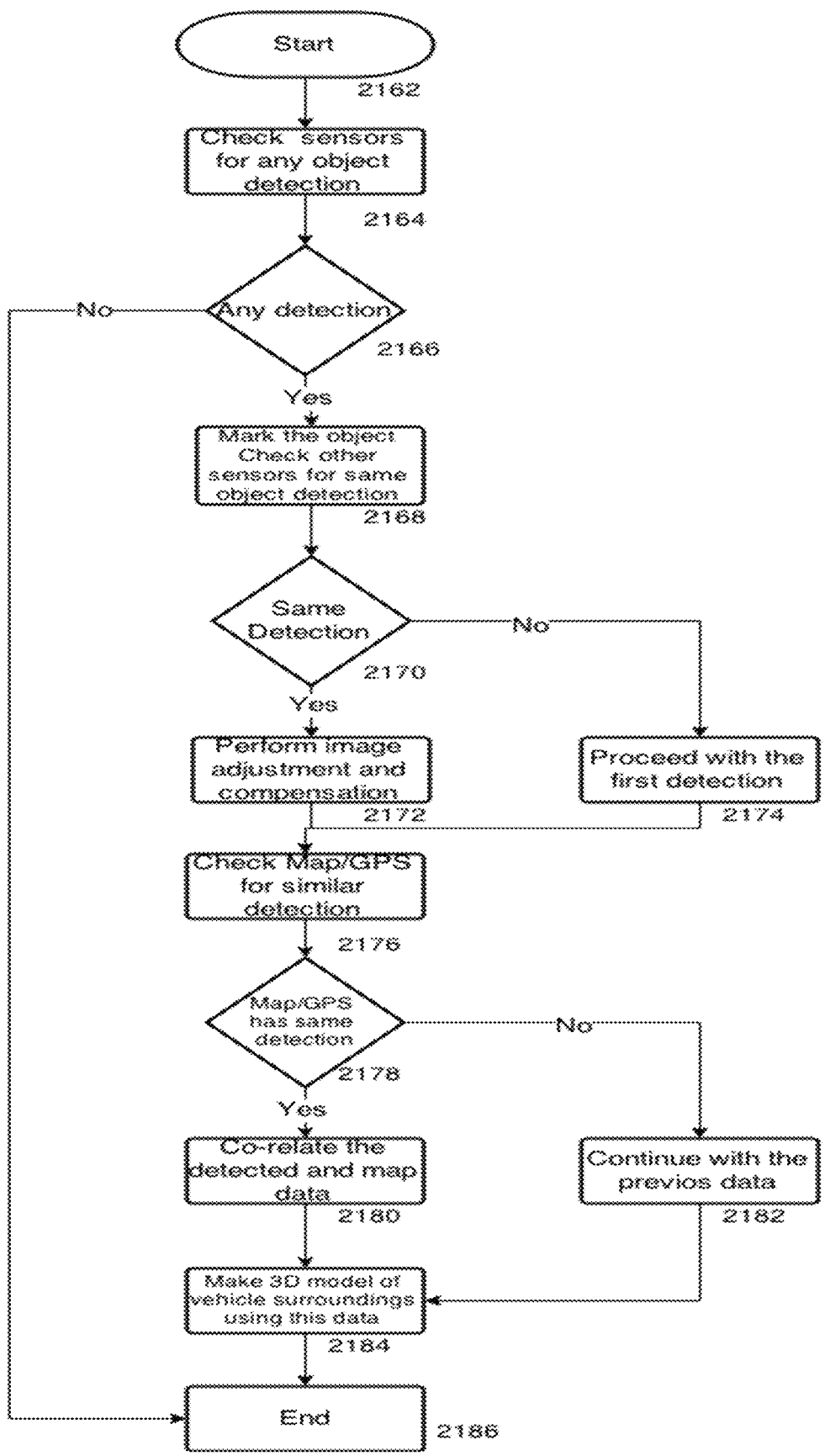

FIGS. 3A-3H illustrate an exemplary process to fuse data for 3D models used for navigation. FIG. 3A shows an exemplary system that performs data fusion based on sensor based detection of objects, change in weather, and holiday/emergency conditions, among others. The process checks all the sensors for change in weather (2004), detection of object (2002) and the GPS for current conditions (2006). For each given sensor for detecting objects in a vehicle's environment, the process generates a 3D model of the given sensor's field of view; obstacle information from other irrigation system-irrigation system communication; neighboring irrigation systems, user preference information. The process can adjust one or more characteristics of the plurality of 3D models based on the received weather information to account for an impact of the actual or expected weather conditions on one or more of the plurality of sensors. After the adjusting, aggregating, by a processor, the plurality of 3D models to generate a comprehensive 3D model; combining the comprehensive 3D model with detailed map information; and using the combined comprehensive 3D model with detailed map information to maneuver the irrigation system. In FIG. 3A, the process checks sensors for object detection (2008) and then checks for confirmations from other vehicles over V2V communication and then generates 3D model therefrom. The process can also check for weather change (2004) and correlate the weather change to generate an updated 3D model. Similarly, the process integrates traffic flow information (2006) and updates the 3D model as needed. FIG. 3B shows an exemplary process for identifying the object, while FIG. 3C-3H show in more details the object modeling process. The process checks sensors for object detection and scans the object against 3D library for matches. If a match is found, the process sets the object to the object in the library, and otherwise the process performs a best-guess of what the object is and send the object identification for subsequent 3D modeling use.

The system automatically the objects as potential "threats" and navigates around obstacles as follows:
   detecting an object external to the irrigation system using one or more sensors;
   determining a classification and a state of the detected object;
   estimating the destination of the object;
   predicting a likely behavior of the detected object based on prior behavior data and destination;
   preparing the irrigation system to respond based at least in part on the likely behavior of the detected object; and
   notifying a user of options based on the likely behavior.

Flock Navigation

Next a flock control behavior is detailed. In one embodiment, a plurality of irrigation systems follow a leader irrigation system, who in turn is following a target irrigation system or a target driving plan. The leader, or the first irrigation system in the group would automatically or manually take evasive actions to avoid an obstacle, and the information is transmitted via the irrigation system to irrigation system communication such as DSRC to following vehicles, and the driving path of the entire flock is adjusted according to the obstacle. "Flocking" is the collective motion of a large number of self-propelled entities and is a collective animal behavior exhibited by many living beings such as birds, fish, bacteria, and insects. It is considered an emergent behavior arising from simple rules that are followed by individuals and does not involve any central coordination. The irrigation system communications would identify vehicles traveling as a flock, and the vehicles perform distributed flocking operation by communication over the wireless network. One embodiment of the irrigation system flocking process has the following structure:

```
initialise_irrigation system_positions( )
LOOP
   place_vehicles( )
   move_all_vehicles_to_new_positions( )
END LOOP
```

Each of the vehicles rules works independently, so, for each irrigation system, the process calculates how much it will get moved by each of the three rules, generating three velocity vectors. The three vectors to the vehicle's current velocity to work out its new velocity.

```
PROCEDURE move_all_vehicles_to_new_positions( )
   Vector v1, v2, v3
   Irrigation system b
   FOR EACH irrigation SYSTEM b
      v1 = rule1(b)
```

```
            v2 = rule2(b)
            v3 = rule3(b)
            b.velocity = b.velocity + v1 + v2 + v3
            b.position = b.position + b.velocity
        END
```

The Vehicles Rules are discussed next. One embodiment simulates simple agents (vehicles) that are allowed to move according to a set of basic rules. The resirrigation is akin to a flock of birds, a school of fish, or a swarm of insects. In one embodiment, flocking behavior for each irrigation system is controlled by three rules:

Separation—avoid crowding neighbors (short range repulsion)
Alignment—steer towards average heading of neighbors
Cohesion—steer towards average position of neighbors (long range attraction)

Rule 1: Vehicles try to go towards the center of mass of neighboring vehicles. The 'center of mass' is simply the average position of all the vehicles. Assume there are N vehicles, called b1, b2, . . . bN. Also, the position of the irrigation system b is denoted b.position. Then the 'center of mass' c of all N vehicles is given by: c=(b1.position+b2.position+ . . . +bN.position)/N However, the 'center of mass' is a property of the entire flock of vehicles; it is not something that would be considered by an individual irrigation system. Each irrigation system is moved toward its 'perceived center', which is the center of all the other vehicles, not including itself. Thus, for vehicleJ ($1 \leq J \leq N$), the perceived center pcJ is given by:

$$pcJ = (b1.position + b2.position + \ldots + bJ-1.position + bJ+1.position + \ldots + bN.position)/(N-1)$$

Having calculated the perceived center, the system moves the irrigation system towards it. To move it 1% of the way towards the center this is given by (pcJ−bJ.position)/100 as:

```
        PROCEDURE rule1(irrigation system bJ)
            Vector pcJ
            FOR EACH irrigation SYSTEM b
                IF b != bJ THEN  pcJ = pcJ + b.position
            pcJ = pcJ / N-1
            RETURN (pcJ - bJ.position) / 100
```

Rule 2: Vehicles try to keep a small distance away from other objects (including other vehicles). The rule ensures vehicles don't collide into each other. If each irrigation system within a defined small distance (say 100 units) of another irrigation system, the irrigation system is moved away. This is done by subtracting from a vector c the displacement of each irrigation system which is near by.

```
        PROCEDURE rule2(irrigation system bJ)
            Vector c = 0;
            FOR EACH irrigation SYSTEM b
            IF b != bJ THEN
                IF |b.position - bJ.position| < 100 THEN  c = c - (b.position - bJ.position)
            RETURN c
```

If two vehicles are near each other, they will be slightly steered away from each other, and at the next time step if they are still near each other they will be pushed further apart. Hence, the resultant repulsion takes the form of a smooth acceleration. If two vehicles are very close to each other it's probably because they have been driving very quickly towards each other, considering that their previous motion has also been restrained by this rule. Suddenly jerking them away from each other is not comfortable for passengers and instead, the processes have them slow down and accelerate away from each other until they are far enough apart for our liking.

Rule 3: Vehicles try to match velocity with near vehicles.

This is similar to Rule 1, however instead of averaging the positions of the other vehicles we average the velocities. We calculate a 'perceived velocity', pvJ, then add a small portion (about an eighth) to the vehicle's current velocity.

```
        PROCEDURE rule3(irrigation system bJ)
            Vector pvJ
            FOR EACH irrigation SYSTEM b
                IF b != bJ THEN
                    pvJ = pvJ + b.velocity
                END IF
            END
            pvJ = pvJ / N-1
            RETURN (pvJ - bJ.velocity) / 8
        END PROCEDURE
```

Additional rules is implemented as a new procedure returning a vector to be added to a vehicle's velocity.

Action of a crowd or traffic is discussed next. For example, to handle strong traffic.

```
        PROCEDURE strong_traffic(Irrigation system b)
            Vector traffic
            RETURN traffic
        END PROCEDURE
```

This function returns the same value independent of the irrigation system being examined; hence the entire flock will have the same push due to the traffic or crowd.

Limiting the speed of vehicles is discussed next. For a limiting speed vlim:

```
        PROCEDURE limit_velocity(Irrigation system b)
            Integer vlim
            Vector v
            IF |b.velocity| > vlim THEN
                b.velocity = (b.velocity / |b.velocity|) * vlim
            END IF
        END PROCEDURE
```

This procedure creates a unit vector by dividing b.velocity by its magnitude, then multiplies this unit vector by vlim. The resulting velocity vector has the same direction as the original velocity but with magnitude vlim.

The procedure operates directly on b.velocity, rather than returning an offset vector. It is not used like the other rules; rather, this procedure is called after all the other rules have been applied and before calculating the new position, ie. within the procedure move_all_vehicles_to_new_positions:

$b.velocity = b.velocity + v1 + v2 + v3 + \ldots$ $limit\_velocity(b)$ $b.position = b.position + b.velocity$ Bounding the position is discussed next. In order to keep the flock within a certain zone so that they can drive out of them, but then slowly turn back, avoiding any harsh motions.

```
PROCEDURE bound_position(Irrigation system b)
    Integer Xmin, Xmax, Ymin, Ymax, Zmin, Zmax
    Vector v
    IF b.position.x < Xmin THEN v.x = 10
        ELSE IF b.position.x > Xmax THEN v.x = -10
    IF b.position.y < Ymin THEN v.y = 10
        ELSE IF b.position.y > Ymax THEN v.y = -10
    IF b.position.z < Zmin THEN v.z = 10
        ELSE IF b.position.z > Zmax THEN v.z = -10
    RETURN v
```

Here of course the value 10 is an arbitrary amount to encourage them to drive in a particular direction.

During the course of flock control, one may want to break up the flock for various reasons. For example the introduction of a predator may cause the flock to scatter in all directions. The predator can be an object on an impending collision course with the flock. Scattering the flock can be done. Here the flock can disperse; they are not necessarily moving away from any particular object, but to break the cohesion (for example, the flock encounters a dangerously driven irrigation system). Thus the system negates part of the influence of the vehicles rules.

PROCEDURE move_allvehiclestonewpositions( )
FOR EACH irrigation SYSTEM b $v1 = m1 * rule1(b)$ $v2 = m2 * rule2(b)$ $v3 = m3 * rule3(b)$ $b.velocity = b.velocity + v1 + v2 + v3 + \ldots$ $b.position = b.position + b.velocity$ When the risk of collision arises, the process can make m1 negative to scatter the flock. Setting m1 to a positive value again will cause the flock to spontaneously re-form.

Tendency away from a particular place is handled next. If the flock is to continue the flocking behavior but to move away from a particular place or object (such as a irrigation system that appears to collide with the flock), then we need to move each irrigation system individually away from that point. The calculation required is identical to that of moving towards a particular place, implemented above as tend_to_place; all that is required is a negative multiplier: $v = -m * tend\_to\_place(b)$.

The vehicles can be organized into a V formation (sometimes called a skein) is the symmetric V-shaped formation for Drag Reduction and Fuel Saving where all the cars except the first drive in the upwash from the wingtip vortices of the irrigation system ahead. The upwash assists each irrigation system in supporting its own weight in flight, in the same way a glider can climb or maintain height indefinitely in rising air.

The motor vehicles of the flock establishes a target motor irrigation system which will be used as a reference for flocking. In FIG. 6F, the leading motor irrigation system of the flock is established as the target motor irrigation system by the motor vehicles of the flock. The target motor irrigation system may be established before the motor irrigation system start running in flock. In another embodiment, the first motor irrigation system of the flock detects a preceding motor irrigation system with the information from the radar or the CCD camera on the leading motor irrigation system or flock leader, and automatically establishes the detected preceding motor irrigation system as a new target motor irrigation system. By successively changing new target motor vehicles in this manner, new motor vehicles may automatically be added to the flock. Even if a motor irrigation system is incapable of communication between motor vehicles, that motor irrigation system may be established as a target motor irrigation system according to an algorithm described later on.

In one embodiment, the leading motor irrigation system of the flock establishes a hypothetical target motor irrigation system, and transmits items of information of the hypothetical target motor irrigation system to the other motor vehicles of the flock which follow the flock leader through the inter-vehicular communications such as DSRC.

Each irrigation system in the flock is responsible for generating a speed plan which governs the relationship between the position in which the motor irrigation system runs and the speed at which the motor irrigation system runs. The vehicles perform determining, based on the speed plan, a planned position to be reached from the present position of the motor irrigation system after a predetermined time t, e.g., 1.5 seconds, and a planned speed of the motor irrigation system at the planned position in the flock. According to this function, if the speed plan from the present position of the motor irrigation system is generated such that the motor irrigation system is to maintain the speed of 80 km/h, i.e., 22.2 m/sec., then the planned position to be reached after the predetermined time t, e.g., 1.5 seconds, is 33.3 m spaced from the present position down the running path B, and the planned speed at the planned position to be reached is 80 km/h.

The function as the predicted value calculating means serves to determine a predicted position and a predicted speed to be reached by the motor irrigation system after the predetermined time t. The predicted position is calculated from the present position, i.e., the traveled distance, the present speed, and the present acceleration of the motor irrigation system which are given from the communication module 1, and the predicted speed is calculated from the present speed and the present acceleration of the motor irrigation system.

The speed/acceleration of the irrigation system, based on which the predicted position and the predicted speed will be determined, is basically determined from the speedometer. The predicted position and the predicted speed are determined using the speed and the acceleration of the motor irrigation system and GPS position.

A distance deviation, i.e., a position error, between a planned position to be reached by the motor irrigation system after the predetermined time t based on the speed plan and the predicted position, described above, to be reached by the motor irrigation system, and a speed deviation, i.e., a speed error, between a planned speed to be reached by the motor irrigation system after the predetermined time t based on the speed plan and the predicted speed, described above, to be reached by the motor irrigation system are determined. These deviations are calculated by subtractions.

The target motor irrigation system may be a flock leader. If, however, the target motor irrigation system is not a flock leader, then the flock leader calculates a position, a speed, and an acceleration of the target motor irrigation system using the laser radar, GPS, or triangulation of RF signals, for example.

Based on the above control algorithm, the engine throttle valve opening, the transmission, and the brake of each of plural following motor vehicles are controlled to control the motor vehicles in a flock.

The system detects the positional data of the preceding motor irrigation system through inter-vehicular communications or the laser radar, and controls the following motor irrigation system in the event that the preceding motor irrigation system drops out of a normal control range of the irrigation system flock control. Even when a motor irrigation system drops out of the normal range of the irrigation system flock control, the control algorithm controls a following motor irrigation system to increase its inter-vehicular distance up to such a motor irrigation system. Therefore, the irrigation system platoon control will not be interrupted even when one or more motor vehicles drops out of the platoon.

If it is known that a group of motor vehicles will travel in platoon or motor vehicles are counted at a tollgate or the like and the incremental count is indicated to each motor irrigation system to let it recognize its position in the platoon, then it is possible to establish the position i for each of the motor vehicles before they travel in platoon.

However, in order to handle a situation where another motor irrigation system pulls in between motor vehicles running in platoon or another motor irrigation system is added to a front or rear end of a platoon of motor vehicles, the process according to the present invention makes it possible for each of the motor vehicles running in flock to recognize its position relative to a target motor irrigation system through inter-vehicular communications.

There are two procedures available for each of the motor vehicles running in flock to recognize its position relative to a target motor irrigation system. The first procedure is applicable to local inter-vehicular communications by which each of the motor vehicles of the flock can communicate with only those motor vehicles which run immediately in front of and behind the motor irrigation system. If the flock leader of a flock is selected as a target motor irrigation system, then the target motor irrigation system transmits its own positional information i=0 to a next motor irrigation system which immediately follows the target motor irrigation system. The following motor irrigation system adds 1 to i, producing its own positional information i=1, recognizes that it is the second motor irrigation system from the target motor irrigation system, and transmits its own positional information i=1 to a next motor irrigation system which immediately follows the second motor irrigation system. Having received the positional information i=1, the next immediately following motor irrigation system adds 1 to i, producing its own positional information i=2, recognizes that it is the third motor irrigation system from the target motor irrigation system, and transmits its own positional information i=2 to a next motor irrigation system which immediately follows the third motor irrigation system. In this manner, each of the motor vehicles is able to recognize its position relative to the target motor irrigation system with a means for counting its position and local inter-vehicular communications.

If a target motor irrigation system is not the flock leader of a flock and the target motor irrigation system and the flock leader cannot communicate with each other through inter-vehicular communications, then the flock leader sets its own positional information to i=1, and transmits the own positional information i=1 to a next motor irrigation system which immediately follows the target motor irrigation system.

According to the present invention, as described above, a longitudinal acceleration correcting quantity of each of the motor vehicles of a flock is determined on the basis of predicted deviations of a position and a speed that are predicted after a predetermined time, from a speed plan, and the speed of the motor irrigation system is controlled on the basis of the determined longitudinal acceleration correcting quantity. Therefore, the motor vehicles can smoothly be controlled to run in flock along a running path on a road.

A longitudinal acceleration correcting quantity of a motor irrigation system following a target motor irrigation system is determined on the basis of an inter-vehicular distance between the following motor irrigation system and the target motor irrigation system and a speed difference there-between after a predetermined time, and the speed of the following motor irrigation system is controlled on the basis of the determined longitudinal acceleration correcting quantity. Consequently, the following motor irrigation system can automatically be driven smoothly along a running path on a road while reliably keeping a proper inter-vehicular distance between the following motor irrigation system and the target motor irrigation system.

Since the system arrangements on a flock leader and a following motor irrigation system of a flock are identical to each other, the flock leader and the following motor irrigation system can automatically be driven in a manner to match them using slightly different software or program adaptations made therefor. Therefore, any one of the motor vehicles of the flock may become a flock reader or a following motor irrigation system.

Each of following motor vehicles of a flock is not only controlled with respect to a flock leader, but also always monitors an inter-vehicular distance between itself and a preceding motor irrigation system, so that it can increase the inter-vehicular distance even when a motor irrigation system drops out of the flock. Therefore, it is not necessary to stop controlling the irrigation system flock control when a motor irrigation system drops out of the flock. Even when a motor irrigation system drops out of a flock, the irrigation system flock control system does not stop controlling the other motor vehicles to run in flock, and when the motor irrigation system that has dropped out returns to the flock, the irrigation system flock control system can continuously control the motor vehicles to run in flock. The irrigation system flock control system allows different types of motor vehicles, such as trucks of different lengths, smaller automobiles, larger automobiles, etc., to be mixed in a flock, and can control those motor vehicles to run in flock. Accordingly, the irrigation system flock control system according to the present invention is capable of stably controlling motor vehicles to run in flock on a road designed for motor vehicles to run automatically, and particularly of controlling the speeds of such motor vehicles smoothly.

Automated Counting of Plants, Vegetable, or Fruit in s Farm

Sensors are disclosed below including cameras, chemical sensors, and soil sensors to capture data and communicate with remote system.

One system includes a camera that captures leaf and other plant parameters to determine if the plant is under or overwatered. Another system estimates fertilizer components based on leaf imaging. Yet another system captures soil images to determine soil condition.

Another system includes actuated sensors that can poke into the ground to detect soil chemistry and upload such information to the cloud.

Yet another system captures weeds on the ground. The system also detects bugs, parasites, and other harmful species on the crop using camera imaging.

The system can use AI to combine ground information collected by the irrigation system to automate the analysis of aerial imagery of a field. This might include diagnosing areas of crop stress due to moisture, disease, etc. AI can further identify the relationships between observed crop stress and sensor- or model-based soil moisture data. This allows such data to be used to more proactively manage irrigation activities to prevent crop stress, rather than waiting for stress to become apparent. Smartphone-based apps that apply AI to identify insects, weeds, and diseases, by simply pointing the camera at the item of interest, are already available.

Yet other systems provide under canopy crop scouting information in production fields, which enables growers to manage their fields for better yields and profitability. The system also solves critical problems like herbicide-resistant weeds with mechanical weeding by the robots in large fields. The system helps automated counting of plants and fruits. In this system, the irrigation system includes HD camera and an NIR camera capturing views of the products. Image recognition of the plant or fruit is done to estimate the yield. The user can periodically insert the probe to test soil conditions. The user can sign off as the auditor or inspector of the products, and such information is then placed on the blockchain for supply chain audits if needed. Consumers can verify that the products are coming off the right farm by looking up the blockchain.

Aerial images are used in conjunction with GPS data to provide geo-coordinates using geo-fencing methods to arrive at the boundaries of the farm. Moreover, based on landmarks such as roads/paths that delineate different crops grown within the farm, the application can detect different crops.

The system includes recognizing individual plants of a selected type growing in a field, wherein the method comprises capturing color NIR image data of an entire field having plants of a selected type growing therein utilizing an automated plant counting system and calculating a ratio value between each pixel of the color image data and the corresponding pixel of the NIR image data utilizing a plant recognition algorithm executed via a data processing system of the plant counting system. The method additionally comprises generating, via execution of the plant recognition algorithm, a false color image of the field based on the calculated ratios for each pixel, and identifying, via execution of the plant recognition algorithm, all plants of the selected type in the false color image based on a plant distinguishing characteristic uniquely rendered for each individual plant of the selected type in the false color image.

Operation of the mobile irrigation in system with a color camera and a supplemental camera with near infrared will now be described. Initially, the mobile irrigation has cameras that are positioned and aligned, and a GPS receiver receives position data indicative of the starting location of the system within the field, and each camera is operated to simultaneously capture an initial full color image and an initial near infrared (NIR) image and communicate the color and NIR image data to the data processing system.

As the mobile irrigation moves through the field the processor, via execution of the plant recognition algorithm, determines when the mobile irrigation system, and particularly the camera therein, have moved a distance L-x, wherein x is a predetermined overlap distance. Particularly, the distance L-x is utilized as a periodic interval at which the camera of irrigation system will be operated by the processor and will capture sequential sets of the color and NIR image data as the mobile irrigation system moves through the field. Because the periodic interval of the image data capture is L-x, wherein L is the length of the field of views 42, each set of color and NIR data captured will comprise overlapping image data with the image data captured at the previous periodic interval L-x. Accordingly, simultaneous color and NIR image data will be captured of all the plants in the entire field with no gaps in the collected image data. Additionally, in various embodiments, the cameras of irrigation system are configured to match the full color image data with the NIR image data to within one pixel.

The system can include illumination detection devices, e.g., one for each camera of irrigation system, that are utilized to adjust the light intensity of the color and NIR image data collected according to the light intensity, i.e., the amount of sunlight, present as each set of color and NIR image data is captured. Therefore, the light intensity for all the color and NIR image data captured as the mobile irrigation system traverses the field will be normalized and substantially equal. Such image normalization, improves the consistency of the color and NIR image data resulting in more reliability of a defined response across a broader range of illuminance intensities. This broader range means less effect on the variation of image response from cloud cover induced variations in light intensity.

In various implementations, the illumination detection device(s) can comprise light intensity reference cards that are positioned within the field of view of each respective camera of irrigation system. Each reference card includes three colored portions, wherein the first portion is a light color, e.g., white, the second portion is a mid-darkness color, e.g., gray, and a third portion is a dark color, e.g., black. During operation of the mobile irrigation system in the field, along with each set of color and NIR image data captured, each camera of irrigation system can also capture reflectivity data, referred to as reflectance values, for each portion of the respective reference card. Thereafter, the processor can utilize the reflectance values to adjust, i.e., normalize, the respective color and NIR image data captured according to the corresponding reflectance values. Therefore, the reference cards provide real-time illuminance information, whereby all the color and NIR image data collected can be normalized to negate the effects of changes in sunlight during the capture of the color and NIR image data, thereby improving the consistency and reliability of the captured color and NIR image data.

In various other embodiments, the illumination detection device(s) can comprises one or more illuminance meter, e.g., photometers, mounted on the plant counting mobile irrigation system in any suitable location where the sensors of the illuminance meter(s) have constant exposure to the respective sunlight and will not be overshadowed, at any time, by any other part, structure or component of the plant counting mobile irrigation system. For example, in various embodiments, the illuminance meter(s) can be mounted on top of the mast 50, and/or on top of the stage and/or on top of a cab of the mobile platform 14. In such embodiments, the illuminance meter(s) are operable to provide real-time illuminance information, i.e., real-time light intensity data, to the processor for the image normalization process. Furthermore, in such embodiments the possibility for shadows to taint the light intensity reference data used to normalize images is eliminated.

Particularly, the illuminance meter(s) measure light intensity and the processor correlates the illuminance values (lux) in real-time to the corresponding color and NIR image data that were acquired at the same point in time. As described above, the illuminance meter(s) is/are never shadowed by any part of the plant counting mobile irrigation system, regardless of direction of travel or angle of sun during operation. Utilization of the illuminance meter(s) generally includes two phases: a calibration phase and an operating phase. It is desirable to complete the calibration phase the same day the mobile irrigation system is operated to collect the color and NIR image data. This will ensure that the light conditions for which the calibration took place are consistent with the conditions experienced during the operation phase.

Generally, in the calibration phase, a procedure is conducted, independent of the collection of the color and NIR image data during operation of the mobile irrigation system in a field, to correlate light intensity to reflectance values collected from reference cards, similar to the reference cards described above, for a broad range of light intensities. Subsequently, a series of calibration curves, are generated for reflectivity and illuminance values, of the three different reference card colors (light/white, mid/gray, and dark/black) for both the color and NIR images of the multispectral camera of irrigation system. This results in a total of six curves for each multispectral camera of irrigation system. During the calibration procedure, the references cards are positioned in a way that they are not shadowed. Data is collected for a period of time such that a broad range of illuminance intensity values are captured (e.g., low to high values). A computation is then performed in the software, executable by the processor or other such computer based system, to fit curves to a regression equation for each of the six curves (e.g., one equation for white, one for gray, and one for the dark reference card colors, respectively). The resulting regressing equations can then be utilized to normalize the color and NIR image data captured during operation of the mobile irrigation system in the field.

During the operation phase, as the system traverses the field, the illuminance meter(s) capture light intensity values, i.e., illuminance data, for each set of color and NIR image data captured. The light intensity values generated by the illuminance meter(s) are collected in real-time for each set of color and NIR image data and stored in memory of the data processing system. Subsequently, in real-time, the processor, utilizes the captured light intensity values and the regression equations generated during the calibration phase to predict a relative reflectance corresponding to each set of color and NIR image data captured. In various implementations, the relative reflectance prediction routine can be part of the plant recognition algorithm. Alternatively, the relative reflectance prediction calculation can be independent of the plant recognition algorithm. Utilizing the predicted relative reflectance, in real-time, the processor then normalizes each set of color and NIR image data captured, via execution of the plant recognition algorithm. Thereafter, the normalized data is used to determine number of plants of a selected type growing in the field via execution of the plant recognition algorithm, as described below.

Alternatively, in other implementations, the processor could monitor the light intensity; via the camera of irrigation system and the illumination detection device e.g., reference cards or other suitable light sensor, e.g., a photometer. Utilizing the light intensity data, the processor can then control the shutter speed of each camera of irrigation system to regulate the light exposure for each set of color and NIR image data captured. Therefore, all image data collected can be normalized to negate the effects of changes in sunlight during the capture of the color and NIR image data, thereby improving the consistency and reliability of the captured multispectral image data.

As the mobile irrigation system moves through the field, each set of color and NIR image data captured at the periodic intervals is communicated to the processor where the sets of image data from each camera of irrigation system are normalized, stored and analyzed via execution of the plant recognition algorithm. Particularly, execution of the plant recognition algorithm calculates a pixel by pixel color ratio between the normalized color and NIR image data for each set of image data captured. That is, the algorithm takes each pixel from the color image data and compares it to the same pixel from the NIR image data and calculates a color ratio between the two, which provides a numeric value for each pixel. This numeric value is sometimes referred to as a normalized difference vegetative index (NDVI), which is correlated to the amount of chlorophyll contained in the various parts of the plant, and therefore, can be used to detect the level of chlorophyll contained in various parts of a plant. In various embodiments, the NDVI calculation is made on a pixel by pixel basis utilizing the following equation: (NIR−Red)/(NIR+Red) where NIR is the value of the near-infrared monochrome pixel and Red is the red value of the color pixel. Alternatively, the same computation can be made using the green value for each color pixel. This NDVI calculation is made for each image data set captured by each camera of irrigation system.

Subsequently, the plant recognition algorithm utilizes the NDVI value for each pixel and generates a false color images for each set of image data. That is, execution of the plant recognition algorithm assigns a particular color to specific NDVI values such that each pixel is assigned a color based on the respective NDVI value, thereby creating a color image, i.e., the false color images, utilizing the NDVI values for each pixel. For example, in various implementations, low NDVI values, i.e., low ratio values, indicate responses for soil, water and non-living plant material and are assigned light neutral background colors in the false color images. Conversely, the higher NDVI values indicate areas of the plants with higher chlorophyll density and are respectively assigned darker colors that contrast with the background colors in the false color images. One skilled in the art would readily understand that the chlorophyll density, as indicated by the NDVI values, is related to the amount of chlorophyll in the cells of the respective plants, but can also be related to the density of the plant matter for the respective plants.

The false color images will illustrate the location of highest level of chlorophyll in plants within each set of image data. And more particularly, because areas with higher levels of chlorophyll will be represented as certain colors in the false color images, the false color images will uniquely render the desired plant distinguishing characteristic, thereby indicating the locations of a desired plant distinguishing characteristic within each set of image data. For example, if the plants are corn plants the plant distinguishing characteristic will be the whorl (i.e., the whorl). The false color images will uniquely render the whorl of each corn plant because, aside from the stalk, the whorl of a corn plant has the highest plant matter density, and hence, the highest chlorophyll density level, within each respective corn plant. Accordingly, the whorl of each plant can be easily identified within the false color images such that the plants can be counted individually on a plant-by-plant basis.

More specifically, in various implementations, the execution of the plant recognition algorithm uses a minimum threshold value for NDVI values to remove values that are not indicative of chlorophyll containing matter, e.g., soil, water and non-living plant material, such that only the pixels that represent the desired plants are recognized. For example, in embodiments wherein the desired plant to be counted is corn, it is known that corn plants have a stronger NDVI response, i.e., a higher NDVI value, as they mature.

Hence, the minimum threshold value will be increased for more mature corn plants. Therefore, in various exemplary implementations, prior to the V4 stage of corn, the corn plants are detected by simply setting a selected minimum threshold for the NDVI values to filter out NDVI values below the threshold, and then counting the resulting contiguous pixel regions generated in the false color images, each contiguous pixel region indicating a plant to be counted. The growth stage is information that is provided by another system operator.

However, starting at the V4 stage, corn plants will show a characteristic NDVI response at their whorls that can be identified and counted via the false color images. Particularly, the whorls 78 in corn plants act as visible light traps such that the color data values will be much reduced, but the corresponding NIR values are not reduced. Hence, the change if the NDVI values, i.e., the sharp increase in NDVI values, at the whole produces the particular plant distinguishing characteristic in the false color images that is indicative of a corn plant.

Additionally, the false color images for all sets of image data for each camera in irrigation system are stitched together using the image data set overlap, described above, to generate a comprehensive false color images of the entire field, or of one or more particular plots within the field when the mobile irrigation system is utilized to count the plants in various plots within a field. In various embodiments, the location of each row of plants and the location of each plot within the field is entered as row and plot location data utilized by the plant recognition algorithm. Specifically, once the comprehensive false color images has been generated, execution of the plant recognition algorithm will count the number of plant distinguishing characteristics, i.e., the number of particular plants to be counted, found in the comprehensive false color images.

Additionally, in various implementations, execution of the plant recognition algorithm will determine the location of each identified plant within the field, or plot, and compare each plant location to the entered row and plot locations. If the location of a particular plant is not within the programmed row locations and, if applicable, plot locations, the particular plant is filtered out, i.e., not counted. That is, if a plant is identified as having the particular plant distinguishing characteristic, but the location of that plant is outside of the known row locations, e.g., in a furrow, and, if applicable, outside of the known plot perimeters, e.g., in an alleyway between plots, that particular plant considered not countable will be filtered from the countable plants that are located within the known row locations and plot perimeters. Hence, the plants in a field, or in one or more plots within the field, or within one or more particular rows can be easily and accurately counted individually on a plant-by-plant basis.

As described above, the mobile irrigation system generates the false color images in real-time, as the mobile irrigation system moves though the field. More specifically, as the mobile irrigation system moves through a plot collecting and normalizing the color and NIR image data for the respective plot, execution of the plant recognition algorithm will generate the false color images and determine the number of plants in each respective plot, as described above, as the mobile irrigation system traversed the respective plot, i.e., in real-time. Hence, the plant count data can accurately determine the number of plants in each respective plot 86 within the field 82 and/or the number of plants in the entire field. In various embodiments, it is envisioned that the processor can generate a report containing at least the location of the plots and the associated plant count for each respective plot.

It is envisioned that various methods or processes can be implemented to provide a user of the plant counting mobile irrigation system a way to evaluate the resulting data and establish a higher level of confidence in the accuracy of such data. For example, it is envisioned that execution of the plant recognition algorithm, or other suitable algorithm, can provide confidence data regarding the plant stand count generated as described above. Such confidence routine and data will be referred to herein as the stand count confidence routine, and the stand count confidence data. It is envisioned that the stand count confidence routine can comprise adding a logical ability to the processing of the data, as described above, such that the results of the analysis, i.e., the generated false color images and the corresponding final plant stand counts, are classified for the user by a confidence measure of how "good" of a job the mobile irrigation system "thinks" it did counting plants in a given plot (i.e., a series of false color images).

In various implementations, it is envisioned that such stand count confidence data can be generated by analyzing the final plant stand count results against expected counts. Expected counts can be derived from target plant population that the planter was expected to produce during the planting process for a given field or plurality of plots. The result of the stand count confidence routine would provide a report indicating a measure of confidence to the user about plots that were above or below a predefined range of expected counts. The output of the stand count confidence routine would flag such plots and notify the user that the plant counting mobile irrigation system potentially had difficulty counting plants (too few or too many identified plant distinguishing characteristics, e.g., whorls of corn plants) for any number of reasons. Plots that may have poor stands or too high a population due to germination or planter issues would be included in this report as well. Thus, the stand count confidence routine provides the user a higher level of confidence in the performance of the plant counting mobile irrigation system as well as making it efficient for the user to quickly identify plots with potential stand count issues.

Another method or process envisioned to provide a user of the plant counting mobile irrigation system a way to evaluate the resulting data and establish a higher level of confidence in the accuracy of such data, is a method that allows the user to easily review a series of images of a plot and visually compare such images to the false color images of the respective plot generated by the plant counting mobile irrigation system, as described above. Since the false color images consists of many images stitched together, as described above, a 'Plot Replay' utility can be executed to provide a user with method of visually reviewing the results shown in the false color images. For example, execution of such a 'Plot Replay' utility can provide the user an effective and efficient method to evaluate plots that have been flagged for review by the resirrigation of the stand count confidence routine described above. Particularly, utilization of the 'Plot Replay' utility will enable the user to quickly scan images of a plot, while seeing an overlay of the corresponding false color images having each identified plant indicated on the by a circle on the false color images. The user can then make a determination regarding the accuracy of the plant count generated by the plant counting mobile irrigation system for the respective plot.

The camera of irrigation system can be multispectral cameras such that the cameras of irrigation system are able to collect image data for wavelengths that are beyond the visible spectrum. Although the mobile irrigation system has been described herein as being structured and for counting plants within the field 82, one or more plots 86 within the field 82, or one or more particular rows 98, the camera of irrigation system provide the ability to not only count the plants, but also to analyze the plants as the mobile irrigation system moves through the field 82. For example, in various embodiments, via the multispectral camera of irrigation system, or multispectral cameras combined with other imaging or remote sensing technologies, the mobile irrigation system can be utilized to provide information regarding such things as nitrogen levels within the plants, spatial arrangement of the plants, plant height, corn ear height, plant color, and time-related data for determining plant vigor ratings, leaf area index, biomass estimates, chlorosis, geo-referenced location of individual plants within a field, etc.

Ground-Based Monitoring Tools can be used to communicate with the smart irrigation system. Soil pH is collected using a Bluetooth soil pH meter probe. The system can also collect the quality of the water on the crop, as often time, issue arise from the water as well. For example, a 3-in-1 soil tester from IPower Inc. captures information on sunlight, moisture and pH level. It measures moisture content of soil to lets the process know when to water, determines if plant is getting adequate light, and determines PH level in soil, depending on whether acidic or alkaline is suitable for the plants. The unit is lightweight and portable for home plants, garden, lawn and farm. Other in- or on-ground sensors can be deployed to detect crop conditions, weather data, and many other details, which can then be transmitted to decision analytics platforms via the Internet of Things (where computing devices embedded in everyday objects are connected to the Internet to enable analytics). A solar-powered in-ground sensor can gather data on crop stress, air pressure, humidity, temperature, chlorophyll, canopy biomass, rainfall, and other information, which can then be analyzed on its platform to improve precision farming.

In another embodiment, the system determines whether the same product (leaf, seed, or flower) has been imaged twice over a period over time. This is a useful embodiment when the user sows flower seeds or sets out plants for growing. Portions common to the first embodiment are provided with common reference characters and are not described herein. Since leaf or flowers grow, there is a high possibility that the retained flower image and the imaged flow image are different in the degree of blooming, height and others from a visual point of view. However, in the leaf/flower search system, these flower images can be identified as having the same name. Guide information such as how to apply water, how to care by season, how to apply fertilizer, and the amount of sunshine are displayed and, if the same flower is imaged regularly, an appropriate advice is provided in consideration of the season, weather, the growing state, and others.

The leaf and/or flower image can be used to estimate soil quality, using learning machines trained on many leaves in combination with different soil conditions, and supplemented with sensor data. Such estimated soil condition is then used to recommend fertilizer application and microbial amendment applications. The use of irrigation system camera and learning machine enables the system to easily and quickly determine the biomass and the amount of nitrogen taken up by plants both before and after the growing system. The process calculates the nitrogen uptake based on leaf cover (leaf area index), leaf green color (green area index or gai) and estimated fraction of brown leaves. A comprehensive image analysis classifies leaf pixels, filters noisy areas and counts leaf pixels.

Additionally, stress and biophysical plant parameters can be detected with digital imaging, for example: tiller densities across a field, insect damage, and nutrient and water deficiencies. For example, images of broccoli were taken with a digital camera in conjunction with a daylight long-pass filter, which cut reflectance spectra detected at 780 nm, and processed using CIELab color space where the CIELab "b" parameter in the wavelength ranges of 510-780 nm and 516-780 nm are correlated to N status. A criterion of greenness, derived from green and red reflectance, as well as a soil adjustment, was determined in order to estimate the proportion of pixels that met with it. A Canopy Cover index was calculated based on that proportion, and a close correlation was found with Canopy Cover values and NDVI. The NNI through LAI and chlorophyll content in wheat by processing digital images and obtaining reflectance spectra (400-1,000 nm) of whole plants. Digital image processing was applied to tomato seedlings in order to estimate their N status. In other examples, images of tomato plants under a light-controlled environment are analyzed using RGB color space as corresponding to N level, where a fuzzy logic control algorithm automatically adjusts the camera exposure and gain in order to control image brightness within a target gray level.

In another embodiment, a paper test strip that changes color according to the soil condition is used, where the farmer puts a drop of soil or water on the test strip. A microfluidics chip inside the card performs on-the-spot a chemical analysis of the sample, providing results in less than 10 seconds. A set of test spots on the back of the card provide colorimetric test results; the color of each test spot represents the amount of a particular chemical in the sample. Using a smartirrigation system, the farmer would then take picture with a mobile application and immediately receives a chemical test result. The test spots change color based on the levels of pH, nitrogen dioxide, aluminum, magnesium and chlorine that are present in the sample. For example, pH indicators change color to indicate the acidity or alkalinity of the soil. The farmer's smartirrigation system then performs machine vision on the strip, runs the results through a machine-learning algorithm and makes a recommendation to the farmer for fertilizer adjustments that will help optimize the crop's growth. Data is then uploaded into the cloud along with all the other chemical reads from the area. Interested parties can track greater trends of soil and water in the geographical area. The camera irrigation system apps with lighting adjustments provides robust reliable resirrigation almost in time, in the field.

A cell irrigation system can be used to measure NDVI of a plant in a field by using the cell irrigation system's camera to photograph the plant at different wavelengths. An image of the plant at visible wavelengths may be compared to an image of the plant at near-infrared wavelengths. The difference in image intensities divided by the sum of the image intensities can estimate plant growth rate as Normalized Difference Vegetative Index (NDVI). NDVI is based on measurements of plant reflectivity at different wavelengths:

$$NDVI = \frac{r_{NIR} - r_{VIS}}{r_{NIR} + r_{VIS}}$$

Where rNIR is infrared (e.g. 780 nm) reflectivity and rVIS red (e.g. 660 nm) reflectivity. Vigorous plants absorb red and reflect infrared, leading to high NDVI readings. Considered in more detail, measuring NDVI using a cell irrigation system includes illuminating a plant, capturing images of it at visible and near-infrared wavelengths, and processing the images. The most convenient illumination source is daylight from the sun. The spectrum of daylight must be taken into account, however. The intensity of daylight at 780 nm is about 75% of that at 660 nm, for instance. Calibrating the spectrum of daylight illumination may be done in any of several ways. The simplest method is to use an assumed average spectrum shape. Alternatively, one may take a photograph of the sky or of a white reference reflector and measure the intensity of light at wavelengths of interest. Still another possibility is to use a model of the daylight spectrum versus time of day, latitude, weather, and/or other factors. Such a model may account for enhanced red and reduced blue intensity when the sun is low in the sky, for example. Further, images of a plant may be captured using a cell irrigation system camera with spectral filters to select visible and near-infrared wavelength, and learning machine is used to identify healthy plant and estimate if fertilizer and/or microbe is needed.

The software can also accept lab data concerning how inputs are used on the farm such as soil analysis data, how much of a particular fertilizer is injected or how much pharmaceutical is given to how many (and which) cows on a dairy farm. Lab tests can provide soil information such as Broad spectrum leaf (BSL) test for the nutrient levels for all twelve plant nutrients including N, P, K, Ca, Mg, S, B, Cu, Fe, Mn, Mo, Zn. The animal health leaf (AHL) determines N, P, K, Ca, Mg, S, B, Cu, Fe, Mn, Mo, Zn and Na, Co, I, Se. A basic leaf (BL) test for N, P, K, Mg. A Nitrogen only (NL) tests for N levels. A heavy metal contamination (SA8) test for levels of Pb, Ni, As, Cd, Cr, Hg, Cu, Zn. The gathered data may be stored to ensure that there is traceability and accountability at all levels of the farming process. The data gathered by the input and output datanother system 20, 22 will be analyzed 24 by the Application and suitable reports will be generated 26. These reports may include recommendations for changing the inputs to the farm 12 to improve or alter the quality of the outputs according to particular goals of the farm 12 or the consumers 16. Other reports may be generated as particular. The reports and any other data gathered by the Application may then be put onto a server 28, such as a web server, which can be accessed by the farm 12 or the consumers 16 over a computer network such as the Internet. In one embodiment, the Application 18 with suitable sensors and relays/actuators can remotely operate or control the farming process and monitors the gathered data to ensure that outputs of adequate quality or of a particular specification are being delivered to consumers 16.

In another embodiment with blockchain security, the Application 18 may itself be under the control of a distributor or consumer 16 since the distributor or even individual consumer would have a stake in ensuring that the outputs of the farm 12 are of acceptable quality or of the particular type. The Application 18 initiates and/or enforces farm management protocols and codes of practice to be followed by suppliers 14, consumers 16 and farms 12 to ensure that the particular outputs are achieved. Moreover, certifications of quality from certified/licensed inspectors are also on the blockchain for easy validation.

One embodiment additionally provides fertilizer recommendations, where the first step in applying the correct rate of fertilizer is calculating crop nutrient requirements. A soil test determines how much $P_2O_5$ and $K_2O$ are available in soils. Applications of $P_2O_5$ and $K_2O$ may not be required annually, depending on how much is available in particular soils, and the amount of $P_2O_5$ and $K_2O$ that is required to meet production goals for the specific crop to be grown. As N is much more mobile in soils and be applied every year to nonlegumes, N requirements are based on the crop to be grown and the soil type that influences yield goals. These recommendations are generally made in conjunction with soil test reports. The app receives three numbers that describe the concentrations of N—$P_2O_5$—$K_2O$. For example, a fertilizer bag of diammonium phosphate will have the numbers 18-46-0 on it, which means it contains a minimum of 18 percent N, 46 percent $P_2O_5$, and no $K_2O$ by weight. For liquid fertilizers, the process determines the density of the solution, as the nutrient concentration is based on the weight and not the volume. Liquid fertilizers such as 30-0-0 (urea ammonium nitrate or UAN), are often used as starter fertilizers or for side dressing corn. The N—$P_2O_5$—$K_2O$ numbers may not add up to 100 percent, because fertilizers usually contain filler materials that help granule formation and assist with even product application. Sometimes the fertilizer label provides additional numbers or additional analysis details if there are secondary or micronutrients such as sulfur, boron, or magnesium in the fertilizer.

Common dry, blended fertilizers available include 20-10-10, 20-20-10, 20-20-0, 0-10-40, and many others. Some, such as 10-10-10 and 19-19-19, contain the same ratio of N—$P_2O_5$—$K_2O$, but require the user to apply almost twice as much of the 10-10-10 product to get the same nutrient application as with the 19-19-19 product. A common liquid fertilizer is urea ammonium nitrate, i.e., 30 percent UAN that weighs 10.86 pounds per gallon and contains 30 percent N by weight. Phosphate and $K_2O$ can be land-applied at any time, but normally it is more cost-effective to apply at the same time as N. However, N is more mobile than $P_2O_5$ and $K_2O$ in the soil and should be applied as closely as possible to the time of crop uptake. Nitrogen in the form of nitrate can be lost from soils via leaching and can be denitrified to N gas in reducing conditions, such as soil saturated with water. Ammonium (NH4+) forms of N are subject to losses through volatilization, especially when surface-applied, but because NH4+ has a positive charge, it is retained by soil particles—especially when injected below the soil surface. Substantial amounts of ammonium can also be lost from surface applications of urea, especially during the warm summer months; applications of fertilizer salts, such as ammonium sulfate, at these times, will reduce these losses. If leaching and/or denitrification are known to be concerns, then ammonium forms of N can perform better. One of the main causes of soil acidity is the oxidation of ammonium forms of N to nitrate-N, the main plant-available form, but in most situation, there is little practical difference between N forms in fertilizers. Fertilizer applications can be split to improve N-use efficiency by crops. For example, part of the crop requirement can be applied as starter fertilizer that can be placed in bands beside seed rows when planting row crops. This helps the first stages of crop growth without applying large rates of N that could be lost before the crop requires it. The rest of the crop N requirement can be applied immediately prior to the time of maximum crop uptake.

The software provides precise and sustainable fertilizer planning and finds the ideal combination of fertilizers and their application rates. It supports all growing methods—open field, fertigation, greenhouses, hydroponics and provides complete fertilizer schedules, according to crop growth stages. The process integrates crop characteristics, field data and yield goals, and balances nutrients in soil as well as in hydroponic nutrient solutions to reach a precise nutrient balance. The data-driven fertilizer and farm management manages fertilizer programs and field test results (soil, water, tissue) for your farm and plots, manages planting dates, fertilizer schedules and harvest, and provides dynamic fertilizer schedules per plot. A dashboard provides actionable insights on farm fertility status and crop yields.

The system maintains full nutrient requirement data for crops, with nutrient uptake rates for hundreds of crops, at different growth stages, data for soil-grown crops, as well as for hydroponic crops, where data is continuously updated based on research analysis and artificial intelligence.

One embodiment works with fertigation farmers. Fertigation is a technique that allows simultaneous application of water and fertilizers through the irrigation system. The process leverages the database for ideal nutritional solution of crops and the water used (pH, electrical conductivity (EC)). The system works as either quantitative or proportional. Quantitative fertigation is based on calculating the nutritional needs taking into account some parameters: number of plants, age, leaf area, soil type, area, nutrient intake, etc. Once the nutritional needs are calculated, they are added to the irrigation system. Proportional fertigation is the most used in soilless and hydroponic. It involves injecting a certain amount of fertilizer for a given volume of water and fertilizer concentration in water. The process calculates what fertilizers (and quantity of them) must be injected in an irrigation system in order to reach the optimal nutrient solution for a specific crop. To do this, user enters inputs parameters (i) optimal needs of the crop under study and (ii) water composition used for irrigation.

One embodiment applies microbial soil additives/enhancements to increase fertilizer uptake. Another embodiment embeds special seeds to specific genetic traits to farmers. Yet another embodiment provides microbial coating on seeds or genetically purified seeds to provide to farmers.

For efficient trading of farm products, one embodiment provides 4 types of auctions: Forward auction; Reverse auction; Penny auction; and Silent auction. Forward auction is the best suite for sellers. Sellers tend to get the best offer for the product they sell at forward auction. An implementation uses Auction Software' solutions, where forward auction works on node.js. Node. js uses a single thread to receive HTTP requests whereas other server scripting languages use multi threads, it is widely used to develop real time applications like video streaming, SPA and network applications and well suited to I/O bound applications, not recommended for CPU bound one. As it's working asynchronously, it doesn't block code and execution ever and so one user may experience a fast execution. By using callbacks and event emitter, it can work asynchronously, which never lets user wait for their tasks getting done. Since it is using a single thread, threads overhead is reduced, which lets the node server to provide high performance.

The system thus provides a platform for farming members to buy farming inputs online at prices negotiated directly with manufacturers, thus circumvents nonvalue-added intermediaries that may charge retail markups and sales commissions. The farmer and the consumer and only constituents creating value participate in the chain while middle men are removed. Last mile delivery is performed economically and quickly using mobile irrigation system, location systems (GPS) and delivery members of the network who are closest to the farm and who can economically transport the farm products to consumers or to a store/marketplace. The Plant-Grow Web site may be configured to enable the user to view reputation information (e.g., feedback) with respect to another user such as a buyer, a seller (farmer or distributor), and intermediate suppliers, among others. The user may request to view the reputation information associated with the opposite transacting party. Alternatively, the user may be presented with the relevant reputation information associated with the opposite transacting party responsive to the user's request to enter into a transaction with another user. The overall view may be provided to the user according to the requesting user's preferences stored in "User Preferences". A view of associated reputation information is then retrieved from the feedback score table stored in "Feedback Score" and the feedback left score table stored in "Feedback Left Score". If the user desires details, then the details may be presented (e.g., in paginated format) utilizing "Feedback Detail History Overall" and "Feedback Detail History". The user may be enabled selectively to access reputation information according to criteria such as promptness of payment information, quality of performance information, timeliness of performance information, or promptness of response information as well as according to other criteria. Other criteria may be, but not limited to, shipping, packaging, item accurately described, promptness of leaving feedback, was the item returned by the shipper, was there a non-payment, when was the item received, etc.

The system improves farm operations. Analytics are used across the value chain to improve operations. Content analysis, for example, focuses on assessing overall food nutrients and quality. Embodiments use synthetic biology-based bacteria diagnostic systems to analyze food and detect harmful and unwanted bacteria.

The system provides analytics for precision agriculture, also known as site-specific crop management, which involves collecting and analyzing information at the individual botanical plant level for improved agricultural practices. AI is applied to data on nutrients, moisture, yield, and more to optimize profitability and sustainability.

In one embodiment, the system can work with Aerial Monitoring Tools, also known as remote sensing, can be conducted by drones, airplanes, and satellites, which monitor conditions from different altitudes to reveal patterns that highlight irrigation problems, soil variation, deforestation, changes in livestock, soil erosion, pest and fungal infestations, and other information that may not be easily apparent at ground level. Airborne cameras can take multispectral images, capturing data from the infrared as well as the visual spectrum. These images can be sequenced to show changes in fields.

Agronomic data gathered from precision monitoring technology, historic weather data, and other sources are learned by artificial intelligence/learning machines to conduct detailed analysis, ranging from the descriptive to the prescriptive. By improving the volume, quality, flow, and frequency of information used in farming and other value chain stages, food production can become more efficient, productive, and sustainable. The volume of data for agribusiness is steadily expanding due to sensors, satellite monitoring, and other information gathering technologies. The quality of information is improving with more sophisticated data-gathering instruments, as well as crowd-sourced farmer data whose privacy is secured through the blockchain. The flow of information is enhanced via platforms that connect various stakeholders across the value chain Finally, the frequency of information is increasing with improved Internet connectivity, device-enabled products sending data to cloud analytics platforms (i.e., Internet of Things), and many other advancements. As the quantity, quality, speed, and flow of data improves, data analytics platforms and machine learning applications can enable better practices in farming, processing, and manufacturing.

The AI can be expert based or statistical learning based. Expert (knowledge) systems contain two basic elements: inference engine and knowledge base. The knowledge base holds all information related to the tasks at hand: the rules and the data on which they will be applied. The inference engine is a mechanism that can operate the information contained in the knowledge base. In a rule-based system, the knowledge base is divided into a set of rules and working memory (or database). Just like an IF-THEN sentence, each rule has two parts: a premise and a conclusion. A rule is said to be fired when the inference engine finds the premise is stored as TRUE in working memory (the knowledge base) and it incorporates the conclusion of the rule to the working memory (knowledge base) too. Working memory is the database contained in the knowledge base. This holds all facts that describe the current situation. Generally, the expert system will start with very few facts. These will expand as the system learns more about the situation at hand, and as far as some rules are executed. The inference engine or rule interpreter has two tasks. First, it examines facts in working memory and rules in the rule base, and adds new facts to the database (memory) when possible. That is, it fires rules. Second, it determines in what order rules are scanned and fired. The inference engine can determine the order in which rules should be fired by different methods such as forward chaining, backward chaining, breadth- or depth-wise scan techniques, etc. Applications that use forward chaining, such as process control, are called data-driven. Applications that use backward chaining are called goal-driven. Forward chaining systems are typically used where relevant facts are contained in small sets and where many facts lead to few conclusions. A forward chaining system must have all its data at the start, rather than asking the user for information as it goes. Backward chaining should be used for applications having a large set of facts, where one fact can lead to many conclusions. A backward-chaining system will ask for more information if needed to establish a goal.

In addition to expert systems, a pattern recognizer called neural networks can be used. Neural networks attempt to mimic the human brain by "learning" different sets of stimulus patterns (such as medical symptoms) and their associated responses (diagnoses). Incomplete and/or overlapping sets of stimuli can be presented to the neural network, which can then return several responses matching those stimuli using probability weightings to produce an ordered list of responses. Each neural network problem session contains a set of defined stimuli, a set of defined responses, and a set of relationships between specific groups of stimuli and the response that each group is to produce. The set of stimuli (responses) is represented by nodes at what is called the "input (output) layer." Then, there is usually one or more intermediate layers, containing nodes that are each linked to every input layer node and every output layer node in the network. The number of the middle layer nodes is usually equal to the average of the number of input and output nodes. Probability values (weights) are then associated with each of these connections and are constantly being updated as the network "learns" new information.

Learning machines with Hidden Markov Network, statistical recognizers, and deep learning systems are detailed in United States Patent Application Nos. 20020116196 and 20180253840 to Bao Tran, the content of which is incorporated by reference. As described therein, deep learning network such as TensorFlow can be used. As well as the different techniques in machine learning, there are three different types: supervised, unsupervised, and reinforcement learning. Supervised learning, which involves feeding a machine labeled data, is the most commonly used and also has the most practical applications by far. Another embodiment uses reinforcement learning, which mimics the process of training animals through punishments and rewards. Additionally, symbolic approaches, knowledge-based systems, Bayesian networks, and support vector machines can be used.

The learning machine is applied to hyper-local weather monitoring, agronomic data modeling, and high-resolution weather simulations to deliver mobile Software as a Service (SaaS) solutions that help farmers make better informed operating and financing decisions. Farmers can share farming data on inputs, soils, yields, and prices to improve performance and productivity across the value chain. The system also provides an advisory service to help farmers consult with experts for problems with the farm. Certain farmers can become experts on certain product usages and can consult for other farmers on proper practices. The web-based system allows users such as agronomist or farm expert to manage the system practices on-line. The user can view all aspects of farming cases on-line. The user can also order advertising and marketing materials, chat on-line with other system agronomist or farm expert, review the system's how-to tutorials, and link to the user's personal website. The system receives all data previously captured by the mobile app and/or manual upload of lab results, images, and notes. The web-based system helps users such as the treating agronomist or farm expert to ensure that agricultural products (fertilizer/microbes/watering systems) received from suppliers will be used by the farmer the way the manufacturer intended. The system does this with a dynamic 3-D animation called a virtual treatment model. The system not only shows the simulation of expected plant growth but also the expected economic gains. The system gives the user control over usage: if the animation the user sees does not depict the treatment or outcome the user intended, the system allows the user to send feedback to the expert or user with instructions on how to re-set the case. When the user views the case online through the web site (for example, at www.plant-grow.com), the system contacts the provider's computer system over the Internet and downloads the treatment model to the user's computer, e.g., at work or at home. The system then allows the user to play an animation showing the treatment progressing over time, starting and stopping at any point during the treatment. The system allows a treating professional, described below as a "user", to view the status of all the cases at any point in time. Within the home page, a Farmer Chart appears on the right hand side of the page. The chart is divided into two columns—those cases that require action—Action Required—and those that do not—No Action Required. Within these lists, a status will appear next to each farmer name. This status identifies the current point of treatment for the farmer's farm. For example, if the user has farmer John Doe in the Action Required column, and his status reads Awaiting Your Approval, the expert will need to view and approve of an aspect of Mr. Doe's file in order to continue with his treatment. This is similar to a docketing system with deadlines based on unique events as described in United States Patent 7369701, the content of which is incorporated by reference.

Automated Plant Recognition from Leaf and Soil Chemistry Collection

The system helps untrained field personnel in collection data using mobile devices. One embodiment allows the camera of the irrigation device to auto detect the type of plant based on leaf and/or fruit images. The system also collects soil data using a probe inserted into the ground that communicates with the irrigation system. In this system, a farm worker walks through the rows of plants with the mobile irrigation system and the mobile irrigation system camera captures views of the products. Image recognition of the plant or fruit is done to estimate the soil condition, the yield, and product quality (size, age/sweetness/ripeness, for example), all of which is placed on the blockchain for authenticity verification. The user can periodically insert the probe to test soil conditions. The user can sign off as the auditor or inspector of the products, and such information is then placed on the blockchain for supply chain audits if needed. Consumers can verify that the products are coming off the right farm by looking up the blockchain.

In FIG. 4A, the process trims the image to a relevant area, in this case the leaf, seed, or flower area. Leaf or flower feature information is extracted and compared to feature information of previously annotated plant parts. The similarity is calculated and candidate plants are identified in descending order of similarity. A learning machine is also applied to all known factors to increase classification accuracy. Then based on the leaf or flower characteristics, soil analysis is done where at least nitrogen level is estimated using leaf color, as detailed in FIG. 4B.

In one embodiment shown in FIG. 4B, a digital image in 2D discrete space is derived from an analog images a (x, y) in a 2D continuous space through a sampling process that is frequently referred to as digitization. The 2D continuous image a (x, y) is divided into rows (N) and columns (M). The value assigned to the integer coordinates [m, n] with $\{m=0, 1, 2, \ldots, M-1\}$ and $\{n=0, 1, 2, \ldots, N-1\}$ is a [m, n]. In fact, in most cases a (x, y) which can be the physical signal that impinges on the face of a 2D sensor, is actually a function of many variables including depth (z), color ($\lambda$), and time (t). Commonly encountered value of rows (N) and columns (M) are 256, 512, 525, 625, 1024, 1035 $\{M=N=2K$ where $(K=8, 9, 10)\}$. The number of distinct gray levels is usually a power of two, that is, $L=2B$ where B is the number of bits in the binary representation of the brightness levels. Initially, preprocessing of all images was done to enhance their visual quality, further to achieve the various features of color images and to transform color (RGB) images into normalized r, g, and b chromaticity coordinates. The composite color images were decomposed into red spectrum image (R), green spectrum image (G), and blue spectrum image (B) components. Subsequently, the images were also converted into hue, saturation, and intensity (HIS) coordinates to extract the intensity component (Ahmad et al., 1999). In order to extract the color information and to obtain different features, the entire image features were segmented from its background using an automatic segmentation technique based on Otsu's algorithm (Otsu, 1979). The automatic threshold technique selects a threshold to segment the background from the object. Thus, segmented images are used to calculate the mean values of images. Four image features (mean, variance, average energy, and entropy) from each normalized 'r' and 'g' segmented image histogram of paddy leaves were calculated.

The parts of a tree or plant are segmented and each part is recognized individually. Then a module determines the final recognition from the part module. A recognition dictionary file includes a data record, in which feature amount data of all part divisions 1-N, is recorded in association with the commodity ID and the commodity name for distinguishing each commodity (recognition object). A unique commodity ID is assigned to each commodity sold in a store. In the commodity data file, commodity information including a commodity name, a unit price, a category code and the like is preset in association with the commodity ID of each commodity. The feature amount data in each part division of a commodity distinguished by the commodity ID represents surface information, including the external shape, the tint, the pattern, the concave-convex condition (surface roughness) and the like, of the part distinguished by the part division of the commodity in the form of parameters. Part divisions of a commodity are illustrated with reference to FIG. 3. For example, the commodities 'radish' and 'turnip' are both root crops of family cruciferae and are both roughly divided into a leaf part and a root part. The root part of the commodity 'radish' is divided into a green head part close to the leaf part and a white root part away from the leaf part. The root part of the commodity 'turnip' is also called the white root part. Thus, for the commodity 'radish', feature amount data is recorded according to a part division '101' representing the leaf part, a part division '102' representing the green head part and a part division '103' representing the white root part, respectively. On the other hand, for the commodity 'turnip', feature amount data is recorded according to the part division '101' representing the leaf part, and the part division '103' representing the white root part, respectively. That is, the number N of the part divisions is different according to commodities. The feature amount extraction module extracts, from an image captured by the camera, the appearance feature amount concerning the surface information of the commodity, such as the external shape, the tint, the concave-convex condition (surface roughness) and the like, contained in the image captured. The commodity recognition module compares the data of the appearance feature amount extracted by the feature amount extraction module with the feature amount data of each part division (feature amount data of each part) contained in the recognition dictionary file to recognize the commodity contained in the image. In more detail, for the feature amount data of each part division contained in the recognition dictionary file, a similarity degree representing how much similar an appearance feature amount is to the feature amount data of the part division is calculated, and the commodity contained in the image is recognized based on the similarity degree of the feature amount data of each part division. Specifically, the similarity degree of the feature amount data of each part division of the commodity is summed for each commodity, if the sum of similarity degrees is higher than a given threshold, then the commodity having the feature amount data of each part division thereof is determined to be a recognition candidate, otherwise, the commodity is determined not to be a recognition candidate. The output module outputs the recognition resirrigation of the commodity recognition module, that is, information of the commodity that is determined to be a recognition candidate.

For the feature amount data of each part division contained in the record, a similarity degree representing how much similar the appearance feature amount extracted are to the feature amount data of each part division contained in the record. When each similarity degree is calculated for the feature amount, data of each part division, the similarity degrees of the feature amount data of part divisions are summed and the process determines whether the sum of similarity degrees is higher than a given threshold. If the sum of similarity degrees is higher than the threshold, then the process stores the commodity ID and the commodity name of the commodity subject to the recognition recorded in the data record as a candidate of registration commodity. If the sum of similarity degrees is not higher than the threshold, the item does not match. The process determines whether there is a candidate of registration commodity (recognition candidate). If none of the commodity ID and the commodity name of a commodity serving as a registration commodity candidate is stored in the given area of memory, then it is determined that there is no registration commodity candidate. On the other hand, if the commodity ID and the commodity name of at least one commodity, it is determined that there is a registration commodity candidate. The process proceeds to execute the next processing. For example, a list of registration commodity candidate is displayed on the touch screen to enable a user to select one commodity candidate optionally. In the present embodiment, the feature amount data of each part division representing the surface information in each part of a commodity subject to the recognition is stored in the recognition dictionary file.

For example, 'radish' is exemplarily described as a commodity M. For the commodity 'radish', the feature amount data of each part division of the commodity "radish" is previously stored in the recognition dictionary data structure in association with a part division '101' representing a leaf part, a part division '102' representing a green head part and a part division '103' representing a white root part, correspondingly. For a commodity 'turnip' which is a root crop of family cruciferae the same as the commodity 'radish' also, the feature amount data of each part division thereof is previously stored in the recognition dictionary data structure in association with the part division '101' representing the leaf part and the part division '103' representing the white root part, correspondingly, along with the part division '102' representing the green head part is stored for the commodity 'turnip'.

Assuming that the whole of the commodity 'radish' is photographed by the camera, the leaf part, the green head part and the white root part of the commodity 'radish' are shown in the image photographed. The similarity degree between the feature amount of each of the commodity surface information extracted from the image and the feature amount data of each part division of the commodity 'radish' recorded in the recognition dictionary file rises. Contrary to this, the similarity degree between the feature amount of each of the same commodity surface information (radish) extracted from the image and the feature amount data of each part division of the commodity 'turnip' contained in the recognition dictionary data structure is lower than the similarity degree for the commodity 'radish' in the both of the leaf part and the white root part because of the image including the green head part. As a result, even almost all the appearance parts of commodities are identical such as "radish" and "turnip", the process can distinguish the commodity 'radish' from the commodity 'turnip' at a high probability.

Assuming that the leaf part and the green head part of the commodity 'radish' are photographed by the camera, while almost all the white root part thereof is not photographed, and since the leaf part and the green head part of the commodity 'radish' are contained in the image, the similarity degrees between the feature amount of each of the commodity surface information extracted from the image and the feature amount data of the leaf part and the green head part of the commodity 'radish' rise. Contrary to this, the similarity degrees between the feature amount of each of the same commodity surface information and the feature amount data of each part division of the commodity 'turnip' are lower compared with the similarity degree for the commodity 'radish' because of the green head part contained in the image photographed. The same resirrigation is also obtained in case that the green head part and the white root part of the commodity 'radish' are photographed by the irrigation system camera. Thus, the process can recognize a commodity at a high probability even if the commodity is not wholly photographed by the camera.

In another embodiment, each similarity degree between the feature amount data of each of a plurality of part divisions of one commodity and the feature amount of each of the commodity surface information extracted from a captured image is calculated, and a determination is made on whether or not the sum of the similarities is higher than a given threshold to recognize the commodity. Thus, in some cases depending on the captured part of the commodity, there is a possibility that other commodities which are similar in appearance with the recognition object (commodity) are incorrectly recognized as a candidate of commodity to be registered.

For example, it is assumed that a commodity 'turnip' is photographed by the camera. In this case, the leaf part and the white root part of the commodity 'turnip' are shown in the image. Thus, each similarity degree between the feature amount of each of the commodity surface information extracted from the captured image and feature amount data of the commodity 'turnip' recorded in the recognition dictionary data structure rises in both the leaf part and the white root part thereof. Likewise, the each similarity degree between the feature amount of each of the same commodity surface information extracted from the image and feature amount data of the commodity 'radish' recorded in the recognition dictionary data structure rises in both the leaf part and the white root part thereof. Thus, the process can hardly determine whether the commodity photographed by the irrigation system camera is 'turnip' or 'radish'.

However, the feature amount data of part division of green head part that is a specific part of the commodity 'radish' is contained in the feature amount data of a part division of the commodity 'radish' recorded in the recognition dictionary data structure. If the commodity photographed by the irrigation system camera is 'turnip', then the similarity degree between the feature amount data of the commodity surface information and the feature amount data of part division of the green head part is low, almost to 0%. On the other hand, if the commodity photographed by the irrigation system camera is 'radish', then the similarity degree between the feature amount data of the commodity surface information and the feature amount data of part division of the green head part is not always 0%. That is, in the process, even if the similarity degrees of the leaf parts and the white root parts of commodities 'radish' and turnip' are substantially the same, if the similarity degree of the green head part is high, then the commodity read is recognized as 'radish', or if the similarity degree of the green head part is 0%, then the commodity is not recognized as 'radish'.

In one embodiment, the process retrieves the recognition dictionary file to read the data record (commodity ID, commodity name, feature amount data of each part division) of a commodity and calculates each similarity degree for the feature amount data of each part division in the record and sums the similarity degrees of the feature amount data of each part division. Then, the process determines whether or not the sum of similarity degrees is higher than a given threshold and if so, the process checks the data record to determine whether or not there is a specific part and if so the process determines the similarity degree between the feature amount data of the part division of which the flag is set to '1' and the feature amount of the commodity surface information extracted from the image.

Like in the first embodiment, the process calculates the similarity degree between the feature amount of data of each of a plurality of part divisions of a commodity and the feature amount of each of the commodity surface information extracted from a captured image and determines whether the sum of the similarities is higher than a given threshold, thereby recognizing the commodity. However, if the sum of the similarity degrees is higher than the given threshold, the process confirm whether the feature amount of data of the division of a specific part is higher than a given threshold as long as the feature amount data of the part division is processed. Then, the process stores the commodity ID and the commodity name of the commodity in a given area as a registration commodity candidate if the similarity degree of the specific part is higher than the threshold, or excludes the commodity subject to the processing from the registration commodity candidate if the similarity degree thereof is not higher than the threshold.

In the case in which a commodity 'radish' is photographed by the irrigation system camera, since the similarity degree of the specific part of the commodity 'radish', that is, the green head part, is higher than the threshold on the data record of the commodity 'radish', thus, the commodity 'radish' becomes a registration commodity candidate. However, in the case in which a commodity 'turnip' is photographed by the image capturing module 14, the commodity 'radish' does not become a registration commodity candidate even if the sum of similarities of almost all part divisions of the data record of the commodity 'radish' except the part of the green head thereof is higher than a threshold, because the similarity degree of the green head part of the commodity 'radish' is not higher than the threshold. Therefore, the process can recognize a commodity at a higher accuracy.

In a further embodiment, the process calculates the similarity degree between the feature amount data of each of a plurality of part divisions of a commodity and the feature amount of each of commodity surface information extracted from a captured image of a commodity and determines whether or not the sum of the similarity degrees is higher than a given threshold, thereby recognizing the commodity. However, even in the case in which the sum of the similarity degrees of the subject commodity is above the threshold, if the similarity degree for at least one feature amount data of part divisions does not exceed K %, that is, if the similarity degree of the part is low and so found not to be similar, then the process excludes the subject commodity from the registration commodity candidate.

Like in the second embodiment, in the case that a commodity 'radish' is photographed by the irrigation system camera, for the data record of the commodity 'radish', the similarity degree of a specific part of the commodity 'radish', i.e., a green head part, is higher than K %, and thus, the commodity 'radish' becomes a registration commodity candidate. However, in the case that a commodity 'turnip' is photographed by the image capturing unit, for the data record of a commodity 'radish', even if the sum of the similarities of almost all parts of the commodity 'radish' is higher than a threshold, the similarity degree of the green head part does not exceed K %. Therefore, the commodity 'radish' does not become a registration commodity candidate. Thus, even no flag f is set in the data record of the recognition dictionary data structure, the process can recognize a commodity at a higher accuracy.

Aerial images are used in conjunction with GPS data to provide geo-coordinates using geo-fencing methods to arrive at the boundaries of the farm. Moreover, based on landmarks such as roads/paths that delineate different crops grown within the farm, the application can detect different crops.

In another embodiment, whole fruit, seed, leaf or flower recognition can be done. A captured image G includes an image F of the flower, which is a main subject, and a background B. Here, an image already imaged and retained in the storage and attention point information for narrowing down candidates based on information such as the blooming season, flower size, height, and leaf shape. In this embodiment, the extracting section identifies feature information of the image F of the imaged flower and feature information for comparison. With this, flower sample images D3 having a high similarity to the image F of the imaged flower are extracted as candidate images. The captured image G including the flower image F, the plurality of flower sample images D3 extracted as candidate images, and their respective flower names D1 are arranged for narrowing down the flower candidates is further arranged on display. The flower candidate images D3 are assumed to be arranged in descending order of similarity. In this guided or supervised training, the user teaches the system similar flowers or leaves for identification. With this, the user can make a comparison by using not only flower shapes but also leaf shapes. If a determination cannot still be made, with a predetermined operation of the operation section 14, images D5 indicating attention points for narrowing down the flower names. Since the attention points are indicated by arrows in the attention-point-indicating images D5, when the user carefully compares the attention points or specifies a size, color, growing season, height, and others of the flower as attention points in the attention point information D6, the flowers can be narrowed down.

First, processing for cutting out the flower image F, which is a main subject, from the captured image G is performed. Also, feature information is extracted from an area of the leaf, seed, or flower. Then, a comparison is made with the feature information stored in the database. A similarity between the feature information in the database for comparison and feature information extracted from the flower area is calculated, and, for example, six leaf sample images are extracted in descending order of similarity. Then, sample images are arranged for display in order of similarity.

In another embodiment, the subject is imaged as moving pictures, and a leaf or flower area can be extracted from not only a still picture but also a moving image. Portions common to the other embodiment are provided with common reference characters and are not described herein. In image extraction processing in the second embodiment, a Graph Cuts method is applied. The Graph Cuts method is one of schemes of solving a problem of segmentation (image area division) as a problem of energy minimization. With the Graph Cuts method, a global solution of an energy function defined from each area can be found and, as a result, segmentation using characteristics in both area and boundary can be advantageously achieved.

The process creates feature amount maps of a plurality of types from contrasts of feature amounts of a plurality of types, for example, color, azimuth, and luminance. A series of processing until a feature amount map of one predetermined type is created from among the plurality of these types are hereinafter referred to as feature amount map creation processing. For example, a feature amount map Fc is created as a resirrigation of feature amount map creation processing for multi-scale contrast. Also, a feature amount map Fh is created as a resirrigation of feature amount map creation processing for a Center-Surround color histogram. Furthermore, a feature amount map Fs is created as a resirrigation of feature amount map creation processing for a color space distribution. Next, the PROCESS unifies the feature amount maps of the plurality of types to find a saliency map. The PROCESS uses a saliency map to estimate an image area with a high possibility of attracting human visual attention (hereinafter referred to as an attention point area) from among processing target images. For example, in the example of FIG. 8, an attention point area to an attention point area of a plurality of stages are estimated from the processing target image by using the saliency map S. An attention point area is an area having a value higher than a predetermined threshold Sth-r when the saliency map S is binarized by using the threshold Sth-r. In the area dividing processing with the Graph Cuts method at Step Sf, the processing target image 61 is segmented (divided) into a main subject area and a background area. To achieve this area dividing processing, labels and seeds as samples of the main subject area and the background area are required. The process performs the following processing as core area extraction processing. The process uses the attention point areas of the plurality of stages to extract a core area of each attention point area. For example, a core area of each attention point area is extracted based on an area where a change in the attention point areas of the plurality of stages is small or a redundant area of the attention point areas of the plurality of stages.

Next, seed setting processing is described. Specifically, the process sets a seed of the main subject area and a seed of the background area based on, for example, the core areas of the attention point areas. The setting scheme itself is not particularly restrictive. For example, it is possible to adopt a scheme of setting the core area of the attention point area as it is as a seed of the main subject area. It is also possible to adopt a scheme of setting a rectangular area inscribed or circumscribed about the core area of the attention point area, or a barycenter or skeletal line of the attention point area as a seed of the main subject area. It is further possible, for example, to adopt a scheme of setting a core area with low saliency, a rectangular area other than the attention point area, or a barycenter or skeletal line of an area other than the attention point area as a seed of the background area.

Also, to achieve the area dividing processing with the Graph Cuts method at Step Sf, an advance probability Pr(O) of the main subject area and an advance probability Pr(B) of the background area are required. The process computes a value of the saliency map S (here, a value obtained by normalizing the saliency map value in a range of 0 to 1) as the advance probability Pr(O) of the main subject area. The PROCESS also computes a value obtained by reversing the saliency map S (a value of 1−the value of the saliency map), that is, 1−Pr(O), as the advance probability Pr(B) of the background area. For example, in the example of FIG. 8, the advance probability Pr(O) of the main subject area and the advance probability Pr(B) of the background area are obtained from the saliency map.

Next, the process performs the area dividing processing with the Graph Cuts method. Here, in a conventional Graph Cuts method, in order to learn a substance and a background, labels and seeds as samples of a substance area (a main subject area) and a background area are manually given. By contrast, in the present embodiment, seeds of the main subject area and seeds of the background area automatically set in the processing at Step Sd can be used. As a result, there is no need to manually input seeds as in the conventional technology or to learn the substance and background. Furthermore, the advance probability Pr(O) of the main subject area and the advance probability Pr(B) of the background area computed in the processing at Step S3 are based on the saliency map S, and can be adopted as advance probabilities of t-link in the Graph Cuts method. As a result, appropriate spatial information of the main subject area can be obtained. The processing target image is divided into a main subject area and a background area. Then, data of the main subject area is extracted as image data of a "moving image part. This extracting scheme is not particularly restrictive, and so-called cut-out extraction or so-called alpha-channel extraction may be used. With these processing at Steps Sa to Sf being repeatedly performed for each of the plurality of frame image data, moving image data of the "moving image part" and others are extracted.

In moving image extraction processing, from among moving image data obtained as a result of loop processing, the process sets predetermined captured image data (frame image data) as processing target image data. Saliency map extraction is done to find a saliency map. The process performs advance probability computing processing. The advance probability Pr(O) of the main subject area and the advance probability Pr(B) of the background area can be obtained. The saliency map is used to estimate an attention point area and the attention point areas of the plurality of stages to perform core area extraction processing. The process uses the core area of the attention point area to perform seed setting processing.

The process uses the advance probability Pr(O) of the main subject area and the advance probability Pr(B) of the background area and the seeds of the main subject area and the seeds of the background area to perform area dividing processing with a Graph Cuts method. With this, a frame image corresponding to processing target image data is segmented (divided) into a main subject area and a background area, and temporarily retains data corresponding to the main subject area after division as image data of "moving images" and sequentially extracting image data of "moving images". Moving image data of "moving images" and others are configured of image data of the plurality of "moving images" extracted from the plurality of respective captured image data. Thus, when the moving image extraction processing ends, the moving image data of the "moving images" and others are compressed and encoded, and the resultant encoded image data is recorded on the memory or the like.

As described above, in the attention point area estimation processing, a saliency map is created to estimate an attention point area. Therefore, for example, the Treisman's feature integration theory or a saliency map by Itti, Koch, et al. can be applied to the attention point area estimation processing. In one embodiment using attention point estimation processing when the Treisman's feature integration theory or a saliency map by Itti and Koch is applied, the process creates a Gaussian resolution pyramid. Specifically, for example, the PROCESS repeatedly and sequentially performs Gaussian filtering processing and down sampling processing with processing target image data {(pixel data at a position of (x, y)} being taken as $I(0)=I(x, y)$. As a result, a set of hierarchical scale image data $I(L)$ (for example, $L\varepsilon\{\ldots 8\}$) is generated. This set of hierarchical scale image data $I(L)$ is called a Gaussian resolution pyramid. Here, when the scale L=k (here, k is any of integer values from 1 to 8) holds, the scale image data 1(k) represents an image reduced by ½k (an original image when k=0). The process starts each feature amount map creation processing. The process determines whether all feature amount map creation processing have ended. If even one of the feature amount map creation processing has not ended, NO is determined, and the processing loops back. That is, the determination processing is repeatedly performed until all feature amount map creation processing end. Then, if all feature amount map creation processing have ended to create all feature amount maps. The process combines the respective feature amount maps together with a linear sum to find the saliency map S. When the saliency map S is found in this manner, the saliency map extraction processing ends.

A specific example of each feature amount map creation processing is described with examples of feature amount map creation processing for luminance, color, and directivity. The process then performs feature amount map creation processing for luminance. The process sets each attention pixel from each scale image corresponding to the processing target image data. The following description is made assuming that each attention pixel cε{2, 3, 4} is set. Each attention pixel cε{2, 3, 4} is a pixel set as a computation target on the scale image data I(c) of a scale cε{2, 3, 4}. The process then finds a luminance component of each scale image of each attention pixel cγ{2, 3, 4}. The process finds a luminance component of each scale image of a surrounding pixel s=c+δ of each attention pixel. The surrounding pixel s=c+δ of each attention pixel is a pixel present so as to surround an attention pixel (a corresponding point) on the scale image I(s) of a scale s=c+δ when, for example, δε{3, 4} is set. The process finds a luminance contrast at each attention pixel cc{2, 3, 4} for each scale image. For example, the process finds an interscale difference between each attention pixel cc{2, 3, 4} and the surrounding pixel s=c+δ (for example, δε{3, 4}) of each attention pixel. Here, when it is assumed that the attention pixel c is referred to as Center and the surrounding pixel s of the attention pixel is referred to as Surround, the found interscale difference can be referred to as a Center-Surround interscale difference for luminance. This Center-Surround interscale difference for luminance has a property of having a large vale when the attention pixel c is white and the surrounding pixel s is black or vice versa. Therefore, the Center-Surround interscale difference for luminance represents a luminance contrast. This luminance contrast is herein after described as I(c, s). The process then determines whether a pixel not set as an attention pixel is present in each scale image corresponding to the processing target image data. If such a pixel is present, the processing thereafter is repeated. The system can then determine the luminance contrast I(c, s) for each pixel. Here, when each attention pixel cε{2, 3, 4} and each surrounding pixel s=c+δ (for example, δε{3, 4}) are set, with one series of processing at Step S61 to Step S65, (three attention pixels)×(two surrounding pixels)=six luminance contrasts I(c, s) are found. Here, a collection of the luminance contrasts I(c, s) found for the predetermined c and the predetermined s for all the images is referred to as a feature amount map for the luminance contrast I. As a resirrigation of repetition of the loop processing, six feature amount maps for the luminance contrast I are found. The process creates a feature amount map for luminance by normalizing each of the feature amount maps for the luminance contrast I and then combining the normalized feature amount maps. With this, the feature amount map creation processing for luminance ends.

Hereinafter, the feature amount map for luminance is described as FI for differentiation from other feature amount maps.

The Center-Surround interscale difference of luminance is found as the luminance contrast I(c, s). By contrast, a Center-Surround interscale difference of each of color phases (RIG and B/Y) is found as a color phase contrast. Among color components, a red component is represented by R, a green component is represented by G, a blue component is represented by B, and a yellow component is represented by Y. Also, hereinafter, a color phase contrast for the color phase RIG is described as RG(c, s) and a color phase contrast for the color phase B/Y is described as BY(c, s). In an implementation three attention pixels c are present and two surrounding pixels s are present and six feature amount maps for luminance contrast I are obtained. Eventually, a feature amount map FI for luminance is found. The directivity component is an amplitude component in each direction obtained as a resirrigation of convoluting a Gaussian filter φ with respect to a luminance component. The direction herein is a direction indicated by an angle of rotation θ present as a parameter of the Gaussian filter φ. For example, as the angle of rotation θ, four directions can be adopted, that is, 0°, 45°, 90°, and 135°. The process can also create a feature amount map by using each of feature amounts of brightness, color saturation, color phase, and motion. Also, as the feature amount map creation processing, it is possible to adopt processing to create a feature amount map by using each of feature amounts of multi-scale contrast, a Center-Surround color histogram, and color spatial distribution.

The process finds a feature amount map for color spatial dispersion by using the color spatial dispersion. With this, the feature amount map creation processing for color spatial distribution ends. Hereinafter, the feature amount map for color spatial distribution is described as Fs for differentiation from other feature amount maps.

While a still image is captured as a captured leaf, seed or flower image are described above, in another embodiment, moving pictures or continuous imaging is used. In this embodiment, with the moving image imaging function, product images F are imaged as moving pictures (continuously imaged), thereby obtaining a plurality of product image frames. In the following example, a flower is analyzed, but leafs and seeds can also be analyzed. For an example, moving pictures of flowers are discussed, but the same is applicable to leaves or seeds. When a flower area is extracted from the imaged flower image, continuously imaging a plurality of images can increase extraction accuracy. Since the flower imaging angle at the time of imaging and the angle of the flower sample image stored in the database 110 as a comparison target do not necessarily match each other, the presence of flower images imaged at different angles may increase the probability of successful searching. However, the image processing time and the load on the processor are increased accordingly. In the present embodiment, a still image is initially imaged, and if the name of a flower with a similarity equal to or more than a predetermined similarity cannot be extracted due to execution of the flower search program, video processing can be done.

FIG. 4C shows an image of a plant's root treated with microbes, while FIG. 4D shows the root of an untreated plant. To identify if the microbes/fertilizer should be added, the process estimates the mass of the root by counting the pixels of the root and determining a ratio of the current root over a reference root, and then the process recommends more solutions if the root mass is below a predetermined threshold.

In one embodiment, if the product (leaf or flower) is below a predetermined range, the system can recommend applications of fertilizer based on soil data followed by microbial amendment treatment until the product reaches a max size where more chemicals and microbes no longer increase yield. The system can run an optimization such as Simplex optimization on the cost and yield to come up with a cost-effective recommendation.

Predictive Maintenance and AR Repair

Another system includes a frame, water valves attached to the frame to dispense water to crops in the field, sensors to capture moving parts on the irrigation system, and a processor to control movement of the frame to move around a field for irrigation, the processor also collecting system operation parameters to predict part failure and request replacement parts ahead of the predicted failure. One embodiment collects operational parameters from a population of irrigation systems and predict failure based on population statistics.

The data captured by sensors and communicated over a wireless network to a central computer can be used for predictive management as well as for meeting a particular service level agreement (SLA), which is a contract between a service provider (either internal or external) and the end user that defines the level of service expected from the service provider. SLAs are output-based in that their purpose is specifically to define what the customer will receive. SLAs do not define how the service itself is provided or delivered. The metrics that define levels of service for a freezer SLA provider should aim to guarantee:

A description of the service being provided— maintenance of areas such as network connectivity, domain name servers, dynamic host configuration protocol servers Reliability—when the service is available (percentage uptime) and the limits outages can be expected to stay within Responsiveness—the punctuality of services to be performed in response to requests and scheduled service dates Procedure for reporting problems—who can be contacted, how problems will be reported, procedure for escalation, and what other steps are taken to resolve the problem efficiently Monitoring and reporting service level—who will monitor performance, what data will be collected and how often as well as how much access the customer is given to performance statistics Consequences for not meeting service obligations—may include credit or reimbursement to customers, or enabling the customer to terminate the relationship.

Escape clauses or constraints—circumstances under which the level of service promised does not apply. An example could be an exemption from meeting uptime requirements in circumstance that floods, fires or other hazardous situations damage the ISP's equipment.

Though the exact metrics for each SLA vary depending on the service provider, the areas covered are uniform: volume and quality of work (including precision and accuracy), speed, responsiveness, and efficiency. In covering these areas, the document aims to establish a mutual understanding of services, areas prioritized, responsibilities, guarantees, and warranties provided by the service provider.

The level of service definitions should be specific and measurable in each area. This allows the quality of service to be benchmarked and, if stipulated by the agreement, rewarded or penalized accordingly. An SLA will commonly use technical definitions that quantify the level of service such as mean time between failures (MTBF) or mean time to recovery, response, or resolution (MTTR), which specifies a "target" (average) or "minimum" value for service level performance.

With the sensors, the system's predictive maintenance leverages the Internet of Things (IoT) by continuously analyzing real-time equipment sensor data via machine monitoring to understand when maintenance will be required. Technician locations are coupled with replacement/repair equipment available and job completion time to identify the best technician available to perform the needed service during a scheduled downtime. The system leverages real-time condition monitoring and predictive maintenance to optimally maintain equipment. The system maintains the highest equipment availability while decreasing current costs:

Avoid costly corrective or preventative maintenance

Ensure performance and availability utilizing real-time sensor data for condition monitoring and prediction Diminish technician overtime and "just in case" spare parts inventory levels Certain embodiments of the invention employ systems and methods that may select assets for repair and that may evaluate the subsequent repair process and the results of repairs. In one example, repairs may be evaluated with respect to changes in status, reliability or energy consumption. An analysis of performance data and metadata may be used to select assets in need of maintenance and/or repair. In some instances, the analysis of performance data may be used to suggest or select a repair process to address identified performance issues and other conditions. Information collected during the repair process may be captured and/or aggregated to assist in later analyses. Such information may be used to devise new repair strategies, policies and/or standard operating procedures.

In certain embodiments, a user may provide contextual information such as performance characteristics, design, type, make, model, manufacturer, configuration, repair history, configuration settings, environmental conditions, and other in-service information (which may be collectively referred to as metadata) to facilitate a better understanding of the many factors and variables that could affect performance of irrigation systems and the effectiveness and long-term persistence of repairs and repair methodologies.

Certain embodiments may employ asset tagging features and methods to correlate information obtained from sensors and metadata with performance analysis and benchmarking information and/or information identifying whether repairs result in improved or achievement of expected levels of performance. Tags may be added, deleted or changed to characterize the state-of-health and status of repairs. In one example, a user and/or the system may increment or decrement the status or state of a repair to indicate a desired or deemed status of the asset so as to control the next response or action of a service provider. In this manner, the system can keep the service provider engaged and accountable until the repair is determined to have been effective and/or persistent over time, such that the irrigation assets performs in accordance with desired or targeted performance levels and/or for a predetermined period of time after the repair.

To facilitate efficient repair and maintenance practices, the repair process may be managed and controlled in stages. Stages and gates may be defined to control progress between stages. For example, certain gates may control whether one or more further actions are allowed or not allowed depending on successful completion of previous states, events or outcomes.

In certain embodiments, systems and methods are provided that report changes or improvements, or lack thereof, in measured or observed performance before, during or after service, maintenance or repairs. Computing devices may be configured to determine if applied maintenance results in improved or expected levels of performance. Computing devices may be configured to determine whether improvements following repair are persistent, such that improved or desired performance continues at various points and times after time of service.

In certain embodiments, systems can be packaged for wireless transceiver deployment by a field service technician for example. Sensor generated information and metadata may be processed at deployed systems in real-time and the results may be stored locally and downloaded for evaluation at a later time, or transmitted periodically through a network for evaluation at a central location. In this manner, results gathered and processed at wireless transceiver deployed devices may be aggregated, analyzed and/or reviewed centrally using more powerful analytical tools and drawing on centralized human and machine expertise as required. In some instances, information aggregated from disparate sources and/or multiple operators (federated data) may be used by the analytical tools.

In certain embodiments, information and metadata may be acquired indirectly and included in processing and decision-making. For example, technicians, operators and other persons performing various operations, including examination, maintenance and/or repair operations related to the irrigation system may obtain information relevant to the operations and/or status of the irrigation system, and such persons may enter such information for evaluation. In this manner, results and other information gathered and processed at wireless transceiver deployed devices may be aggregated, analyzed and/or reviewed centrally regardless of whether such information is obtained automatically from sensors and other equipment, or by human intervention or observation. Data that is entered manually may include equipment location and historical repair information or qualitative or quantitative data related to configuration, environmental or operating conditions such as room temperature voltage levels measured at one or more points in an electrical circuit, repair information such as observed condition of filter media, air-flow restrictions, repair type codes and cost of repairs for one or more codes. According to certain aspects described herein, raw data can be imported from another system and included in analysis.

Certain aspects of the present invention relate to systems, apparatus and methods for identifying and/or selecting irrigation assets in need of repair and/or managing a repair process for the selected or identified irrigation assets. Irrigation assets, performance levels of the irrigation assets, defects, imperfections and repairs initiated for the irrigation assets may be classified in accordance with certain aspects disclosed herein. In one example, irrigation assets may be classified according to configuration, in situ environment, reliability, performance, make, model, and manufacturer. The repair process may be optimized and the effectiveness and persistence of repairs over time may be determined in accordance with certain aspects disclosed herein. In one example, the effectiveness of repairs may be classified in relation to a service provider, which may include a commercial enterprise, internal service organization and/or an individual selected to perform repairs.

A field service technician may be provided with instructions identifying or suggesting services and repairs that may be performed. Notifications may be generated or received indicating whether the repairs prove to be effective and persistent over time. In one example, notifications may be received from the sensor network and/or from service providers responsible for repairs. In an initial state, repairs are considered to be in a pending state. While in the pending state, a service technician may be dispatched. The service technician may be provided with information identifying an irrigation system to be repaired, one or more symptoms and a repair protocol explicitly identifying or suggesting repairs to be made during a service call. The service technician may execute the repair protocol or, in some instances, may replace a failing irrigation system, and the process moves to a repaired state. In the repaired state 604, the target irrigation system may be tested and/or monitored to determine if the repair was effective. In one example, testing and monitoring may include an analysis of sensor data captured by the sensors.

If the repair is deemed ineffective, then at state 608, further repair and/or monitoring may be conducted to determine if the effective state 606 can be achieved by means of additional repairs or reconfiguration. If the ineffective state 608 cannot be corrected, then the repair process may be cancelled and the repair activity enters a closed state 614. If the repair has been deemed or determined to be effective, then in the Effective state 606, the operation and performance of the irrigation system may be monitored for one or more periods of time to determine if the repairs are persistent over time. In one example, monitoring may include an analysis of sensor data provided by one or more Wireless transceivers 218, 226. The one or more periods of time may be contiguous periods of time, or may be spaced over a more prolonged monitoring period. In some instances, no further monitoring is needed and the repair process may enter a closed state 614 from the effective state 606. The period of time during which repair monitoring is performed at the Effective state 606 may be identified in a repair protocol and, when the effects of the repair persist, the process may move to a Persistent state 610 from which the process may be manually or automatically transitioned to a closed state 614. If, however, the repairs are determined to be non-persistent, the process may move to a "Not Persistent" state 612 from which the process may be manually or automatically transitioned to a closed state 614.

In certain embodiments, system-generated reports can provide documentation that enable utility companies and municipalities and/or state entities to provide energy rebates and incentives. The reports may determine an amount of incentive or rebate due by calculating deemed energy savings or net energy savings by adding or subtracting all energy gains and losses over a defined time period for each asset, then all monitored assets in total, thence applying a rate or factor representing the amount of incentive or rebate due for each unit of energy saved or lost over a prescribed period.

In certain embodiments, a service provider may issue an invoice for a repair, which may include a code issued by the system to confirm that a repair activity meets predefined thresholds and standards for post-repair performance and effectiveness. The code may be interpreted by a customer of the service provider responsible for repairs as confirmation that the performance and/or deemed effectiveness or deemed persistence standards have been met by the repair or that maintenance has achieved desired levels of performance optimization.

Data Flow in a Repair Process is discussed next. Certain embodiments of the invention for measuring the state-of-health of the irrigation asset employ or are based on certain systems and methods for monitoring, inferring state of health, and optimizing efficiency of irrigation systems. According to one or more aspects disclosed herein, irrigation systems may be monitored using wired or wireless sensors, which transmit data to a processing for analysis and benchmarking related to performance. Performance data for a target irrigation system may be processed, analyzed, indexed and/or plotted in reference to time, benchmarks and/or predetermined or predefined norms, in order to determine relative performance of the target irrigation system in relation to one or more peer systems. The peer systems may be defined based on the classification of the target irrigation system based on characteristics and attributes such as reliability, configuration, in situ environment, performance, make, model, manufacturer, application and/or an operational history of the target irrigation system. The analysis of performance data may employ one or more mathematical or pattern recognition functions, such as a sine wave or a statistical model.

According to certain aspects, contextual information may be obtained from a user or by querying a database or other repository of information. In one example, the user may provide access to contextual information such as such as design, make, model, configuration, repair history, configuration settings, environmental conditions, and other in-service information ("Meta Data") that may facilitate an understanding of the various factors and variables that may affect, measure or qualify performance of the system and/or the effectiveness and persistence of a repair process and corresponding repairs.

Certain analytics methods may be applied to discover meaningful patterns and behaviors from the sensor data. A statistical analysis may be used to examine features as a sample from one or more like sensors to find population norms. Benchmarking may be employed to compare the features and/or characteristics of multiple sensors to determine the distribution of values within a population, and to use the corresponding percentile to score the feature of that asset. A time-series analysis may be applied to identify features for a single sensor over time, and/or to determine trends or changes, which may indicate the onset of failure. Asset classification may be used to classify or tag assets based on computed values, changes over time, etc. Asset classification may consider all data to determine if an asset should be tagged for repair, for example. Asset tags can be added or removed based on trends.

Other data may be considered in addition to the sensor data. In one example, a fusion of sensor data and disparate data elements may be employed to learn new things. For example, one or more sensors may be employed to monitor plug load energy consumption in a defined area such as in a room. Plug load energy is consequently an object that can be benchmarked in a manner similar to other objects such as compressors used in the system. Such sensor data may be fused with other data to detect human activity and energy intensity in the area. In one example, the placement of additional equipment in the room may indicate a new use pattern for the area, or more or less water or lighting being used than before or in comparison to other objects. These new data from external sources may be mined to derive a better understanding of energy utilization relative to other monitored objects deemed to be similar or comparable.

One or more maintenance states may be communicated using a grading system that can be expressed graphically and/or textually. For example, a color-coding scheme may be applied to a graphical display indicating current performance metrics, such as power consumption, cycle variance, temperature curves, and the like. An asset may be graded using a configurable and/or familiar color-coding system (Green, Yellow and Red), such that the performance of each asset can be determined in comparison to known achievable levels of performance and energy efficiency to its peers (same make/model) in the population. Grading scores may be derived from sensor data obtained from sensors associated with assets deployed in a variety of settings, locations, and configurations.

In one example, assets performing within expectations may be color-coded as Green assets, while underperforming may be coded as Yellow or Red assets. A higher grade (Green) may indicate that the asset is deemed to be operating efficiently, and/or may be consuming less energy than the average of its peers. A next grade (Yellow) may indicate that the scored asset is exhibiting signs of stress and is consuming more energy than the average of its peers. Although there is some potential for energy savings, payback for repairs on these assets may not be as attractive, although repairs and mitigation measures on these assets may achieve higher levels of reliability as an operational policy decision. A low grade (Red) indicates serious maintenance, configuration, environmental, and/or other problems. Assets scored "Red" may be immediate candidates for repair as they are exhibiting signs of stress consistent with imminent mechanical failure, in addition to wasting significant amounts of energy.

Scoring may be accomplished when enough data for a specific asset make/model group is available. A color-code score may be assigned to each asset based on its current performance, before repairs, and/or relative to its peers in a database of the same or similar make/model assets. Asset grades may be assigned based on statistical analysis that may identify an Optimal Level of Performance (OLP) based on a predefined standard deviation. In one example, the top 10% statistically and best performing assets for the make/model may be deemed to have achieved the OLP, and no repairs need be performed on these assets and in many cases maintenance can be deferred for this assets. An asset that is assigned a grade of Yellow may exhibit a calculated annual energy consumption that is 76% to 89% of the OLP. These assets are candidates for repair. An asset may be assigned a grade of Red if the projected annualized kWh is less than 75% of the OLP. Such assets may be identified as candidates for immediate repair.

In one example, a proxy profile may be used to temporarily assign a make/model profile to an asset. An administrator may select a proxy, which represents a similar asset in terms of size, age and construction. Once it has been determined that the database contains a sufficiently large sample for the target make/model, then the proxy or the make/model group may be removed and the system may score the assets using the automated scoring methodology described above using empirical data.

In another example, estimated asset scoring may be employed when there is insufficient make/model data in the database to score an asset. An estimated grade may be assigned based on an analysis of compressor cycling or other known measure of mechanical stress that is highly correlated with energy consumption. An asset may be assigned a grade of Green if the compressor on-time is below 74%. No repairs need be performed on these assets. An asset may be assigned a grade of Yellow if the compressor on-time is 75%-84%. These assets are candidates for repair. An asset may be assigned a grade of Red if the compressor on-time is above 85%. These assets may be candidates for immediate repair.

A benchmark scoring process may be run automatically once per month and prior history is retained by the system such that asset grade changes, attributable to changes in asset performance, can be tracked over time for each individual asset.

One exemplary repair management process begins when a current (or "pre-repair") baseline may be obtained from measurements taken for a targeted irrigation system, prior to the start of the repair. The current baseline and/or one or more other baselines may be created for any attributes that can be measured or calculated for the irrigation system, including in reference to its peers. In some instances, the baseline may relate to averages of measurements and calculations obtained from a group of peer irrigation systems or irrigation assets. In some instances, the baseline may relate to measurements and calculations obtained from a specific set of irrigation assets classified according to performance within a particular environment or context. For example, the performance of a specific set of irrigation assets may correspond to hot room, cold room, low airflow, and/or low voltage configurations.

Next, the system determines that a repair is to be performed for a irrigation system. The determination may be based on the evaluation of one or more baselines for one or more attributes of the irrigation system. The baselines may be used as known achievable goals to guide and/or control the repair process. A normal baseline may be identified, where the normal baseline identifies expected values for a given attribute or operating characteristic of the irrigation system to be repaired, or for an idealized or optimally operating irrigation system of a comparable or same type. In one example a baseline may be determined from manufacturer-provided information. In another example, the baseline may be a manufacturer-provided or user-specified baseline based on experience with comparable equipment, or an empirical baseline obtained from observed performance of the irrigation system targeted for repair, or from observed performances of a peer group of irrigation systems.

In some instances, recommendations of a make and/or model of irrigation asset may be made for use in a specific context where the recommended irrigation asset may not score well in other contexts and/or may exhibit lower performance levels when measured on average against its peers. In one example, the irrigation asset may be recommended when high door access activity is anticipated when the recommended irrigation asset exhibits superior recovery efficiency. In another example, a irrigation asset may be recommended for usage in a low-voltage environment. In another example, a irrigation asset may be recommended for usage in a room that has poor airflow. In these examples, recommendations may be made using alternative scores that are generated based on different conditions of installation or use.

Next, the repair is initiated. A repair technician may begin by assessing the equipment health and assigning problem codes and one or more repair codes associated with the target irrigation system. These problem codes and repair codes may be used to determine expected post-repair performance levels and/or performance level improvements for the target irrigation system, which may be expressed in one or more post-repair baselines. Each of the post-repair baselines may relate or correspond to one or more measurable or calculable attributes. After the repair is physically completed, the repaired irrigation system may be allowed to stabilize prior to capturing one or more post-repair baselines from measured attributes and performance parameters of the repaired irrigation system.

Next, the one or more post-repair baselines may be used to determine if the repair was effective. The determination may be based on one or more of the measured attributes. In some instances, measurements of all of the attributes in the one or more post-repair baselines may not be available immediately after repair, and the assessment of the effectiveness of the repair may be a partial assessment and/or provisional in nature. One or more algorithms may be applied to compare one or more post-repair baselines with corresponding pre-repair baselines and/or normal baselines to determine if the repair was effective. If the repair is deemed not effective at block 1008, then a notation to that effect may be made and a repair may be attempted again.

If the repair is determined to be at least provisionally effective, then at block a notation to that effect may be recorded in a log, journal or other information characterizing the repaired irrigation system. A provisional determination of effectiveness may be confirmed or retracted after new measurements are obtained after the irrigation system has fully stabilized. The expected post-repair baselines may identify the duration of the settling period of time. This decision of effectiveness may be based on repair codes and on the peer group that is being used for comparison.

In the event that an effective repair is determined, the repaired irrigation system may be monitored for a period of time after the repair is deemed effective to determine whether the repair is persistent. In some instances, the latter determination may be used to determine if a utility incentive payment may be applicable. For example, the period of time may be selected based on a deemed measure defined by an energy provider who offers energy incentives and rebates for energy efficiency measures. A persistent repair may be a repair that returns the repaired irrigation system to normal operation for a prolonged period of time. Normal operation may be defined by the system, an operator, an energy producer, or the like. The prolonged period of time may be determined when the repair is initiated. Various criteria may be applied to define the point at which the repair may be determined to be persistent over time. In some embodiments, a counter, timer and/or other metering device may be employed to measure elapsed time from repair until the point at which the repair can be determined to be persistent. In one example, a timer may be initiated to define a time-based monitoring period during which total energy consumption must remain below a predetermined threshold. In another example, a cycle counter may be configured to define a range or total number of cycles or amount of compressor active/on-time to be achieved or maintained in order to determine persistence of repair.

The timer, counter and/or other meter may be monitored to determine when the repair can be deemed effective. If the monitoring period has not expired, the performance of the repaired irrigation system may be continually or continuously assessed during the monitoring period and post-repair baselines may be updated or augmented with measurements obtained during the monitoring period. Accordingly, additional determinations of effectiveness of the repair may be made during the monitoring period. In one example, the additional determinations of effectiveness may continue until the repair is determined either ineffective or effective and persistent, after expiration of the monitoring period. Problem and repair codes may be analyzed, correlated and associated with the specific make/model or design of the irrigation system to programmatically ascribe, for future reference, recurring problems and repair codes for specific make/models or designs.

In some instances, measurements captured at a plurality of irrigation assets by one or more smart sensors, Wireless transceivers, or smart modules may be configured to communicate the measurements through a datalogger. The data logger may be implemented using circuits or modules of the smart sensors, Wireless transceivers, or smart modules. The datalogger may store or otherwise maintain sensor data and other information that can be communicated through a network after the datalogger has identified or established a network connection. In certain examples, information collected from smart sensors, Wireless transceivers, or smart modules may be transmitted to an analysis system through a network at a predefined rate (e.g. every 4 or 8 minutes) as a bundle of observations made a faster rate (e.g., every 30 second or every minute), and/or at the earlier of a longer-term timer (1 hour) or alarm. In some examples, the datalogger, smart sensors, Wireless transceivers, or smart modules may be adapted to execute one or more data processing algorithms using the sensor data. In some examples, the datalogger, smart sensors, Wireless transceivers, or smart modules may be adapted to manage certain aspects of a repair process, including enabling a wireless transceiver supervisor to oversee the work of less qualified service personnel.

According to certain aspects, multiple evaluation periods may be defined in order to determine whether a repair is persistent. These evaluation periods may be contiguous and the performance of a repaired irrigation asset may be evaluated independently during each evaluation period. In some instances, one or more evaluation periods may overlap. For example, first and second evaluation periods may both commence immediately after repair of the irrigation asset. The second evaluation period may span a longer interval of time than the first evaluation period.

Configurable parameters may be used to determine the duration of the monitoring period used to evaluate the persistence of a repair. Persistence may be measured over time and one or more parameters may dynamically adjust the persistent threshold to account for normal mechanical degradation and/or changes in configuration or environment. In some instances, one or more additional "persistence" baselines may be established for one or more attributes. The persistence baseline may be compared with the post-repair, pre-repair and/or normal baselines to determine if the repair persisted over the specified monitoring period. If the repair persisted, the repair process may be deemed complete. If the repair is not effective or does not persist, a decision to attempt another repair of the irrigation may be made. The decision may rest upon differences observed in the various baselines related to previous repairs, improvements or degradations in performance and any new information obtained during previous repairs to the same, similar or comparable systems. Persistence of a repair may be based on a comparison mechanical or energy performance to a set point, benchmark, rule, method or standard.

Certain calculations using the baselines derived from or established for peer groups and the post-repair baselines may enable the system to flag the repairs as either effective or persistent based on the time frame during which the calculations are performed. The peer group may establish and/or define acceptable values for various attributes to be monitored. The peer group may account for in-situ variables to enable the evaluations to calibrate for the actual irrigation system that is being repaired. The in-situ variables may include operational parameters such as set point, airflow, supplied power, power quality levels, and ambient temperature. Leveraging pre-repair snapshots may enable an accurate evaluation of the effectiveness and persistence of repairs.

In some instances, a irrigation system may be selected for repair based on an analysis of performance data and/or in comparison to Meta Data. Meta Data may include repair codes and repair costs, for example. The selection process, pre-repair, post-repair, persistence and other baselines may be used to modify repair processes and/or to devise new repair strategies, improved repair strategies, policies or standard operating procedures.

Asset tagging features and methods may be employed to facilitate management of the repair process. Asset tagging features may be used to correlate sensor measurements, Meta Data and measured, estimated or calculated performance of irrigation systems. Asset tags may be added, deleted and/or changed in a manner that characterizes the state-of-health of a irrigation system and status of repairs associated with the irrigation system. In one example, asset tagging may include a status indicator that can be incremented, decremented, or otherwise modified to indicate progress, status, state of a repair and/or or changes in performance. The asset tag may be used to control a service provider's next action or response. In this manner, the service provider may remain engaged and accountable until the repair is deemed effective and/or persistent, as determined by desired or targeted levels.

To facilitate efficient repair and maintenance practices, the repair process may be managed and controlled in stages, with gates that allow or disallow further actions. The gates may be operated based on successful completion of previous states, events or outcomes. Progress may be measured based on the current stage of the repair process. In one example, payment of a service provider invoice may be conditioned on the inclusion in the Invoice of another system-issued code indicating the effectiveness or persistence of the repair In some instances, changes or improvements in performance of a irrigation system, or lack thereof, may be reported before, during or after service, maintenance or repairs. Effectiveness of a repair or maintenance may be automatically determined based on whether improved or expected levels of performance are measured after the repair and/or maintenance. Information identifying the status, effectiveness and/or persistence of repairs and/or maintenance may be provided on a dynamic display of system status. For example, performance of a population of irrigation systems may be tagged with a qualitative color code, highlights or other means to identify failing, underperforming, and repaired irrigation systems. The status of ongoing repairs may be highlighted until the repair is deemed persistent. Historical information, including status performance levels and repair codes may be provided in an alert, alarm and/or scheduled or ad-hoc report.

Another system includes AR google connected to ground sensors and cloud servers providing augmented video to guide farm field repairs. A user wears the AR wearable and inspect the irrigation system. Based on user's head position and item he is looking at, the system overlays a repair assembly or disassembly diagram to aid the user in opening the irrigation, replace or perform maintenance, verify, and reassemble the system for operation. The system enables inexperienced users to maintain equipment.

Water Head Automatic Head Cleaning

Another system includes a frame, water valves attached to the frame to dispense water to crops in the field, sensors to detect water spray from the valves or water flowing through the valves to determine cloggage and if so, a microbial solution that eats up algae nutrients in the water is injected. Once the nutrients are gone, the algae is flushed out of the valves. This approach saves money from manual valve head cleaning by field service personnel. The microbial solution can be from Plant-Grow, Inc., among others.

Automatic Dispensing of Microbials for Plant Growth

Another system includes a frame, water valves attached to the frame to dispense water to crops in the field, and a tank with a microbial solution supplementing fertilizers. The system can periodically dispense the soil fertilizer/soil supplements as needed. The microbial solution can be from Plant-Grow, Inc., among others.

Blockchain Tracking of Agricultural Production

Another system enters blockchain entries for each water cycle for each irrigation machine. The blockchain entries cumulatively provide proof of origin. The entry can include location, crop type, time of watering, weather condition, or other data. The entry can be verified by buyers/traders/consumers. Such proof of location can be used as part of advanced purchases for products with specified conditions. The entry can also include sensor data on crops. The entry can include sensor data relating to maintenance of the irrigation machine.

In a further aspect, genetic information from cultivated plant can be captured and placed on the blockchain for authentication and licensing. In implementations, seeds or animal feed is tracked using blockchain, and the resulting food product is tracked downstream for consumer authentication of the food product. One embodiment uses two compact laser diodes (at 532 and 638 nm) for multicolor fluorescence imaging and a white light-emitting diode (LED) for bright-field transmission imaging. Other embodiments are capable of capturing multicolor fluorescence, bright-field and dark-field images of plant or animal cells, and tissue samples at HD resolution. A targeted sequencing library preparation is done based on selector probes (and padlock probes in situ and rolling circle amplification (RCA) to generate micron-sized DNA coils that consist of hundreds of concatemerized repeats of the circular template and that can each be brightly labelled with fluorescent hybridization probes. Alternatively, a smart irrigation system can communicate with a portable real-time device for DNA and RNA sequencing such as MinION from Oxford Nanopore, where each consumable flow cell can generate 10-30 Gb of DNA sequence data. Ultra-long read lengths are possible (hundreds of kb) with selectable fragment length. Other portable DNA scanner of plant or animal sample tissues can be used and such information is placed on the blockchain for subsequent audit or analysis.

In some embodiments, the system provides a peer-to-peer cryptographic currency trading method for initiating a market exchange of one or more Blockchain tokens in a virtual wallet for purchasing an asset (e.g., a security) at a purchase price. The system can determine, via a two-phase commit, whether the virtual wallet has a sufficient quantity of Blockchain tokens to purchase virtual assets (such as electricity only from renewable solar/wind/ . . . sources, weather data or location data) and physical asset (such as gasoline for automated vehicles) at the purchase price. In various embodiments, in response to verifying via the two-phase commit that the virtual wallet has a sufficient quantity of Blockchain tokens, the IoT machine purchases (or initiates a process in furtherance of purchasing) the asset with at least one of the Blockchain tokens. In one or more embodiments, if the described technology determines that the virtual wallet has insufficient Blockchain tokens for purchasing the asset, the purchase is terminated without exchanging Blockchain tokens.

In one embodiment, the system includes a device unit having an address; an accelerometer coupled to the unit to detect acceleration; a wireless transceiver; and a processor to identify the unit in a distributed ledger with the address and coupled to the transceiver and the accelerometer, the processor storing tamperproof events on the distributed ledger and executing terms of a smart contract in the ledger generated by another machine using a module for forming a contract with the other machine when the module receives from the other machine a manifestation of intent to contract and responds with an assent to accept the contract.

Implementations may include one or more of the following. The blockchain is accessed by the processor to store data for the device. The parties indicate an assent to accept the contract after resolving zero or more ambiguity. The system processes a smart contract option without payment if the other machine is a merchant agent and otherwise makes a payment to bind the smart contract option. A module can transfer data for Internet of Thing (IOT), for example when one machine ordering goods or services from another machine using the smart contract. Thus, a fertilizer machine can order soil analysis services from a satellite imaging machine or when the smart contract makes a royalty payment for using a code module to recommend agricultural services. One machine delegates to another machine, or assigns the contract to another machine. One machine can buy without knowledge of problems and act as a bona fide purchaser (BFP) machine. The system performs tasks on behalf of a smart contract beneficiary machine selected from the following: a creditor beneficiary machine, a donee beneficiary machine, an intended beneficiary machine, or an incidental beneficiary machine. The processor records the smart contract as a security interest. The processor looks up a blockchain title prior to payment to check against multiple security interests, a transferal of a collateral, or a bankruptcy. The processor records a purchase money security interest (PMSI) prior to or contemporaneous with payment. The smart contract protects the body from unexpected damage or events by restoring the body to a predetermined condition after damage. The smart contract protects against unexpected damage or events through future offering, hedging or trading. The smart contract protects against unexpected damage or events with a smart future. The smart contract provides identity for a person. The processor deposits or withdrawals from a rotating credit association (RCA) or a micro-lending network. The smart contract updates a credit database after a transaction. More details are provided in U.S. Pat. No. 10,022,613 to Bao Tran, the content of which is incorporated by reference. Further, deadlines associated with the contract and contractual requirements can be tracked with the blockchain and a docketing system to provide notices and alarms as needed. Such docketing system is described below.

Figure 5B:
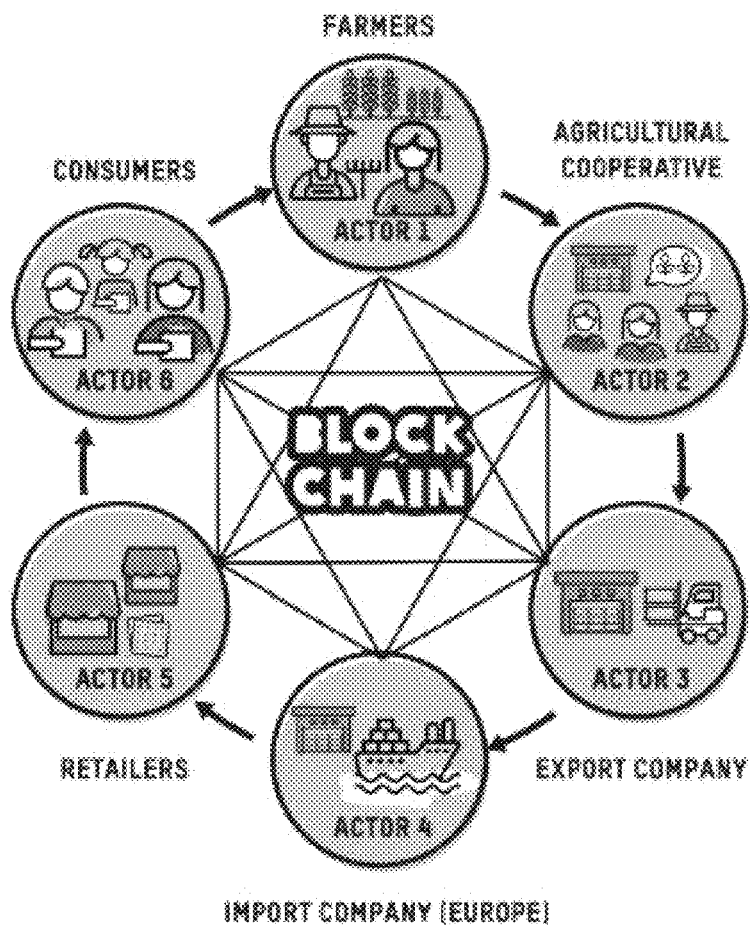
FIG. 5B shows another eco-system for trading food products.

The present system provides smart contract management with modules that automates the entire lifecycle of a legally enforceable smart contract for the farm eco system of FIG. 5B by providing tools to author the contract so that it is both judge/arbitrator/lawyer readable and machine readable, and ensuring that all contractual obligations are met by integrating with appropriate execution systems, including traditional court system, arbitration system, or on-line enforcement system. Different from the blockchain/bitcoin contract system where payment is made in advance and released when the conditions are electronically determined to be satisfied, this embodiment creates smart contracts that are verifiable, trustworthy, yet does not require advance payments that restrict the applicability of smart contracts. The system has a contract management system (CMS) that helps users in creating smart contracts for deployment.

A smart contract is a computerized transaction protocol that executes the terms of a contract. A smart contract can have the following fields: object of agreement, first party blockchain address, second party blockchain address, essential content of contract, signature slots and blockchain ID associated with the contract. The user logs into the system to author a smart contract between a supplier and a farmer, or a farmer and a customer, for example. The system then retrieves the appropriate contract template for the user, and a user interface renderer displays the corresponding deal sheet user interface to the user. The selection of the appropriate contract template can be based on many factors, including the role of the user, the intended parties to the contract, the type of contract desired, etc. The user enters the information that is requested by the user interface based on the attributes displayed. Because the user interface is tailored specifically to the desired type of contract, the required contract terms information for that type of contract will be entered by the user as guided by the attributes of the template. The user may interact with the user interface through a single page or through multiple pages in a particular sequence with a forms wizard, or through the selection of tabs. In one embodiment, the user interface is rendered as a mark-up language such as XML showing the structure of the requirements of the contract. In other embodiments, the user interface is rendered as an Excel worksheet, Word document, or other application compatible format that can be read by the contracting parties, lawyers, judges, and jury. At 6, the contract is generated based on the user input to the user interface. The contract can be in the form of bytecodes for machine interpretation or can be the markup language for human consumption. If there are other contracts that are incorporated by reference, the other contracts are formed in a nested hierarchy similar to program language procedures/subroutines and then embedded inside the contract. The smart contract is assigned a unique block chain number and inserted into block chain. Next, the smart contract is sent to one or more recipients, which open the payload and execute the terms of the contract and if specified contractual conditions are met, the smart contract can authorize payment. If dispute arise, the CMS can graphically decode the contract terms in the smart contract for a judge, jury, or lawyer to apply legal analysis and determine the parties' obligations.

In another aspect, a distributed file storage system includes nodes are incentivized to store as much of the entire network's data as they can. Blockchain currency is awarded for storing files, and is transferred in Bitcoin or Ether transactions, as in. Files are added to the network by spending currency. This produces strong monetary incentives for individuals to join and work for the network. In the course of ordinary operation of the storage network, nodes contribute useful work in the form of storage and distribution of valuable data.

In another aspect, a method for providing electronic content retrieval with cloud computing is provided. A first request message is received in real-time on the first cloud application stored on the cloud server network device with the one or more processors from a second cloud application. The first request message includes a request for desired cloud electronic content stored in the plural cloud storage objects stored on the selected ones of the plural other different cloud server network devices located on one or more of the networks comprising the cloud communications network. The plural different cloud storage objects function as a single secure storage object for electronic content on the cloud communications network. A cloud content location map is retrieved securely on the first cloud application on the cloud server network device. The cloud content location map includes address locations of the selected ones of the plural other different cloud server network devices on the cloud communications network. The first cloud application on the cloud server network device sends plural second request messages for the desired cloud electronic content to the selected ones of the plural other different cloud server network devices identified in the retrieved cloud content location map and located on one or more of the public communication networks, the one or more private networks, community networks and hybrid networks comprising the cloud communications network. The first cloud application on the first server network device combines the one or more individual components of the desired cloud electronic content from the plural cloud storage objects from the received plural response messages into a final desired electronic cloud content component. The first cloud application on the cloud server network device securely sends in real-time the final desired cloud electronic content component as the request desired cloud electronic content to the target network device via the cloud communications network. The second cloud application on the target network device cannot determine the desired cloud electronic content was split and was stored in plural cloud storage objects and cannot determine which of plural selected ones of the other different cloud server network devices on which ones of the public, private, community or hybrid networks on the cloud communications network may have stored portions of the final desired cloud electronic content, thereby providing a second and/or fourth layer of security and privacy for the desired cloud electronic content on the cloud communications network.

To enable an IOT device such as a car or a robot to access cloud data securely, and to grant access right to agents of the IOT device such as media players in the car, for example, the following methods can be used:

A method for accessing data, content, or application stored in a cloud storage, comprising: authorizing a first client device; receiving an authorization request from the first client device; generating an authorization key for accessing the cloud server and storing the key in a blockchain; providing the authorization key to the first client device; receiving the authorization key from an IOT device as a second client device working as an agent of the first client device; granting access to the second client device based on the authorization key; receiving a map of storage locations of cloud objects associated with an application or content, each storage location identified in a blockchain; and reassembling the application or content from the storage locations.

The blockchain is decentralized and does not require a central authority for creation, processing or verification and comprises a public digital ledger of all transactions that have ever been executed on the blockchain and wherein new blocks are added to the blockchain in a linear, chronological order.

The public digital ledger of the blockchain comprises transactions and blocks. Blocks in the blockchain record and confirm when and in what sequence transactions are entered and logged into the blockchain. Transactions comprise desired electronic content stored in the blockchain. The desired electronic content includes a financial transaction. The financial transaction includes a cryptocurrency transaction, wherein the cryptocurrency transaction includes a BITCOIN or an ETHEREUM transaction. An identifier for the received one or more blocks in the blockchain includes a private encryption key. The system securely stores the received one or more blocks in the blockchain in one or more cloud storage objects, in an encrypted format including using a Discrete Logarithm Integrated Encryption Scheme (DUES), a Elliptic Curve Integrated Encryption Scheme (ECIES), a user generated biometric encryption method, or a Homomorphic encryption method. The target network device, cloud server network device and one or more other cloud server network devices communicating with the cloud server network device include one or more wireless communications interfaces comprising: cellular telephone, 802.11a, 802.11b, 802.11g, 802.11n, 802.15.4 (ZigBee), Wireless Fidelity (Wi-Fi), Wi-Fi Aware, Worldwide Interoperability for Microwave Access (WiMAX), ETSI High Performance Radio Metropolitan Area Network (HIPERMAN), Near Field Communications (NFC), Machine-to-Machine (M2M), Bluetooth or Infra Data (IrDA) wireless communication interfaces. The blockchain stores cryptocurrency transactions, wherein a valid cryptocurrency transaction in the blockchain is digitally signed, electronically spends one or more unspent outputs of previous cryptocurrency transactions, and the sum of cryptocurrency transaction outputs does not exceed the sum of cryptocurrency transaction inputs on the blockchain.

While Ethereum mentions smart contract, it is actually mentioning the use of executable codes on the blockchain. For example, the Ethereum Solidity is a JavaScript like a language used to code smart contracts on the Ethereum platform. It compiles into a bytecode format that is understood by the Ethereum Virtual machine (EVM). It's a strongly typed language with the ability to define custom data structures. By smart contract, the present system is referring to contracts and agreements that are automatically executed, with conditions and terms similar to a legal contract.

The UI can operate with cryptocurrencies such as Bitcoin or Ethereum. Rather than have multiple separate silos, a blockchain (in its purest form) can act as a unified database that's accessible (on a read and write basis) by everyone (it is in effect "permissionless"). The ledger stored on a blockchain is shared amongst a distributed network of computers. The use of cryptography enables users to modify the master ledger without the need for a central authority. With a blockchain there is no need for a central trusted authority or for intermediaries. The disintermediation of intermediaries can redefine the value chain in a wide range of industries, from financial services to media, and puts the power and value of data back in the hands of the people creating that data. Blockchains can be public (such as the Bitcoin blockchain or the Ethereum blockchain)—these are effectively permissionless, or they can be private (where access is restricted to a selected group of users). Ethereum which has a complete programming language, sometimes called Ether Script. Since most agreements involve the exchange of economic value, or have economic consequences, categories of public and private law are implemented using Ethereum. An agreement involving transfer of value can be precisely defined and automatically enforced with the same script. Smart contracts can have scriptable clauses that are executed in a runtime using the Ethereum environment in one example, and can have multiple parties, each with their own agents and asset accounts. Funds transfers go through a controlled interface, with notices and receipts sent to all relevant parties. The script code is unable to manipulate any assets excepting those explicitly declared beforehand on the smart contract, and verified as valid property of a legitimate party to the contract by looking up ownership information in the blockchain, among others. And when funds are moved, it's to a contract-specific name, not an account ID. The smart contract can move_funds ( ) between these declared accounts, as its script logic dictates, but it can also stash_ funds ( ) directly inside the contract itself! For example, during an escrow, funds might be stashed inside the smart contract for 14 or 30 days, and then transferred to one party or another. Scripted clauses can also be configured to trigger on certain events. Variables can be defined in the smart contract, which persist through its entire lifetime. As the smart contract—including its internal state—continues to process over time, receipts will continue to drop into the relevant parties' inboxes, showing the change in state, in those variables, over time. Smart contract variables can be defined as "Constant" (value cannot change), "Persistent" (value can change, and will persist between script runs), and "Important" (value is persistent, AND any changes in the value will resirrigation in server notices being sent to the parties.)

A designer user interface ("UI") can be used to create a template in accordance with one embodiment. The template is customized/designed to allow a user to create a sales contract, and includes multiple regions that receive business terms input from a user when preparing the contract. A general information region receives general information regarding the contract. Customer information region receives information about the customer that is purchasing the product, including customer contacts and blockchain address that can be added through an add contact button. Product information region receives information about the products, and additional products can be added through an add product button. Payment and other information UI region receive the financial information about the contract.

For example, a smart contract template is customized for a purchasing contract of a service by a buyer, and includes multiple regions that receive input from a user when preparing the contract. Template includes a requesting region for receiving information regarding the requesting buyer and a vendor region for receiving information on the vendor. A scope of work region is used to receive information about the scope of the service that the vendor will provide. A payment region receives payment information and other information region receives other information. In one embodiment, boxes pop up when a user selects one of the options of action box. The user can interface with the boxes to modify the contract templates. For example, as shown, when "Add User Variable" is selected, a box pops up. A UI box allows a user to add variables to the contract template. When one of the user variables is selected, such as the "vendor access" variable, a properties box opens that allows properties of that variable to be defined, which controls how it appears to the user using the template. Properties can include specifying a prompt (e.g., "Will Vendor require access to facility?") and specifying a defairrigation value that will be displayed when the deal sheet based on this template is rendered (e.g., defairrigation value of "yes"). When "Add Instruction Text" is selected, a box pops up and the text of an instruction and the region in which the instruction should be inserted can be entered. In another box, the "Attach Word documents that describe scope of work and buyer obligations (if any)" instruction is added to another region of template, for example. When "Edit Form Properties" is selected, a box pops up allowing properties of the contract template to be changed. In one embodiment, the various regions that form the template can be presented to the user when authoring a contract in a single page or can be individually presented to the user as separate tabs or in the form of a wizard that that asks for information in multiple pages in a particular sequence. Further, the various region headers of the contract template can be displayed in different ways, such as in a box and/or as a heading with underline. Other properties can also be defined in box. One embodiment provides an "Add Tab/Wizard step" action box. Upon selection of the "Add Tab/Wizard step", a tab or wizard step is added in an implementation where the contract template will be filled out using separate tabs or a forms wizard. Another embodiment that illustrates the action for the "Add from Data Catalog" UI button, for example. Upon selection of "Add from Data Catalog" a UI pops up, which allows a user to select an attribute from contract catalog data database. A catalog items table list all items that can be selected and added to one of the regions of the contract template. When an item is selected, a box allows certain properties about that item to be defined. Therefore, for the "Payment Terms" item (which is a single valued variable), the prompt (as it is intended to appear in the template) can be defined, and the defairrigation value can also be defined.

Next, the functionality of system in accordance with one embodiment is detailed when creating a contract/deal sheet template that can be used for authoring a contract. In one embodiment, the functionality of the flow diagram is implemented by software stored in memory and executed by a processor. In other embodiments, the functionality can be performed by hardware, or any combination of hardware and software. To set up, the contract administrator logs onto the template designer application and a previously created contract template designer UI is retrieved to be modified, or a new design is created. In one embodiment, the contract template designer UI is retrieved from database and displayed through an Internet browser to a user at a client computer. The contract template designer UI includes user actions through a UI that allow attributes of the contract template to be customized for a specific type of contract. The system receives user attribute requests from the contract administrator and modifies the contract template accordingly. The attribute requests are generated by the contract administrator through various actions in the designer tool. The modified contract template is stored in data catalog for later use in order to create the contract.

In addition to Ethereum, other blockchain or globally shared, transactional database can be used. To change something in the database, the system creates a transaction which has to be accepted by all others. One embodiment runs on an Ethereum Virtual Machine or EVM as the runtime environment for smart contracts in Ethereum. It is not only sandboxed but actually completely isolated, which means that code running inside the EVM has no access to network, filesystem or other processes. Smart contracts have limited access to other smart contracts. There are two kinds of accounts in Ethereum which share the same address space: External accounts that are controlled by public-private key pairs (i.e. humans) and contract accounts which are controlled by the code stored together with the account. The address of an external account is determined from the public key while the address of a contract is determined at the time the contract is created (it is derived from the creator address and the number of transactions sent from that address, the so-called "nonce"). Every account has a persistent key-value store mapping 256-bit words to 256-bit words called storage. Furthermore, every account has a balance in Ether (such as in "Wei") which can be modified by sending transactions that include Ether.

A transaction is a message that is sent from one account to another account (which might be the same or the special zero-account, see below). It can include binary data (its payload) and Ether. If the target account contains code, that code is executed and the payload is provided as input data. If the target account is the zero-account (the account with the address 0), the transaction creates a new contract. As already mentioned, the address of that contract is not the zero address but an address derived from the sender and its number of transactions sent (the "nonce"). The payload of such a contract creation transaction is taken to be EVM bytecode and executed. The output of this execution is permanently stored as the code of the contract. This means that in order to create a contract, you do not send the actual code of the contract, but in fact code that returns that code. Upon creation, each transaction is charged with a certain amount of gas, whose purpose is to limit the amount of work that is needed to execute the transaction and to pay for this execution. While the EVM executes the transaction, the gas is gradually depleted according to specific rules. Each account has a persistent memory area which is called storage. Storage is a key-value store that maps 256-bit words to 256-bit words. It is not possible to enumerate storage from within a contract and it is comparatively costly to read and even more so, to modify storage. A contract can neither read nor write to any storage apart from its own. The second memory area is called memory, of which a contract obtains a freshly cleared instance for each message call. Memory is linear and can be addressed at byte level, but reads are limited to a width of 256 bits, while writes can be either 8 bits or 256 bits wide. Memory is expanded by a word (256-bit), when accessing (either reading or writing) a previously untouched memory word (ie. any offset within a word). At the time of expansion, the cost in gas must be paid.

Contracts can call other contracts or send Ether to non-contract accounts by the means of message calls. Message calls are similar to transactions, in that they have a source, a target, data payload, Ether, gas and return data. In fact, every transaction consists of a top-level message call which in turn can create further message calls.

Contracts can create other contracts using a special opcode (i.e. they do not simply call the zero address). The only difference between these create calls and normal message calls is that the payload data is executed and the resirrigation stored as code and the caller/creator receives the address of the new contract on the stack.

Atomic swaps are used to allow individual blockchains to interact with each other—for example cross-chain transactions between Bitcoin & Ethereum networks. Atomic swaps provide ability to exchange digital assets on-chain or off-chain seamlessly & securely without the involvement of a third-party like the decentralized exchanges (DEXs) as they create an encrypted escrow account via a cryptographic protocol which guarantees instant refunds to the users if the transaction is not completed for some reason or aborted by one party or the other—reducing the defairrigation risk to zero. Atomic swaps can be employed on two separate blockchains with two different native coins like Bitcoin & Ethereum or via off-chain secondary layer solutions like Bitcoin's Lightning network. Atomic swaps are executed via Hashed TimeLock Contracts (HTLC)—special form of off-chain payment channels. This means no clogging of the main network & reducing the processing time significantly as well. HTLC is a special type of smart contract which enables time bound transactions between the two parties. The transacting parties are required to complete the transaction in stipulated time by providing the cryptographic proof (private key) thus reducing the counterparty risk.

Next another system to securely trade products through a blockchain based eco-system is detailed. In another aspect, the farm product metadata and the supply chain information are placed on the blockchain for ease of tracking, verification, and trading. In implementations, seeds or animal feed is tracked using blockchain, and the resulting food product is tracked downstream for consumer authentication of the food product.

In a further aspect, the farm product metadata and the supply chain information are placed on the blockchain for lenders and investors to finance the farm. In implementations, seeds or animal feed is tracked using blockchain, and the resulting food product is tracked to identify consumer acceptance of the food product. The consumption pattern is modeled using AI, and the banks can provide financing accurately to the farmers with their high precision understanding of revenue and profitability which would reduce bank defairrigation risks.

In yet another aspect, a method of delivery products includes receiving data from a first entity and a plurality of additional entities, each placing data on a blockchain, the first entity and the additional entities comprising a network; designating by the first entity a selected set of data with restricted access rights and access time frame; accessing the selected set of data and public data on the blockchain; creating a change from a second entity in the network; and detecting the change by the second entity and applying a learning machine to the blockchain data and autonomously change operations to adjust to the change. In embodiments, the network automatically detects and heals breakages in the delivery network based on temporal changes in the schedule of one link in the network.

The system provides reports to securely trace the location and status of food products beyond the one-up, one-down process including a farm-to-store view, multi-ingredient view, and essential details at every step. With digitizing standards compliance, users can access information, provide provenance and manage certifications, and share single-sourced inspection and quality certifications and registrations. The system can share data from a company's food system only with need-to-know partners in a secure and confidential environment that leverages global standards. This service is provisioned by invitation only.

The method includes registering an item's information at each stage in its distribution. When, say, an organic carrot is pulled from the ground and readied to be transported from its farm, it's seed type, fertilizer and soil amendments (microbes) types are captured by images and physically signed by a registered user and recorded on the blockchain, and when it's sent to a distribution plant, it can be quickly checked against the info already recorded on that blockchain, which is immutable. The data is contributing to the entire blockchain to enable traceability across each tier of the supply chain and a valuable experience for all. To protect members from misuse of the data, the data producer is the owner of the data and provisions data sharing by invitation only, and with particularized granularity and expiration of the data. The smart contract also can specify how the data can be used. Thus, User Management module grants access to the company's network partners allowing them to upload their supply chain data. When granting partners access to the solution, the company can select certain permissions that govern what data they can see.

In one embodiment, to encourage proper data curation, the members of the ecosystem transfer tokens whenever they want their suppliers to disclose relevant supply-chain information. This incentivizes suppliers to not only produce such info, but to remain honest, since they would lose out on an additional stream of revenue otherwise. Further, traceability information can be provided in seconds instead of days with such technology.

To make it easy, farmers can type the crop information, take pictures of their book entries, or upload spreadsheets of the produce to the system. Since initial records can be misled, the only way to stop someone from falsely registering a freshly farmed mango or chicken as organic is to have another trust-providing system or mechanism in place beside a distributed ledger. Thus, the system allows manual inspection and verification of the source of the product to ensure the initial veracity of information entered into it, and the system can prevent anything untoward from happening further down the line, such as the addition of, say, non-organic ingredients to a supposedly organic product to reduce risk of food fraud, or the deliberate and intentional substitution, addition, tampering with or misrepresentation of food, ingredients, or packaging at some stage of the product's distribution cycle. It also means false or misleading statements made about a product for economic gain. A product can be traced by a product ID number, product label, a purchase order, or a GS-1 Global Trade Item Number (GTIN), for example. Date can be used to filter the product trace, and specific package ID and facility filters can be used.

An implementation can obtain or receive geolocation data from one or more components and/or one or more steps to manufacture an item. A pairwise comparison may be performed between the geolocation data obtained or received from one or more components and/or one or more steps and the geolocation obtained from the label. Other data disclosed herein collected, received, and/or obtained may also be compared and/or analyzed as above.

A website may be utilized to provide an interface with which a retailer and/or consumer may view the validation data obtained from the geolocation information, time reference data, or additional data as described above. The retailer may enter additional data such as employment data (e.g., factory size, workforce size, worker wage data etc.), social and/or regulatory compliance data (e.g., environmental violations if any, labor law compliance, carbon footprint, etc.). A consumer may access the website, for example, by entering a URL into a web browser or by scanning the label. The data may be associated with an item. For example, a retailer may manufacture an item at four different factories. Data specific to the factory from which the item is deemed to originate may be associated the item. Thus, an item manufactured at factory A may have data regarding factory A associated with it, but not data for a different factory.

In an implementation, a first geolocation may be received based on a signal received from a circuit associated with an item. The first geolocation may correspond to a first location. A second geolocation may be obtained from a label. The second geolocation may correspond to a second location. The first geolocation and the second geolocation may be compared. It may be determined that the first location and the second location are different. In some configurations a notice may be provided to the manufacturer, the retailer, and/or the consumer to indicate that the item may not have actually been manufactured at the location at which it is purports to have been manufactured.

According to an implementation disclosed herein, one or more indications of geolocation may be received, directly or indirectly, from a circuit associated with an item. Each indication may correspond to a location. The circuit may store geolocation data locally as described earlier and/or the circuit data may be wirelessly communicated to a local or remote server/database. The data obtained from the circuit may include an identifier corresponding to the factory, the item, etc. Thus, the circuit data may be associated with a specific item. In some configurations, the manufacturer for the item may be determined based on the geolocation data received.

A second geolocation may be obtained from a label that corresponds to a second location at 520. For example, at the end of the manufacturing process for an item, a label may be automatically generated by a printer and affixed to the manufactured item. The label may include a unique code corresponding to the manufacturer and a second location. The manufacturer may scan the label and/or generate an entry of one or more of the time, date, and geolocation based on the label data. The entry data may be stored to a database (e.g., the same database as the one or more indications of geolocation received from the circuit). The item may subsequently ship to a retailer for the item as described above. A request may be received based on a scan of the label by a consumer. For example, the consumer may scan a QR code or a bar code on the label. The request may be received as a query for geolocation data associated with the specific item on which the label is printed. Thus, the label may be unique for each item. The label may contain a unique identifier such as a product identification, a serial number, etc. for each item. The geolocation data may include the indications of geolocation (e.g., from the circuit) and the second geolocation from the label. A response to the request may be generated that includes a representation that the at least one indication of geolocation and the second geolocation are substantially similar. For example, in some configurations, a consumer may be exposed to raw geolocation data that includes the GPS data. In some configurations, the consumer may be presented with a simple interface that shows the item's identity (e.g., a smartphone name) and an indication that the manufacturing has been validated. The manufacturing being validated may refer to the circuit geolocation data matching the label geolocation data, thereby indicating that the item remained in the same or substantially similar location throughout its manufacture. The response may be provided to an electronic device of the consumer (e.g., a computer, a smartphone, a tablet).

Some embodiments of the system and method involve setting and enforcing access rights. In an embodiment, an access right is the right of an entity to use a service or good for at least one purpose. The service or good may be a computing device or network of computing devices. For instance, an access right may permit a user possessing the appropriate authentication credentials to operate a workstation, server, or virtual machine after "logging on" to the workstation. An access right may permit a user to instruct a computing device to perform some functions, while forbidding the performance of other instructions. As an example, an "administrator" or "root" user may have the ability to install and uninstall software on a computing device, as well as the ability to execute the software; an ordinary user may have the ability to execute software on the computing device, but not have the ability to install or uninstall the software. The computing device may be configured to ignore or refuse commands from a user that does not have a user account with the access right to instruct the computing device to execute those commands. In other embodiments, the access right controls the ability to access a particular network access point. The access right may affect the ability to access one or more master nodes of a network. The network may be a private network; for instance, the network may function as a "private internet" for the use of a community sharing a particular goal, set of ideals, or commercial interest. The private network may, for instance, be a trading or gambling network. The access right may affect the ability to access or read messages directed to particular user account within a messaging service; for instance, the access right may control whether a particular user can read a particular email account, an instant message, a text message, or a voice over internet protocol stream. The access right may give a user the ability to decrypt an encrypted message; in some embodiments, where the access right is tied to the possession of a particular private key, an encrypted message or stream may be encrypted using the corresponding public key. The access right may give a user the ability to unlock the use of an application or suite of applications on a computing device; for instance, the user may be able to access communication sites concerning classes. The user may be able to access music on a cloud service or on a local computing device. The user may be able to access streaming media over a network if in possession of the access right. The access right may give a security system the ability to lock out or allow entry to certain people peer-to-peer (P2P) network and to those files. The access right may control access to a particular file or set of files; for instance, the access right may lock access to confidential information, or information that can be used for identity theft, such as passport, social security, birth certificate data, permit data, data concerning licenses, data concerning escrowed property, legal documents such as wills, settlements or divorce decrees, or electronic access to physically locked devices such as safe-deposit boxes or the doors to vehicles or buildings. An access right may give a user the ability to run a particular software product; for instance, the license key permitting a software product to execute in a particular computing environment may be tied to a particular user account. An access right may determine a user's ability to access one or more files or classes of files. An access right may include a right to confer access right on another user; for instance, an administrative or root user may have the right to give other users ordinary user accounts.

Plant or Animal ID

In one embodiment, the first blockchain is created when a plant or calf is born and subsequent medical events are appended to the blockchain. A birth registration application can be installed on a smart device, such as a smart-phone, having location detection function with an image of the plant or calf as encoded in a blockchain. Using such an application allows the birthing attendant and/or birth parents to generate a permanent birth registration report. The location of the user is verified, based on a second location detection method, using the computerized device. A blockchain hash or security key is established with a registration authority according to the location, using the computerized device. A picture of a newborn plant or calf at birth is obtained, using the computerized device. Instruction on birth registration requirements according to the location are provided, using the computerized device. A birth registration report is generated in compliance with the birth registration requirements according to the location, using the computerized device. The birth registration report comprises identification of the location, a picture of the newborn plant or calf, a hand print (including fingerprints), a foot print (including toe prints) and a time stamp that identifies a time and date of the birth. The birth registration report is encrypted according to the security key, using the computerized device. The security key prevents altering the birth registration report. The birth registration report is transmitted using the blockchain in encrypted format to a registrar of birth records for the location, using the computerized device. The birth registration report is stored in encrypted format on the computerized device.

According to a handheld device for registering a birth, a camera is operatively connected to the handheld device. The camera takes a picture of a newborn calf at birth. The camera can be used to scan the hand and the foot to create handprints, footprints, fingerprints, among others. A communication device is operatively connected to the handheld device. A processor is operatively connected to the camera and the communication device. The processor establishes a location of a user of the handheld device using a first method. The processor verifies the location of the user of the handheld device using a second method. The processor provides instruction to the user on birth registration requirements according to the location. The processor establishes a blockchain security key with a registration authority according to the location. The processor generates a registration report in compliance with the birth registration requirements according to the location. The registration report comprises the location, the picture of the newborn plant or calf, and a time stamp that identifies a time and date of the birth. The processor encrypts the birth registration report according to the security key. The security key prevents altering the birth registration report. The processor transmits the birth registration report in encrypted format to the registration authority, using the communication device. The processor stores the birth registration report in encrypted format on the handheld device.

According to a computer program product for enabling a smart-phone for registering a birth, the computer program product comprises a tangible computer readable storage medium having program code embodied therewith. The program code is readable and executable by a computer to provide an application to the smart-phone to enable the smart-irrigation system to perform a method. According to the method, a location of the smart-phone is determined, based on a first location detection method. The location of the smart-phone is verified, based on a second location detection method. Instruction on birth registration requirements according to the location is provided. A security key is established with a registration authority according to the location. A picture of a newborn plant or calf at birth is obtained, using a camera application of the smart-phone. A birth registration report is generated in compliance with registration requirements according to the location. The birth registration report comprises the location, the picture of the newborn plant or calf, a time stamp that identifies a time and date of the birth and a blockchain reference with a private key. The birth registration report is encrypted according to the security key. The blockchain and security key prevents altering the birth registration report. The birth registration report is transmitted in blockchain format to the registration authority.

1. The registration app according to devices and methods herein allows the birthing attendant to:
   a. Record, using GPS, the place and time of delivery.
   b. Using the smart device camera, obtain a visual image of the newborn plant or calf as supporting documentation and generate features based on face recognition of the plant or calf and store the features as blockchain data.
   c. Using the smart device microphone, record the cry/voiceprint of the newborn plant or calf as blockchain data.
   d. Register the birth of the newborn plant or calf in compliance with the birth country's requirement.
   e. Sign the registration with a private key and upload to the blockchain or a decentralized ledger to prevent subsequent alteration of the registration.
   f. Provide a unique ID pointing to birth registration on the block chain.
2. The method according to claim 1, said computerized device comprising one of a smart-phone and a tablet.
3. The method according to claim 1, one of said first location detection method and said second location detection method comprising using a global positioning system (GPS) to determine said location, said first location detection method being different from said second location detection method.
4. The method according to claim 1, said encrypting said birth registration report according to said security key further comprising signing said birth registration report with a virtual signature.
5. The method according to claim 1, further comprising receiving an indication of receipt of said birth registration report from said registrar of birth records for said location.
6. The method according to claim 1, further comprising establishing a virtual medical record for said newborn plant or calf.
7. The method of claim 1, including generating a secure birth registration report comprising: identification of said location, said picture of said newborn plant or calf, and a time stamp that identifies a time and date of said birth, encrypting said birth registration report according to said security key, using said computerized device, said security key preventing altering said birth registration report; transmitting said birth registration report in encrypted format to a registrar of birth records for said location, using said computerized device; and storing said birth registration report in encrypted format on said computerized device.

FIG. 5A shows another exemplary process executed by the smart contract system. In (120) Buyer requests to obtain the service or item from the service or item provider. In (124) Item provider utilizes the blockchain system described above and generates a cryptographic key pair. The marker can be the resirrigation generated by a specific combination of microbes in a predetermined concentration arrived at by selectively breeding the microbes as guided through periodic genetic testing such that only the selected microbes are bred during the selective breeding, for example. In (126) the service or item provider embeds the key data in the service or item. Unique identifiers, such as barcodes, can be added to one or more nucleic acids isolated from a sample from a food processing facility, from a hospital or clinic, or from another sources. Barcodes can be used to associate a sample with a source; e.g., to associate an environmental sample with a specific food processing facility or with a particular location within said food processing facility. Barcodes can also be used to identify a processing of a sample, as described in U.S. Patent Pub. No. 2016/0239732, which is entirely incorporated herein by reference.

In some aspects, the disclosure provides a method comprising adding a first barcode to a first plurality of nucleic acid sequences from a sample, thereby providing a first plurality of barcoded nucleic acid sequences; performing a first sequencing reaction on said first plurality of barcoded nucleic acid sequences, wherein said sequencing reaction is performed on a sequencing apparatus comprising a flow cell; adding a second barcode to a second plurality of nucleic acid sequences from a second sample, thereby providing a second plurality of barcoded nucleic acid sequences; and performing a second sequencing reaction on said second plurality of barcoded nucleic acid sequences, wherein said second sequencing reaction is performed on said sequencing apparatus comprising said flow cell, thereby reusing said flow cell. To enhance identification, the bar code can have a complimentary sequence to provide differential analysis. Further, the presence of the bar code, even if weak, can be detected if instances of the code are repetitively observed over time or if the code matches the shipping route.

In (128) the service or service or item provider stores the private key in association with an entity credential in the database. In (130) a third party validates the terms of the smart contract with the private key. In (132) the blockchain or shared ledger is analyzed to determine if key data was used, if contractual terms are satisfied according to contract law expert system, and if so marks the satisfaction of the contract terms. For example, the terms may include pricing and delivery requirements, and may further include requirements on origin of the product, product content/material/composition requirements, use of sustainable farming practices, or use of sustainable energy sources, among others. In (134) the seller/provider is paid based on smart contract from the escrowed funds, and service or item is then made available to the buyer.

FIG. 5B shows an exemplary ecosystem from farmers to consumers. In this system, farmers plant seeds and the particulars fertilizer and microbes and soil enhancement sources, location, and application details are tracked using the blockchain. To prevent tampering of data source, a combination of smart phone geocoordinate, plant image recognition, and authenticated users is used to reduce fraudulent data entry. A digital smart contract between primary producers organized in an Agricultural Cooperative to improve farmers' livelihoods and their supply chain conditions. A mobile application (app) provides full value chain transparency and traceability to the cooperative, exporter and importer, but also to the end consumers. In that way, the consumer will know for sure that farmers have been paid correctly for their rice which contributes to their sustainable livelihood. The consumers are enabled to make an informed and conscious choice for a rice that complies with social conditions and fair production standards. This project provides transparency and information to the value chain actors. This is expected to provide small rice farmers with more influence so as to and secure their own livelihoods.

One embodiment uses Hyperledger Fabric, a platform for deploying blockchain networks. Hyperledger Fabric offers high levels of performance, protection, and transaction privacy. Fabric is the leader in blockchain for business, and can enable modular components to suit various use cases. The IBM Blockchain Platform is built upon Hyperledger Fabric. The ledger, smart contracts, and consensus between members are maintained by using Fabric protocols. Fabric is designed for business use cases where the blockchain is operated by a set of known, identified, and often vetted participants. This capability is known as a permissioned blockchain. A permissioned blockchain provides a way to secure the interactions among a group of entities that know each other, have common business interests, and want to manage a decentralized network (rather than turning management of their ledgers over to a single party). Hyperledger Fabric smart contracts are implemented in chaincode. When an application needs to interact with the ledger, it invokes these contracts by sending transactions into the Fabric network. This is the case because chaincode predominately interacts only with the database component of the ledger and not the historical transaction log. The Ordering Service, usually composed of multiple orders, provides consensus and ordering of transaction. It does so by bundling transactions into blocks, which are then added to the blockchain. The certificate authority (CA) identifies all entities in the network: Peers, the ordering service, and the participants who are submitting transactions and accessing the ledger. These identities are provided and secured by using a public key infrastructure (PKI). Peers use the CA to cryptographically sign transactions and contracts, whereas participants use the CA to prove that they have a right to access the network.

One implementation of the blockchain system uses IBM Food Trust blockchain to build transparency for food. With capabilities to enable safer food, longer product shelf lives, reduced waste, faster traceability, and better access to shared information, the blockchain is used to meet the new standard for transparency and trust. The solution provides authorized users with immediate access to actionable food supply chain data—from farm to store and ultimately the consumer. The complete history and current location of any food item along with its accompanying information (i.e. certifications, test data, temperature data) can be readily available in seconds. The system combines supply chain modules with blockchain core functions, delivering business value to the food ecosystem from the combination of governance, standards and interoperability, and technology. All data is stored on blockchain ledgers, protected with the highest level of commercially-available, tamper-resistant encryption. The solution provides participants with a permission-based, shared view of food ecosystem information, allowing convenient data publishing and controlled sharing of information. To achieve this goal, the solution enables participants to enter and control access to their encrypted blockchain data. In doing so, transaction partners can only access the data they are permissioned to view. Permissioned data access is an integral part of the core solution. Access controls ensure that the organization that owns the data maintains full control over who can access it on the network. Users can quickly locate items from the supply chain, in real time, by querying food product identifiers such as Global Trade Item Number (GTIN) or Universal Product Code (UPC), using the product name, and filtering on dates. API endpoints accept incoming XML messages and converts them to a predetermined message format (JSON). These connection endpoints also perform some lightweight verification to ensure that certain message elements conform to standards for the solution, including checks on GTINs and GLNs for length and check digits. The system provides an easy method to track and trace food products along the supply chain, from farmer to retailer. Once data for a specific product has been uploaded by at least two supply chain participants, a trace of the product can be performed, as shown in FIG. 5C. FIG. 5D shows an exemplary user interface showing how products reach consumers from the farm. This is a motivation for members of the ecosystem to contribute, as the shared data allows visibility much earlier than convention feedback. A farmer can see what products are being consumed more than others, and the reasons for the increased demand, and then adjust the next crops to be grown in response. Similarly, shippers can plan ahead. Supermarkets can adjust the loads to reach them in a timely manner. For example, if a product has a very short shelf life and a closer supermarket can use that product, supermarkets can re-route the truck to deliver to the supermarket that can timely use the product, and then the supermarkets can make the proper payment accounting, or simply barter for the next truck delivery. Thus, food waste is reduced, and freshness is maintained. The user can use the mobile app to access data through the blockchain and retrieve all the inspection and regulatory paperwork if desired and can pay to support sustainable farms or local farms if desired.

In various embodiments, the processor can include a first part disposed on the mobile platform, wherein the first part is structured and operable to execute a first portion of the plant recognition algorithm to collect/capture the color and NIR image data as described above. In such embodiments, the processor can include a second part residing at a remote location, e.g., a laboratory, wherein the second part is structured and operable to execute a second portion of the plant recognition algorithm to analyze the collected/captured color and NIR image data and generate the false color images as described above.

5G Controlled Irrigation

Another system includes a frame, water valves attached to the frame to dispense water to crops in the field, sensors to capture moving parts on the irrigation system, 5G transceivers, and a processor coupled to the sensors and a 5G network to control movement of the frame to move around a field for irrigation, the processor also collecting system operation parameters to predict part failure and request replacement parts ahead of the predicted failure. One embodiment collects operational parameters from a population of irrigation systems and predict failure based on population statistics.

AI Based Irrigation

Another system uses AI for improved irrigation scheduling and efficiency. While soil moisture data (from either sensors or models) have long been used as a scheduling aid, AI provides machine learning of how soil moisture responds to irrigation events in scenarios with different crops, soils, environmental conditions, etc. Tied to an irrigation control system, the AI machine can automatically implement control strategies that help minimize water usage, manage nutrient losses, or achieve more desirable or uniform soil moisture throughout the field.

In another system, AI learns the associations between available weather, crop and soil condition data, and the corresponding irrigation recommendations of a trained agronomist, thereby automating the repetitive aspects of the scheduling process.

AI for Farming

In one embodiment, the method includes accessing crop growth information describing, for each of a plurality of plots of land, 1) characteristics of the plot of land, 2) a type of crop planted on the plot of land, 3) characteristics of farming operations performed for the planted crop, and 4) a corresponding crop productivity; normalizing the crop growth information by formatting similar portions of the crop growth information into a unified format and a unified scale; storing the normalized crop growth information in a columnar database; training a crop prediction engine by applying one or more one machine learning operations to the stored normalized crop growth information, the crop prediction engine mapping, for a particular crop type, a combination of one or more characteristics of the plot of land and characteristics of farming operations performed for the planted crop to an expected corresponding crop productivity; in response to receiving a request from a grower to optimize crop productivity for a first type of crop and a first portion of land on which the first crop is to be planted, the request identifying a first set of farming operations to be performed by the grower: accessing field information describing characteristics of the first portion of land; applying the crop prediction engine to the accessed field information and the first set of farming operations to produce a first expected crop productivity; applying the crop prediction engine to the accessed field information to identify a second set of farming operations that can produce a second expected crop productivity; modifying the first set of farming operations based on the second set of farming operations to produce a modified set of farming operations; and in response to the second expected productivity being greater than the first expected productivity, presenting, within an interface of a device associated with the grower, the modified set of farming operations; and performing, by the grower, the modified set of farming operations for the first type of crop on the first portion of land.

The machine learning system can deploy any of the following: a generalized linear model, a generalized additive model, a non-parametric regression operation, a random forest classifier, a spatial regression operation, a Bayesian regression model, a time series analysis, a Bayesian network, a Gaussian network, a decision tree learning operation, an artificial neural network, a recurrent neural network, a reinforcement learning operation, linear/non-linear regression operations, a support vector machine, a clustering operation, and a genetic algorithm operation.

The learning system can be trained on data captured by local sensor, or from satellite/radar systems. For example, such data can include Past, present, and predicted future crop type or plant variant planted and data describing its growth and development, including color of leaves, stand count, plant height, stalk diameter, root length, root architecture (such as a number of secondary roots, root branching, and a number of root hairs), root mass, immune response, tasseling, plant stage, insect damage, weed pressure, fungal infection damage, nematode damage, sap sucrose, and the like; Past, present, and predicted future microbial community composition and/or microbial treatment in or on one or more tissues of an identified crop variant; Past, present, and predicted future plant gene expression in or on one or more tissues of an identified crop variant; Past, present, and predicted future microbial or plant hormone or metabolite production in or on one or more tissues of an identified crop variant; One or more planting or harvest dates for an identified crop variant; Interactions with or requirements of field treatments or field characteristics and other farming operations for an identified crop variant, the field treatments including irrigation, tillage, seed treatment, foliar treatment, floral treatment, soil treatment, soil type, soil pH, soil nutrient composition, previously planted crop types and varieties, microbial composition, microbial composition application rate, insecticide application, fungicide application, pesticide application, herbicide application, fertilizer application, and the like;

The dates and methods of application of the field treatments, including insecticide type, application method, application date, and application rate; fungicide type, application method, application date, and application rate; pesticide type, application method, application date, and application rate; herbicide type, application method, application date, and application rate; fertilizer type, application method, application date, and application rate; and the like; Seeding operations for an identified crop variant, including a date range for planting, a soil type for planting, a soil temperature for planting, a soil texture for planting, row spacing for planting, a number of rows for planting, a location for planting, a planting depth and rate, atmospheric conditions for planting, weather conditions for planting, drainage conditions for planting, seedbed preparation operations, and the like. Information associated with or specific to corn, soybean, rice, and cotton crops; Rice ratooning information; Data calculated based on other agricultural information, including the ratio of soil to air temperature, the ratio of leaf to air temperature, a soil wetness index, cumulative growing degree days, chilling hours, a chlorophyll content, evapotranspiration, a daily light integral, photosynthetically active radiation, a daily minimum temperature, a daily mean temperature, a daily maximum temperature, a normalized difference vegetation index, modified soil-adjusted vegetation index, data calculated using other information in the database, and the like.

Growth information may include information about one or more of: corn, rice, cotton, wheat, rye, oats, barley, sorghum, soybeans, crop variants, date ranges for planting crops, crop planting rate ranges, crop planting depth, soil temperatures for planting crops, atmospheric temperatures for planting crops, soil textures for planting crops, soil types for planting crops, weather conditions for planting crops, drainage conditions for planting crops, crop seedbed preparation methods, and crop planting locations.

The system can collect growth information over a plurality of growing seasons, and over a plurality of times within each season, row spacing, a number of rows, a type of irrigation, a type of tillage, a type of seed treatment, a type of foliar treatment, a type of floral treatment, a type of soil treatment, a soil type, a soil pH, soil nutrient composition, previously planted crop types and varieties, effects of microbial composition or treatment, microbial composition application rate and date, effects of insecticide and insecticide application rate and date, effects of fungicide and fungicide application rate and date, and effects of fertilizer and fertilizer application rate and date.

The growth information includes information about one or more of: a microbial community composition, a microbial community gene expression, a microbial community protein production, a microbial community volatile organic compound production, a plant gene expression, a plant protein production, a plant volatile organic compound production, a microbial community metabolite production, and a plant metabolite production.

The sensors can collect the field information from one or more sensor for: soil temperature, air temperature, soil moisture, leaf temperature, leaf wetness, and spectral data over multiple wave length bands reflected from or absorbed by ground. The field information collected from the sensors is used to compute additional field information, including one or more of: a ratio of soil to air temperature, a ratio of leaf to air temperature, a soil wetness index, a number of cumulative growing degree days, a chlorophyll content, evapotranspiration, a daily light integral, a daily minimum temperature, a daily mean temperature, a daily maximum temperature, and a change in the normalized difference vegetation index. Such sensors include thermometers, barometers, weather detection sensors, soil composition sensors, soil moisture sensors, hygrometers, pyranometers, pyrheliometers, cameras, spectrometers, spectrophotometers, spectrographs, spectral analyzers, refractometers, spectroradiometers, radiometers, electrical conductivity sensors, and pH sensors. Images of land can be captured from one or more a satellite, an aircraft, an unmanned aerial vehicle, a land-based vehicle, and a land-based camera system.

A crop prediction engine maps combinations of field information inputs and farming operation inputs to crop productivity probability distributions based on one or more machine-learned relationships between combinations of portions of the crop growth information and corresponding crop productivities, and wherein applying the crop prediction engine to the accessed field information and the first set of farming operations comprises determining, based on the one or more machine-learned relationships, the first expected crop productivity for the first type of crop planted and grown at the first portion of land using the first set of farming operations. The crop prediction engine then maximizes the crop productivity probability distribution for the first type of crop.

The engine can determine a seeding rate operation, a seeding date range operation, an operation to not plant a crop, an operation to plant a different type of crop than the first type of crop, and a fertilizer application operation. In one embodiment, the engine determines one or more of: a seeding depth operation, a harvest date range operation, a seed treatment operation, a foliar treatment operation, a floral treatment operation, a soil treatment operation, a reseeding operation, a microbial composition application operation, an insecticide application operation, a herbicide application operation, a pesticide application operation, an implementation of a crop production technology, and an implementation of a crop production service.

A camera can be mounted on one of: a satellite, an aircraft, an unmanned aerial vehicle, a land-based vehicle, and a land-based camera system.

In another embodiment, the engine accesses field information describing characteristics of the crop growth and generates a prediction model trained on crop growth information and mapping data and during live operation determines a set of farming operations that maximize crop productivity, for example the engine identifies one or more of: a type or variant of crop to plant if any, an intercrop to plant, a cover crop to plant, a portion of the first portion of land on which to plant a crop, a date to plant a crop, a planting rate, a planting depth, a microbial composition, a portion of the first portion of land on which to apply a microbial composition, a date to apply a microbial composition, a rate of application for a microbial composition, an agricultural chemical to apply, a portion of the first portion of land on which to apply an agricultural chemical, a date to apply an agricultural chemical, a rate of application for an agricultural chemical, type of irrigation if any, a date to apply irrigation, and a rate of application for irrigation. In other examples the engine identifies one or more of a type, a method of application, an application location, and an application volume of one or more of a plant growth regulator, a defoliant, and a desiccant. The engine can also decide whether to replant the crop within the first portion of land, whether to replant a different crop within the first portion of land, and a replant date. The engine also identifies one or more of: a type of nutrient to apply, a quantity of nutrient to apply, a location to apply a nutrient, a date to apply a nutrient, a frequency to apply a nutrient, and a nutrient application method. The selected nutrient can be one or more of: N, P, K, Ca, Mg, S, B, Cl, Cu, Fe, Mn, Mo, and Zn. The engine also identifies one or more of: a quantity of water to apply, a location to apply water, a date to apply water, a frequency to apply water, and a water application method. The engine also can specify one or more of: a herbicide, a pesticide, and a fungicide. Based on trained data, the engine identifies one or more of: a harvest date, a harvest method, and a harvest order. The engine can be triggered to generate commands in response to one of: a weather event, a temperature event, a plant growth stage event, a water event, a pest event, a fertilizing event, and a farming machinery-related event. A market event such as the availability of a harvested crop, predicted availability of a crop to be harvested, and a current or expected future price of a crop can also be used to trigger the engine to run the model. Similarly, the trigger can be a contract event such as an agreement between a grower and a crop broker, an agreement between a grower and an agronomist, an agreement between a grower and a technology provider, an agreement between a grower and a service provider, an agreement between a grower and a crop recipient, an agreement between an agronomist and a technology provider, an agreement between an agronomist and a service provider, an agreement between a crop broker and a technology provider, an agreement between a crop broker and a service provider, and an agreement between a crop broker and a crop recipient, an agreement between a grower and a crop broker, and wherein the agreement provides that the crop broker obtains some of all of a crop to be harvested by the grower. The triggering event can be a product supply event such as a below-threshold or above-threshold availability or predicted availability of a crop product, and a below-threshold or above-threshold price or predicted future price of a crop product.

From the data, the engine can create models. Examples of other crop prediction models that perform one or more machine learning operations include but are not limited to: Models that map sunlight exposure information, soil texture, and precipitation and various planting dates to expected crop yield and quality; Models that map historic pest and insect populations within a location and the application of various quantities and types of pesticides to expected crop yield or expected crop loss from pest and insect damage (for instance, relative to expected crop yields when pest and insect damage does not occur); Models that map a decision to opt against planting a crop or to plant a cover crop to long-term profitability; Models that map crops planted in one or more previous years to current season yields in order to estimate the effects of crop rotation while controlling for location and weather; Models that map soil composition information, crop rotation, and various combinations of nutrient application types, quantities, and methods to long-term soil health; Models that map expected rainfall and various combinations of row spacing and seed rates to crop yield; Models that map expected temperature and various combinations of row spacing and seeding rates to crop yield; Models that map macroeconomic factors domestic and foreign supply and demand of agricultural crops or inputs to agricultural production, domestic or foreign policy, export or import regulation, exchange rates or natural phenomena such as regional flooding or droughts to expected crop yield or expected crop loss; Models that map geographic or topographic factors of or near a field such as mountains, hills, valleys, or bodies of water and various combinations of watering frequency, watering intensity, and watering method to crop yield; Models that map crop production to crop planting conditions, including which crop to plant (or whether to plant a crop at all), which varieties of seeds to plant, which seed chemistry package to apply, which microbial seed coating to apply, when to plant, at what rate to plant, what in-furrow to use, whether to replant, and which cover crop to plant, determined based on one or more of: 1) historical data on crops planted, weather that occurred, and resulting yield, 2) historical crop health, 3) elevation (including derived slope, aspect, and soil wetness index), 4) historical soil texture and soil nutrients, 5) historical and forecasted weather (including solar radiation), and 6) historical and current prices of crops (including futures contracts); Models that map crop production to treatment application (such as Nitrogen, Phosphorus, Calcium, Magnesium, Sulfur, Boron, Chlorine, Copper, Iron, Manganese, Molybdenum, Zinc, fertilizer, plant growth regulator, desiccant, or defoliant), for instance based on a method, time, location, and quantity of application, determined based on one or more of 1) historical crop health, 2) reports of pest and weed stress by human "scouts" who visit the field, 3) elevation (including derived slope, aspect, and soil wetness index), 4) historical soil texture and soil nutrients, 5) historical and forecasted weather (including solar radiation), and 6) historical and current prices of inputs and crops (including futures contracts); Models that map fungicide, herbicide, and nematicide application (including which product to apply, when to apply, where to apply, quantity to apply, and method of application) determined based on one or more of: 1) information about incidence of pests and weeds and disease in nearby geographic regions, 2) historical crop health, 3) reports of pest and weed stress by human "scouts" who visit the field, 4) elevation (including derived slope, aspect, and soil wetness index), 5) historical soil texture and soil nutrients, and 6) historical and forecasted weather (including solar radiation); Models that map the expected value (and/or confidence interval) of crop insurance payments to an amount of crop insurance purchased for one or more portions of land, determined based on one or more of: 1) historical insurance claim data, 2) historical and current crop prices (including futures contracts), 3) historical and forecasted yield, 4) historical soil texture and soil nutrients, and 5) historical and forecasted weather; Models that map crop yield and quality at harvest to harvest date and order, determined based on one or more of: 1) historical crop health, 2) reports from human "scouts" or from imagery on how many crops have fallen over, 3) historical treatment application data (including the current season), 4) elevation (including derived slope, aspect, and soil wetness index), 5) historical soil texture and soil nutrients, 6) historical and forecasted weather (including solar radiation), 7) available harvest machinery, and 8) size of harvested land, among others.

The engine identifies one or more of: a piece of equipment to use or purchase, a drainage method to implement, a crop insurance policy to purchase, one or more potential crop brokers, one or more potential crop purchasers, one or more harvested crop qualities, and one or more harvested crop purchase prices. The engine can also receive as input a crop content, a crop color, a crop hardness, a measure of wet gluten, a number or percentage of broken grains, a toxin level, a damage level, whether the crop is organic, whether the crop is shade grown, whether the crop is greenhouse grown, whether the crop is fair-wage grown, whether the crop is no-till grown, when the crop is pollution-free grown, when the crop is carbon neutral, and a grading or certification by an organization or agency. The crop content includes one or more of: moisture content, protein content, carbohydrate content, and oil or fat content. The model also learns from rainfall associated with the first portion of land, canopy temperature associated with the first portion of land, soil temperature of the first portion of land, soil moisture of the first portion of land, soil nutrients within the first portion of land, soil type of the first portion of land, topography within the first portion of land, humidity associated with the first portion of land, growing degree days associated with the first portion of land, microbial community associated with the first portion of land, pathogen presence associated with the first portion of land, prior farming operations performed at the first portion of land, prior crops grown at the first portion of land, and other historical field information associated with the first portion of land. The engine can also learn from characteristics of a crop planted such as a plant stage of the crop, a color of the crop, a stand count of the crop, a crop height, a root length of the crop, a root architecture of the crop, an immune response of the crop, flowering of the crop, and tasseling of the crop. The engine can direct the operation of a smart equipment or sensor for execution by the smart equipment or sensor such as a harvesting system, and wherein the selected set of farming operations comprise a harvest route, path, plan, or order.

FIG. 6 shows a deep learning machine using deep convolutionary neural networks for detecting genetic based drug-drug interaction. One embodiment uses an AlexNet: 8-layer architecture, while another embodiment uses a VGGNet: 16-layer architecture (each pooling layer and last 2 FC layers are applied as feature vector). One embodiment uses Tensorflow to specify and train the neural networks. AI is used to determine how environmental factors influence the crops being irrigated. The learning machine can detect the nature of the relationship between air temperatures, soil moisture, and the daily growth of the plants. This relationship was determined by applying AI to plant test plot data, along with the weather and soil conditions experienced in those test plots. The AI-based system can quantify how air temperature drives plant growth, but also revealed how plant growth slows under dry conditions during warm temperatures. The model can foster the development of more efficient or productive management practices, including irrigation.

One embodiment trains on ground parameters like soil moisture, soil temperature, and environmental conditions along with the weather forecast data from the Internet. The models learn from captured soil moisture, soil temperature, air temperature, Ultraviolet (UV) light radiation, and relative humidity of the crop field, along with the weather forecast parameters like precipitation, air temperature, humidity, and UV for the near future.

Another embodiment learns from sensor data on air temperature, relative humidity, solar irradiance, wind direction/speed, average canopy temp, irrigation treatment/schedule, water during past week, fertilizer amount, microbial amount, among others.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In one embodiment, the pattern recognizer may obtain a pattern definition in a simple format; predict several time steps in future by using Markov models; optimize results based on its predictions; detect transition between patterns; abstract data and extract information to infer higher levels of knowledge; combine higher and lower levels of information to understand about the patient and clinical behaviors; infer from multi-temporal (different time scales) data and associated information; using variable order Markov models, and/or reduce noise over time by employing clustering algorithms, such as k-means clustering.

For example, K vectors are randomly chosen and assigned as a cluster center for applying k-means clustering algorithms. In pattern recognition, the k-means is a method for classifying objects based on the closest training examples in the feature space. k-NN is a type of instance based learning, or lazy learning, where the function is only approximated locally and all computation is differed until classification. The Euclidian distance between different patterns in this vector space may be used to find clusters of patterns. The system may assign a new input vector to its closest cluster center and may move that cluster towards the input vector by a fraction of the Euclidean distance between them.

The system may use knowledge-based components such as a knowledge-based repository (KB). The repository may include clinical information. For example, it may include that "eating salt-rich food causes blood pressure to increase." The information may be stored in a variety of formats based on the type of inference employing them. The knowledge-based repository may act as a repository for some or all of the referenced knowledge. For example, it can include reference values for certain consents and variables used for inference. Accordingly, one or more layers (e.g. a hierarchical pattern processing layer or Pattern Engine) may subscribe to information from the knowledge-based repository. For example, one or more of the services may query the knowledge-based repository when making an inference.

In one embodiment, the knowledge-based repository may aggregate relevant clinical and/or behavioral knowledge from one or more sources. In an embodiment, one or more clinical and/or behavioral experts may manually specify the required knowledge. In another embodiment, an ontology-based approach may be used. For example, the knowledge-based repository may leverage the semantic web using techniques, such as statistical relational learning (SRL). SRL may expand probabilistic reasoning to complex relational domains, such as the semantic web. The SRL may achieve this using a combination of representational formalisms (e.g., logic and/or frame based systems with probabilistic models). For example, the SRL may employ Bayesian logic or Markov logic. For example, if there are two objects— 'Asian male' and 'smartness', they may be connected using the relationship 'asian males are smart'. This relationship may be given a weight (e.g., 0.3). This relationship may vary from time to time (populations trend over years/decades). By leveraging the knowledge in the semantic web (e.g., all references and discussions on the web where 'asian male' and 'smartness' are used and associated) the degree of relationship may be interpreted from the sentiment of such references (e.g., positive sentiment: TRUE; negative sentiment: FALSE). Such sentiments and the volume of discussions may then be transformed into weights. Accordingly, although the system originally assigned a weight of 0.3, based on information from semantic web about Asian males and smartness, may be revised to 0.9.

In an embodiment, Markov logic may be applied to the semantic web using two objects: first-order formulae and their weights. The formulae may be acquired based on the semantics of the semantic web languages. In one embodiment, the SRL may acquire the weights based on probability values specified in ontologies. In another embodiment, where the ontologies contain individuals, the individuals can be used to learn weights by generative learning. In some embodiments, the SRL may learn the weights by matching and analyzing a predefined corpora of relevant objects and/or textual resources. These techniques may be used to not only to obtain first-order waited formulae for clinical parameters, but also general information. This information may then be used when making inferences.

For example, if the first order logic is 'obesity' causes hypertension, there are two objects involved: obesity and hypertension. If data on patients with obesity and as to whether they were diagnosed with diabetes or not is available, then the weights for this relationship may be learnt from the data. This may be extended to non-clinical examples such as person's mood, beliefs etc.

The pattern recognizer may use the temporal dimension of data to learn representations. The pattern recognizer may include a pattern storage system that exploits hierarchy and analytical abilities using a hierarchical network of nodes. The nodes may operate on the input patterns one at a time. For every input pattern, the node may provide one of three operations: 1. Storing patterns, 2. Learning transition probabilities, and 3. Context specific grouping.

A node may have a memory that stores patterns within the field of view. This memory may permanently store patterns and give each pattern a distinct label (e.g. a pattern number). Patterns that occur in the input field of view of the node may be compared with patterns that are already stored in the memory. If an identical pattern is not in the memory, then the input pattern may be added to the memory and given a distinct pattern number. The pattern number may be arbitrarily assigned and may not reflect any properties of the pattern. In one embodiment, the pattern number may be encoded with one or more properties of the pattern. In one embodiment, patterns may be stored in a node as rows of a matrix. In such an embodiment, C may represent a pattern memory matrix. In the pattern memory matrix, each row of C may be a different pattern. These different patterns may be referred to as C-1, C-2, etc., depending on the row in which the pattern is stored.

The nodes may construct and maintain a Markov graph. The Markov graph may include vertices that correspond to the store patterns. Each vertex may include a label of the pattern that it represents. As new patterns are added to the memory contents, the system may add new vertices to the Markov graph. The system may also create a link between to vertices to represent the number of transition events between the patterns corresponding to the vertices. For example, when an input pattern is followed by another input pattern j for the first time, a link may be introduced between the vertices i and j and the number of transition events on that link may be set to 1. System may then increment the number of transition counts on the link from i and j whenever a pattern from i to pattern j is observed. The system may normalize the Markov graph such that the links estimate the probability of a transaction. Normalization may be achieved by dividing the number of transition events on the outgoing links of each vertex by the total number of transition events from the vertex. This may be done for all vertices to obtain a normalized Markov graph. When normalization is completed, the sum of the transition probabilities for each node should add to 1. The system may update the Markov graph continuously to reflect new probability estimates.

The system may also perform context-specific grouping. To achieve this, the system may partition a set of vertices of the Markov graph into a set of temporal groups. Each temporal group may be a subset of that set of vertices of the Markov graph. The partitioning may be performed such that the vertices of the same temporal group are highly likely to follow one another. The node may use Hierarchical Clustering (HC) to for the temporal groups. The HC algorithm may take a set of pattern labels and their pair-wise similarity measurements as inputs to produce clusters of pattern labels. The system may cluster the pattern labels such that patterns in the same cluster are similar to each other.

In one embodiment, the probability of a transition between two patterns may be used as the similarity between those patterns for the HC algorithm. The similarity metric may be used to cluster medical patterns that are likely to follow one another into the same cluster. The HC algorithm may be configured such that patterns that are unlikely to follow each other fall into different clusters. A cluster of a set of patterns that are likely to follow each other in time may be referred to as a temporal group. The HC algorithm may start with all store patterns and separate clusters and then recursively merge clusters with the greatest similarity. This may be used to obtain a treelike structure (e.g. a dendrogram) with a single cluster (which may contain all patterns) at the top of the tree and the individual patterns at the bottom (e.g. each pattern in its own cluster). The system may achieve the desired clustering for temporal grouping (e.g. somewhere between the bottom and a top of the dendrogram) by defining a suitable criteria. For example, one criterion could be to cut the tree at a level where the size of the largest cluster does not exceed a particular value. The node may have a design perimeter that sets the maximum number of clusters or temporal groups of the node. The desired temporal groups may be achieved by selecting a level of the dendrogram that gives the number of temporal groups closest to and less than the configured maximum number of temporal groups. These temporal groups may be updated as the Markov transition probabilities are updated. These steps may be performed periodically during the learning process. The learning process may be stopped once the temporal groups have sufficiently stabilized.

Once a node has completed its learning process, it may be used for sensing and/or inference. The characteristics of the input to the node in sensing may be identical to those used during learning. For example, objects may move under the field of view of the node and the node may see portions of those objects. The resulting patterns may be used as inputs to the node. A node used for sensing and/or inference may produce an output for every input pattern. A node may also use a sequence of patents to produce an output. In one embodiment, it can be assumed that the outputs are produced based on instantaneous inputs. Under this assumption, the Markov graph may not be used during the sensing phase. For example, it may be discarded once the temporal groups within the node are completed.

For every input pattern, the node may produce an output factor that indicates the degree of membership of the input pattern and each of its temporal groups. However, the current input pattern may not perfectly match any of the patterns stored in memory. Accordingly, in one embodiment, the closeness of the input pattern to every pattern stored in memory will be determined. For example, let $d_i$ be the distance of the ith stored pattern from the input pattern. The larger this distance is, the smaller the match between the input pattern and the stored pattern becomes. Assuming that the probability that an input pattern matches a stored pattern falls off as a Gaussian function of the Euclidean distance, the probability that the input pattern matches the ith stored pattern can be calculated as being proportional to $e-d2i/\alpha$, where α is a parameter of the node. Calculating this for every stored pattern may give the closeness of the current input pattern to all the vertices of the Markov graph.

Degree of membership of the input pattern in each temporal group may be determined by the maximum of its closeness to each of the vertices within the temporal group. This results in a length equal to the number of temporal groups, with each component of the factor indicating the degree of membership of the input pattern in the corresponding temporal group. This factor may then be used normalize the sum to unity. These normalized memberships may be used as estimates of probability of membership in each temporal group. This normalized degree of membership may also be used as an output of the node. The output may be a histogram giving estimates of probability of membership of the current input pattern and each of the temporal groups of the node.

As data is fed into the pattern recognizer, the transition probabilities for each pattern and pattern-of-patterns may be updated based on the Markov graph. This may be achieved by updating the constructed transition probability matrix. This may be done for each pattern in every category of patterns. Those with higher probabilities may be chosen and placed in a separate column in the database called a prediction list.

Logical relationships among the patterns may be manually defined based on the clinical relevance. This relationship is specified as first-order logic predicates along with probabilities. These probabilities may be called beliefs. In one embodiment, a Bayesian Belief Network (BBN) may be used to make predictions using these beliefs. The BBN may be used to obtain the probability of each occurrence. These logical relationships may also be based on predicates stored the knowledge base.

The pattern recognizer may also perform optimization for the predictions. In one embodiment, this may be accomplished by comparing the predicted probability for a relationship with its actual occurrence. Then, the difference between the two may be calculated. This may be done for p occurrences of the logic and fed into a K-means clustering algorithm to plot the Euclidean distance between the points. A centroid may be obtained by the algorithm, forming the optimal increment to the difference. This increment may then be added to the (p+1)th occurrence. Then, the process may be repeated. This may be done until the pattern recognizer predicts logical relationships up to a specified accuracy threshold. Then, the results may be considered optimal.

When a node is at the first level of the hierarchy, its input may come directly from the data source, or after some preprocessing. The input to a node at a higher-level may be the concatenation of the outputs of the nodes that are directly connected to it from a lower level. Patterns in higher-level nodes may represent particular coincidences of their groups of children. This input may be obtained as a probability distribution function (PDF). From this PDF, the probability that a particular group is active may be calculated as the probability of the pattern that has the maximum likelihood among all the patterns belonging to that group.

Furthermore, although the features, functions and operation of the mobile irrigation and the corresponding methods for determining plant counts have been generally described herein with regard to counting plants in a research environment, it is envisioned that the mobile irrigation and methods for determining plant counts described above are equally applicable for use in a commercial environment for obtaining plant counts to determine such things as yield estimates, and remain within the scope of the present disclosure.

What is claimed is:

1. An agricultural method, comprising:
growing crops in a plurality of cells in a chamber, each cell having benches or levels;
maintaining pre-set temperature, humidity, carbon dioxide, watering and lighting levels to achieve predetermined plant growth;
using transport rails to deliver benches for one or more operations including seeding, harvesting, grow media recovery, and bench wash;
selecting seeds having one or more predetermined end product properties and dispensing seeds in the cell with a mechanical seeder coupled to the transport rails;
growing the crops with computer controlled nutrients, light and air level;
capturing growth data with one or more sensors and storing growth data on a blockchain;
controlling an irrigation system in response to the growth data; and
harvesting the crops and delivering the harvested crop.

2. The method of claim 1, comprising selecting microbes to assist seed growth and providing the microbes to help the seed during early stage growth.

3. The method of claim 1, comprising recording growth data on the blockchain, wherein the blockchain comprises Hyperledger or Ethereum blockchain.

4. The method of claim 1, comprising specifying end product properties include product size, drought resistance, or predetermined taste.

5. The method of claim 1, comprising adding entries to the blockchain as the seed moves from the cell to a consumer.

6. The method of claim 1, comprising dispensing fertilizer in response to the growth data.

7. The method of claim 1, comprising embedding microbes in a fertilizer or coating seeds with microbes.

8. The method of claim 1, comprising growing fodder in the chamber controlled by a computer.

9. The method of claim 1, comprising receiving data from IoT (internet of things) sensors and communicating with a cloud to provide computer control of the chamber.

10. The method of claim 1, comprising financing seeds based on blockchain data.

11. The method of claim 1, comprising generating tokens used by suppliers, shippers, distributors, and retailers in an ecosystem.

12. The method of claim 1, wherein each generation of the microbes are iteratively grown in a feedback loop.

13. The method of claim 1, wherein each generation of the microbes are iteratively grown to increase microbes providing the predetermined end product property, comprising checking genetic data of each generation of microbes in a feedback loop to increase or decrease predetermined members of the microbes to achieve the determined end product property.

14. The method of claim 1, comprising capturing a leaf image and determining soil properties based from the leaf image.

15. The method of claim 1, comprising capturing a leaf image and determining soil properties based from the leaf image.

16. The method of claim 1, comprising capturing soil image and determining soil properties based therefrom.

17. The method of claim 1, comprising capturing an image of an organism on the plant, classifying the organism, and recommending a treatment for the organism.

18. The method of claim 1, comprising providing seeds that provide food low in starch and sugar for a diabetic consumer.

19. The method of claim 1, comprising providing the seed and agreeing to buy an end product from the seed with the predetermined end product properties in advance of planting.

20. The method of claim 19, comprising providing a network of trucks to pickup the end product by selecting in real-time one or more nearest trucks from a network of trucks, reviewing each truck's shipping cost, and designating one of the trucks to transport the end product.

* * * * *